(12) United States Patent
Yanai et al.

(10) Patent No.: US 10,718,888 B2
(45) Date of Patent: Jul. 21, 2020

(54) LAMINATE AND WINDOW

(71) Applicant: FUJIFILM Corporation, Tokyo (JP)

(72) Inventors: Yujiro Yanai, Minami-ashigara (JP); Akira Yamamoto, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 363 days.

(21) Appl. No.: 15/883,846

(22) Filed: Jan. 30, 2018

(65) Prior Publication Data

US 2018/0172889 A1 Jun. 21, 2018

Related U.S. Application Data

(63) Continuation of application No. PCT/JP2016/072044, filed on Jul. 27, 2016.

(30) Foreign Application Priority Data

Jul. 31, 2015 (JP) .................. 2015-152708

(51) Int. Cl.
*G02B 5/30* (2006.01)
*B32B 7/02* (2019.01)
(Continued)

(52) U.S. Cl.
CPC .............. *G02B 5/3016* (2013.01); *B32B 7/02* (2013.01); *E06B 9/24* (2013.01); *G02B 5/30* (2013.01);
(Continued)

(58) Field of Classification Search
CPC ...... G02B 5/3016; G02B 5/30; G02B 27/281; G02F 1/13363; G02F 2001/133631; B32B 7/02; E06B 9/24; E06B 2009/2417
See application file for complete search history.

(56) References Cited

U.S. PATENT DOCUMENTS

2004/0212767 A1 10/2004 Sasaki et al.
2009/0103016 A1* 4/2009 Shutou ................. G02B 5/3033
349/96
(Continued)

FOREIGN PATENT DOCUMENTS

CN 101288008 A 10/2008
CN 101292181 A 10/2008
(Continued)

OTHER PUBLICATIONS

Chinese Office Action and Search Report for corresponding Chinese Application No. 201680045054.7, dated Sep. 30, 2019, with English translation.
(Continued)

*Primary Examiner* — Nathanael R Briggs
(74) *Attorney, Agent, or Firm* — Birch, Stewart, Kolasch & Birch, LLP

(57) ABSTRACT

Provided is a laminate including a first polarizer, a first patterned optical anisotropic layer, a second patterned optical anisotropic layer, and a second polarizer in this order and an optically anisotropic layer disposed between the second polarizer and the second patterned optical anisotropic layer, in which an angle formed between an absorption axis of the first polarizer and an absorption axis of the second polarizer
(Continued)

is 90°±5°; each of the first patterned optical anisotropic layer and the second patterned optical anisotropic layer has a plurality of phase difference regions having different slow axis directions in a plane of the first patterned optical anisotropic layer or the second patterned optical anisotropic layer; a white display state and a black display state are switched with each other; none of the slow axis directions of first phase difference regions and the slow axis directions of second phase difference regions are parallel or orthogonal to the absorption axes and transmission axes of the two sheets of polarizers; and the optically anisotropic layer has $Re\_off$ (550) of 240 to 310 nm and $Rth\_off(550)$ of −50 to 50 nm. Also provided is a window.

16 Claims, 4 Drawing Sheets

(51) Int. Cl.
  *G02F 1/13363* (2006.01)
  *G02B 27/28* (2006.01)
  *E06B 9/24* (2006.01)

(52) U.S. Cl.
  CPC ....... *G02B 27/281* (2013.01); *G02F 1/13363* (2013.01); *E06B 2009/2417* (2013.01); *G02F 2001/133631* (2013.01)

(56) References Cited

U.S. PATENT DOCUMENTS

| | | | | |
|---|---|---|---|---|
| 2012/0092595 | A1* | 4/2012 | Hisakado | G02B 5/3025 349/96 |
| 2012/0169950 | A1* | 7/2012 | Tatzel | G02B 5/3083 349/18 |
| 2013/0107173 | A1* | 5/2013 | Takeda | G02B 5/23 349/96 |
| 2015/0041051 | A1 | 2/2015 | Kobayashi | |

FOREIGN PATENT DOCUMENTS

| | | |
|---|---|---|
| CN | 103384841 A | 11/2013 |
| CN | 104339796 A | 2/2015 |
| JP | 2013-92707 A | 5/2013 |
| JP | 2013-164525 A | 8/2013 |
| JP | 2014-507676 A | 3/2014 |
| WO | WO 2015/033932 A1 | 3/2015 |

OTHER PUBLICATIONS

International Preliminary Report on Patentability and Written Opinion of the International Searching Authority (Forms PCT/IB/326, PCT/IB/373 and PCT/ISA/237) for Application No. PCT/JP2016/072044, dated Feb. 15, 2018, with an English translation.
International Search Report and English translation (Form PCT/ISA/210) for Application No. PCT/JP2016/072044, dated Oct. 25, 2016.

* cited by examiner

LAMINATE AND WINDOW

CROSS-REFERENCE TO RELATED APPLICATIONS

This application is a Continuation of PCT International Application No. PCT/JP2016/072044, filed on Jul. 27, 2016, which claims priority under 35 U.S.C. Section 119(a) to Japanese Patent Application No. 2015-152708 filed on Jul. 31, 2015. Each of the above applications is hereby expressly incorporated by reference, in its entirety, into the present application.

BACKGROUND OF THE INVENTION

1. Field of the Invention

The present invention relates to a laminate and a window.

2. Description of the Related Art

In recent years, as the protection of privacy has become more important and in order to save energy by allowing the external light to selectively come into buildings or vehicles, there has been a demand for light control devices (referred to as light control systems as well) such as windows having a shutter function by which windows, partitions of rooms, and the like are in a white display state (referred to as a transmission mode as well) and a black display state (referred to as a light-blocking mode as well) switched with each other according to the time slot or the use.

JP2014-507676A describes a variable transmission device having a first patterned wavelength retarder, including a first uniform polarizer having a first polarization axis, a second uniform polarizer having a second polarization axis, and a plurality of first regions positioned between the first and second polarizers and constituted so as to change at least one of the light axis, the thickness, or the birefringence, and a second patterned wavelength retarder including a plurality of second regions positioned between the first and second polarizers and constituted so as to change at least one of the light axis, the thickness, or the birefringence, in which the first or second wavelength retarder is constituted so as to linearly move with respect to the other first or second wavelength retarder.

SUMMARY OF THE INVENTION

JP2014-507676A does not describe the phase difference in a front direction. As a result of examining the performance of the device described in JP2014-507676A, the inventors of the present invention have found that the brightness of the black display state in the front and in all directions cannot be reduced. That is, the inventors have found that depending on the directions along which the black display state is observed, serious light leakage occurs.

An object of the present invention is to provide a laminate in which a white display state and a black display state are switched with each other in a case where light is incident on the laminate and the brightness of the black display state is low in the front and in all directions.

In order to achieve the aforementioned object, the inventors of the present invention conducted an intensive examination. As a result, the inventors obtained knowledge that by disposing an optically anisotropic layer having specific optical characteristics in a laminate, which includes a first polarizer, a first patterned optical anisotropic layer, a second patterned optical anisotropic layer, and a second polarizer in this order and in which a white display state and a black display state are switched with each other, between the second polarizer and the second patterned optical anisotropic layer, it is possible to provide a laminate in which the white display state and the black display state are switched with each other in a case where light is incident on the laminate and the brightness of the black display state is low in the front and in all directions.

JP2014-507676A does not have a disclosure or a hint regarding the disposing of the optically anisotropic layer having specific optical characteristics between the second polarizer and the second patterned optical anisotropic layer.

The present invention as means for achieving the aforementioned object and preferable aspects of the present invention are as below.

[1] A laminate comprising a first polarizer, a first patterned optical anisotropic layer, a second patterned optical anisotropic layer, and a second polarizer in this order, and an optically anisotropic layer disposed between the second polarizer and the second patterned optical anisotropic layer; in which an angle formed between an absorption axis of the first polarizer and an absorption axis of the second polarizer is 90°±5°; each of the first patterned optical anisotropic layer and the second patterned optical anisotropic layer includes first phase difference regions and second phase difference regions which have different slow axis directions in a plane of the first patterned optical anisotropic layer or the second patterned optical anisotropic layer and alternate with each other, an angle formed between the slow axis direction of each of the first phase difference regions and the slow axis direction of each of the second phase difference regions is 90°±5°; a white display state, in which an angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 0°±5° and a transmittance obtained in a case where light incident on the first polarizer exits from the second polarizer is maximized, and a black display state, in which an angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 90°±5° and the transmittance obtained in a case where the light incident on the first polarizer exits from the second polarizer is minimized, are switched with each other; none of the slow axis directions of the first phase difference regions and the slow axis directions of the second phase difference regions are parallel or orthogonal to the absorption axes and transmission axes of the two sheets of polarizers; the optically anisotropic layer includes one layer or two or more layers, has an $Re\_off(550)$ of 240 to 310 nm at a wavelength of 550 nm in a direction of an azimuthal angle of 45° and a polar angle of 60° from a slow axis of the optically anisotropic layer, and has an $Rth\_off(550)$ of −50 to 50 nm at a wavelength of 550 nm in a direction of an azimuthal angle of 45° and a polar angle of 60° from the slow axis of the optically anisotropic layer; the $Re\_off(550)$ and the $Rth\_off(550)$ are values calculated from the Jones Matrix of the optically anisotropic layer at a wavelength of 550 nm in a direction of an azimuthal angle of 45° and a polar angle of 60° from the slow axis of the optically anisotropic layer; and the Jones Matrix of the optically anisotropic layer represents J calculated from Formula (ii) in a case where the optically anisotropic layer includes one layer and represents Jn*Jn−1*... *J2*J1 which is a product of the Jones Matrix calculated from Formula (i) in a case where the optically anisotropic layer includes two or more layers;

$$Pout=(Jn*Jn-1* \ldots *J2*J1)*Pin \qquad (i)$$

$$Pout=J*Pin \qquad (ii)$$

in Formulae (i) and (ii), Pout represents a final polarization state, Pin represents an incident polarization state, Jn represents the Jones Matrix of the nth layer in a case where the optically anisotropic layer includes two or more layers, J represents the Jones Matrix of the optically anisotropic layer in a case where the optically anisotropic layer includes one layer, and n represents an integer of equal to or greater than 2.

[2] In the laminate described in [1], it is preferable that a retardation Re1(550) of the first patterned optical anisotropic layer at a wavelength of 550 nm in an in-plane direction of the first patterned optical anisotropic layer and a retardation Re2(550) of the second patterned optical anisotropic layer at a wavelength of 550 nm in an in-plane direction of the second patterned optical anisotropic layer are each independently 110 to 135 nm and satisfy Formula (1).

$$Re2(550)=Re1(550)\pm 10 \text{ nm tm} \qquad (1)$$

[3] A laminate comprising a first polarizer, a first patterned optical anisotropic layer, a second patterned optical anisotropic layer, and a second polarizer in this order and an optically anisotropic layer disposed between the second polarizer and the second patterned optical anisotropic layer; an angle fanned between an absorption axis of the first polarizer and an absorption axis of the second polarizer is 90°±5°; each of the first patterned optical anisotropic layer and the second patterned optical anisotropic layer has three or more phase difference regions which have different slow axis directions in a plane of the first patterned optical anisotropic layer or the second patterned optical anisotropic layer and in which the slow axis directions continuously change; a white display state, in which an angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 45°±5° and a transmittance obtained in a case where light incident on the first polarizer exits from the second polarizer is maximized, and a black display state, in which an angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 90°±5° and the transmittance obtained in a case where the light incident on the first polarizer exits from the second polarizer is minimized, are switched with each other; the optically anisotropic layer includes one layer or two or more layers, has an Re_off(550) of 240 to 310 nm at a wavelength of 550 nm in a direction of an azimuthal angle of 45° and a polar angle of 60° from a slow axis of the optically anisotropic layer, and has an Rth_off(550) of −50 to 50 nm at a wavelength of 550 nm in a direction of an azimuthal angle of 45° and a polar angle of 60° from the slow axis of the optically anisotropic layer; the Re_off(550) and the Rth_off(550) are values calculated from the Jones Matrix of the optically anisotropic layer at a wavelength of 550 nm in a direction of an azimuthal angle of 45° and a polar angle of 60° from the slow axis of the optically anisotropic layer; and the Jones Matrix of the optically anisotropic layer represents J calculated from Formula (ii) in a case where the optically anisotropic layer includes one layer and represents Jn*Jn−1*... *J2*J1 which is a product of the Jones Matrix calculated from Formula (i) in a case where the optically anisotropic layer includes two or more layers;

$$Pout=(Jn*Jn-1* \ldots *J2*J1)*Pin \qquad (i)$$

$$Pout=J*Pin \qquad (ii)$$

in Formulae (i) and (ii), Pout represents a final polarization state, Pin represents an incident polarization state, Jn represents the Jones Matrix of the nth layer in a case where the optically anisotropic layer includes two or more layers, J represents the Jones Matrix of the optically anisotropic layer in a case where the optically anisotropic layer includes one layer, and n represents an integer of equal to or greater than 2.

[4] In the laminate described in [3], it is preferable that a retardation Re1(550) of the first patterned optical anisotropic layer at a wavelength of 550 nm in an in-plane direction of the first patterned optical anisotropic layer and a retardation Re2(550) of the second patterned optical anisotropic layer at a wavelength of 550 nm in an in-plane direction of the second patterned optical anisotropic layer are each independently 230 to 270 nm and satisfy Formula (1).

$$Re2(550)=Re1(550)\pm 10 \text{ nm} \qquad (1)$$

[5] In the laminate described in any one of [1] to [4], it is preferable that the retardation Re1(550) of the first patterned optical anisotropic layer at a wavelength of 550 nm in the in-plane direction of the first patterned optical anisotropic layer, a retardation Rth1(550) of the first patterned optical anisotropic layer at a wavelength of 550 nm in a film thickness direction of the first patterned optical anisotropic layer, the retardation Re2(550) of the second patterned optical anisotropic layer at a wavelength of 550 nm in the in-plane direction of the second patterned optical anisotropic layer, and a retardation Rth2(550) of the second patterned optical anisotropic layer at a wavelength of 550 nm in a film thickness direction of the second patterned optical anisotropic layer satisfy Formula (1) and Formula (2).

$$Re2(550)=Re1(550)\pm 10 \text{ nm} \qquad (1)$$

$$Rth2(550)=-Rth1(550)\pm 10 \text{ nm} \qquad (2)$$

[6] In the laminate described in any one of [1] to [5], it is preferable that a combination of the first patterned optical anisotropic layer and the second patterned optical anisotropic layer is a combination of a +A-plate and a -A-plate.

[7] In the laminate described in any one of [1] to [6], it is preferable that both the first patterned optical anisotropic layer and the second patterned optical anisotropic layer have normal wavelength dispersion, reciprocal wavelength dispersion, or flat dispersion as wavelength dispersion of the retardation Re in the in-plane direction, and both the first patterned optical anisotropic layer and the second patterned optical anisotropic layer have normal wavelength dispersion, reciprocal wavelength dispersion, or flat dispersion as wavelength dispersion of the retardation Rth in the film thickness direction.

[8] In the laminate described in any one of [1] to [7], it is preferable that both the first patterned optical anisotropic layer and the second patterned optical anisotropic layer have the normal wavelength dispersion as the wavelength dispersion of the retardation Re in the in-plane direction, and both the first patterned optical anisotropic layer and the second patterned optical anisotropic layer have normal wavelength dispersion as the wavelength dispersion of the retardation Rth in the film thickness direction.

[9] In the laminate described in any one of [1] to [8], it is preferable that the first patterned optical anisotropic layer and the second patterned optical anisotropic layer contain a liquid crystal compound.

[10] A window comprising the laminate described in any one of [1] to [9].

According to the present invention, it is possible to provide a laminate in which a white display state and a black display state are switched with each other in a case where light is incident on the laminate and the brightness of the black display state is low in the front and in all directions.

DESCRIPTION OF THE PREFERRED EMBODIMENTS

Figure 1:
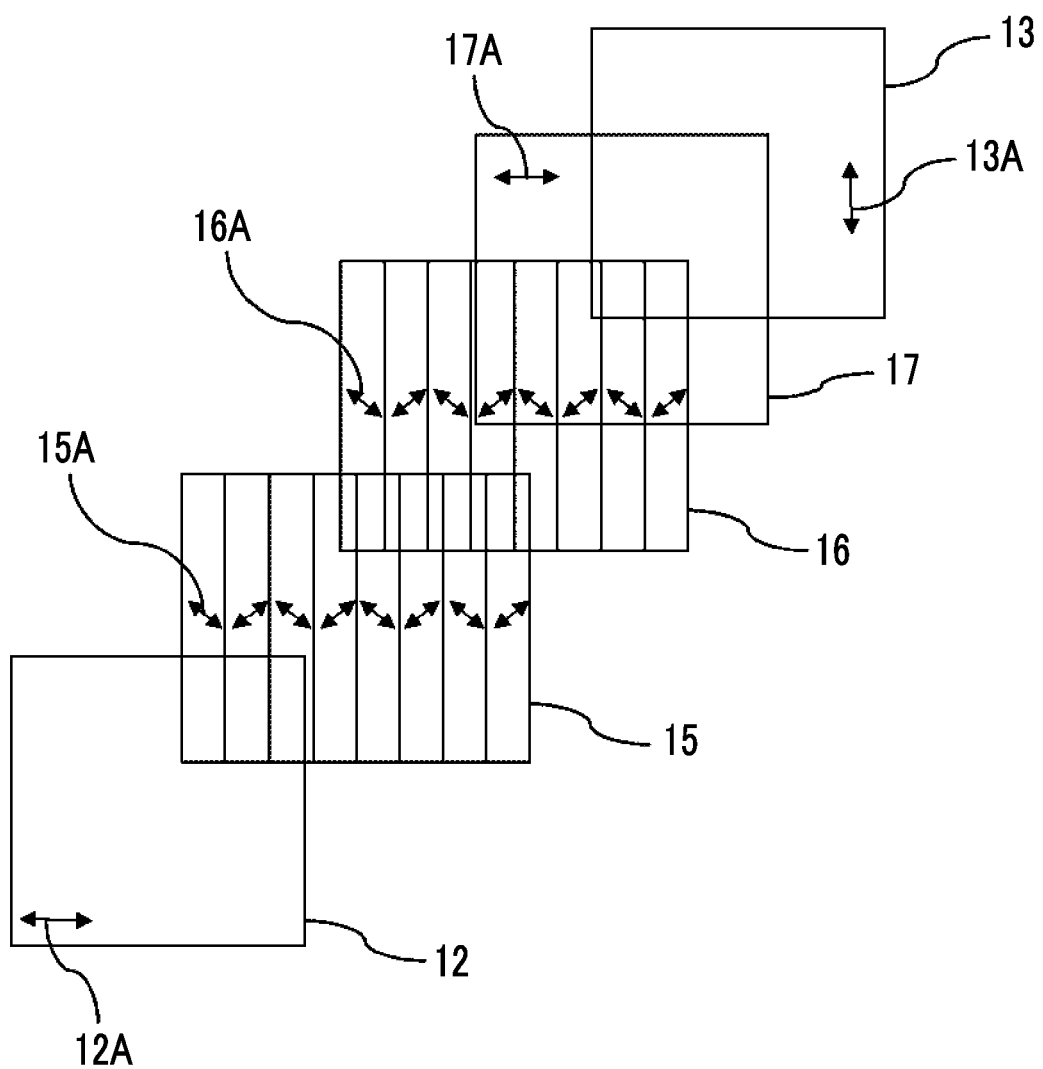
FIG. 1 is a perspective exploded view relating to an example of a first aspect of a laminate of the present invention.

Hereinafter, the present invention will be specifically described. The following constituents will be described based on typical embodiments of the present invention in some cases, but the present invention is not limited to the embodiments. In the present specification, a range of numerical values described using "to" means a range including the numerical values listed before and after "to" as a lower limit and an upper limit respectively.

In the present specification, Re($\lambda$) represents an in-plane retardation at a wavelength $\lambda$, and Rth($\lambda$) represents a retardation in a thickness direction at a wavelength $\lambda$. The unit of Re($\lambda$) and Rth($\lambda$) is nm. Re($\lambda$) is measured by causing light having a wavelength of $\lambda$ nm to be incident on a film in a normal direction of the film in KOBRA 21A DH or WR (manufactured by Oji Scientific Instruments). At the time of selecting the wavelength $\lambda$ nm used for the measurement, by manually replacing a wavelength selective filter or changing the measurement values by using a program or the like, the wavelength can be measured. In a case where the film to be measured is represented by a uniaxial or biaxial optical indicatrix, Rth($\lambda$) is calculated by the method described below. This measurement method is also partially used for measuring an average tilt angle of disk-like liquid crystal molecules in an optically anisotropic layer, which will be described later, of an alignment layer side and measuring the average tilt angle of the opposite side.

For measuring Rth($\lambda$), an in-plane slow axis (determined by KOBRA 21A DH or WR) is regarded as an axis of inclination (rotation axis) (in a case where no slow axis exists, any direction within the plane of a film is regarded as a rotation axis), and light having a wavelength of $\lambda$ nm is caused to be incident on the film in a direction which inclines stepwise up to 50° to one side by 10° from the normal direction of the film. In this way, Re($\lambda$) is measured at six spots in total, and KOBRA 21A DH or WR calculates Rth($\lambda$) based on the measured retardation values, the assumptive value of an average refractive index, and the input value of film thickness. In the aforementioned method, in a case where a film is used in which a retardation value becomes zero along a certain direction at an angle of inclination about the in-plane slow axis as the rotation axis in the normal direction, the sign of the retardation value at an angle of inclination larger than the aforementioned angle of inclination is changed to a negative sign, and then KOBRA 21A DH or WR calculates Rth ($\lambda$). Herein, retardation values can be measured in any two inclined directions about the slow axis as the axis of inclination (rotation axis) (in a case where no slow axis exists, any direction within the plane of the film is used as a rotation axis), and based on the values, the assumptive value of an average refractive index, and the input value of film thickness, Rth can be calculated from Formula (A) and Formula (B).

$$Re(\theta) = \left[ nx - \frac{ny \times nz}{\sqrt{\left\{ny \sin\left(\sin^{-1}\left(\frac{\sin(-\theta)}{nx}\right)\right)\right\}^2 + \left\{nz \cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \quad \text{Formula (A)}$$

In the formula, Re($\theta$) represents a retardation value in a direction inclining at an angle of $\theta$ from the normal direction. In Formula (A), nx represents a refractive index in the slow axis direction within the plane, ny represents a refractive index in a direction orthogonal to nx within the plane, and nz represents a refractive index in a direction orthogonal to nx and ny. d represents a film thickness.

$$Rth=((nx+ny)/2-nz) \times d \quad \text{Formula (B)}$$

In a case where the film to be measured is a film which cannot be expressed as a uniaxial or biaxial optical indicatrix and does not have a so-called optic axis, Rth($\lambda$) is calculated by the method described below. For obtaining Rth($\lambda$), an in-plane slow axis (determined by KOBRA 21A DH or WR) is regarded as an axis of inclination (rotation axis), and light having a wavelength of $\lambda$ nm is caused to be incident on a film in a direction inclining stepwise up to +50° from −50° by 10° with respect to the normal direction of the film. In this way, the aforementioned Re($\lambda$) is measured at 11 spots in total, and based on the measured retardation values, the assumptive value of an average refractive index, and the input value of film thickness, KOBRA 21A DH or WR calculates Rth ($\lambda$). In the measurement described above, as the hypothetical average refractive index, it is possible to use values listed in Polymer Handbook (JOHN WILEY & SONS, INC) and in catalogues of various optical films. For the film whose average refractive index is not known, the average refractive index can be measured using an Abbe refractometer. For example, the values of the average refractive indices of main optical films are as below: cellulose acylate film (1.48), cycloolefin polymer (1.52), polycarbonate (1.59), polymethyl methacrylate (1.49), polystyrene (1.59). In a case where these assumptive values of average refractive index and the film thickness are input into KOBRA 21A DH or WR, the device calculates nx, ny, and nz. From the calculated nx, ny, and nz, Nz=(nx−nz)/(nx−ny) is additionally calculated.

Re_off(550) and Rth_off(550), which will be described later, can be measured by the method described below.

The measurement device is not particularly limited, and for example, Axometry (manufactured by Axometrics, Inc) can be used.

Based on the slow axis direction of the optically anisotropic layer detected by the aforementioned measurement device, the film including the optically anisotropic layer is rotated 45° in the direction of the azimuthal angle, and the Jones Matrix (hereinafter, described as JM) of the optically anisotropic layer at a polar angle of 60° and a wavelength of 550 nm is measured from a polar angle of 60°.

From JM of the optically anisotropic layer, the rotation amount and the center of rotation in the Poincare sphere are ascertained. That is, an incident polarization state Pin and a final polarization state Pout, which will be described later, have a relationship of Pout=JM*Pin. In a case where the optically anisotropic layer includes two or more layers, the Jones Matrix of the optically anisotropic layer is determined by a method which will be described later, and then a single layer of optically anisotropic layer having optical characteristics equivalent to JM of the optically anisotropic layer is assumed.

The center of rotation on the Poincare sphere that is found in a case where the optically anisotropic layer includes one layer or the center of rotation of the aforementioned assumptive single layer of optically anisotropic layer that is found on the Poincare sphere in a case where the optically anisotropic layer includes two or more layers must be on a plane (on the equator of the Poincare sphere) formed by a Stokes parameter 1 (linear polarization component at 0, 90°) S1 and a Stokes parameter 2 (linear polarization component at 45, 135°) S2. Assuming that Pin is linearly polarized light at measurement angles (in the present specification, a polar angle of 60° C. and an azimuthal angle of 45° based on the slow axis direction of the optically anisotropic layer), a rotation amount necessary for establishing Pout is ascertained.

The rotation amount corresponds to the retardation at the measurement angles. By the methods described in Fundamentals of Polarized Light: A Statistical Optics Approach and the like, Re_off and Rth_off of the optically anisotropic layer can be determined.

In the present specification, "absorption axis" and "transmission axis" of a polarizer or a polarizing plate mean directions that intersect at an angle of 90°.

In the present specification, "slow axis" of a phase difference film or the like means a direction along which a refractive index is maximized.

In the present specification, the numerical values, the range of numerical values, and the qualitative expressions (for example, expressions such as "equivalent" and "same") showing the optical characteristics of various members such as a phase difference region, a phase difference film, and a liquid crystal layer are interpreted as showing the numerical values including generally accepted errors, the range of numerical values, and the properties of liquid crystal display devices or members used in the devices.

In the present specification, "front" means a normal direction with respect to a display surface.

In the present specification, unless otherwise specified, a measurement wavelength is 550 nm.

In the present specification, an angle (for example, an angle of "90°" or the like) and an angular relationship (for example, "orthogonal", "parallel", "intersecting at 45°", or the like) includes a margin of error acceptable in the technical field to which the present invention belongs. For example, the aforementioned angle may be within a range less than an accurate angle±10°. The difference between the angle and an accurate angle is preferably equal to or smaller than±5°, and more preferably equal to or smaller than±3°.

The vertical alignment of a disk-like liquid crystal compound means that the disk-like liquid crystal compound is aligned such that the plane of the compound forms a polar angle of 0° with respect to a support. The direction of a director of the vertically aligned disk-like liquid crystal compound is parallel to the support.

The horizontal alignment of a disk-like liquid crystal compound means that the disk-like liquid crystal compound is aligned in a state where the plane of the disk-like liquid crystal compound is parallel to the support. The direction of a director of the horizontally aligned disk-like liquid crystal compound is perpendicular to the support.

In a case where at least two sheets of patterned optical anisotropic layers are formed by the vertical alignment of a disk-like liquid crystal compound, the angle thereof may vary within a range of±15°. In the present invention, the alignment state can be checked using Axo Scan (OPMF-1, manufactured by Axometrics, Inc).

[Laminate]

A first aspect of the laminate of the present invention is a laminate including a first polarizer, a first patterned optical anisotropic layer, a second patterned optical anisotropic layer, and a second polarizer in this order, and an optically anisotropic layer disposed between the second polarizer and the second patterned optical anisotropic layer; in which an angle formed between an absorption axis of the first polarizer and an absorption axis of the second polarizer is 90°±5°; each of the first patterned optical anisotropic layer and the second patterned optical anisotropic layer includes first phase difference regions and second phase difference regions which have different slow axis directions in a plane of the first patterned optical anisotropic layer or the second patterned optical anisotropic layer and alternate with each other, an angle formed between the slow axis direction of each of the first phase difference regions and the slow axis direction of each of the second phase difference regions is 90°±5°; a white display state, in which an angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 0°±5° and a transmittance obtained in a case where light incident on the first polarizer exits from the second polarizer is maximized, and a black display state, in which an angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 90°±5° and the transmittance obtained in a case where the light incident on the first polarizer exits from the second polarizer is minimized, are switched with each other; none of the slow axis directions of the first phase difference regions and the slow axis directions of the second phase difference regions are parallel or orthogonal to the absorption axes and transmission axes of the two sheets of polarizers; the optically anisotropic layer includes one layer or two or more layers, has an Re_off(550) of 240 to 310 nm at a wavelength of 550 nm in a direction of an azimuthal angle of 45° and a polar angle of 60° from a slow axis of the optically anisotropic layer, and has an Rth_off(550) of −50 to 50 nm at a wavelength of 550 nm in a direction of an azimuthal angle of 45° and a polar angle of 60° from the slow axis of the optically anisotropic layer; the Re_off(550) and the Rth_off(550) are values calculated from the Jones Matrix of the optically anisotropic layer at a wavelength of 550 nm in a direction of an azimuthal angle of 45° and a polar angle of 60° from the slow axis of the optically anisotropic layer; and the Jones Matrix of the optically anisotropic layer represents J calculated from Formula (ii) in a case where the optically anisotropic layer includes one layer and represents Jn*Jn−1*...*J2*J1 which is a product of the Jones Matrix calculated from Formula (i) in a case where the optically anisotropic layer includes two or more layers;

$$Pout=(Jn*Jn-1*\ldots *J2*J1)*Pin \quad (i)$$

$$Pout=J*Pin \quad (ii)$$

in Formulae (i) and (ii), Pout represents a final polarization state, Pin represents an incident polarization state, Jn represents the Jones Matrix of the nth layer in a case where the optically anisotropic layer includes two or more layers, J represents the Jones Matrix of the optically anisotropic layer in a case where the optically anisotropic layer includes one layer, and n represents an integer of equal to or greater than 2.

A second aspect of the laminate of the present invention is a laminate including a first polarizer, a first patterned optical anisotropic layer, a second patterned optical anisotropic layer, and a second polarizer in this order and an optically anisotropic layer disposed between the second polarizer and the second patterned optical anisotropic layer; an angle formed between an absorption axis of the first polarizer and an absorption axis of the second polarizer is 90°±5°; each of the first patterned optical anisotropic layer and the second patterned optical anisotropic layer has three or more phase difference regions which have different slow axis directions in a plane of the first patterned optical anisotropic layer or the second patterned optical anisotropic layer and in which the slow axis directions continuously change; a white display state, in which an angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 45°±5° and a transmittance obtained in a case where light incident on the first polarizer exits from the second polarizer is maximized, and a black display state, in which an angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 90°±5° and the transmittance obtained in a case where the light incident on the first polarizer exits from the second polarizer is minimized, are switched with each other; and the optically anisotropic layer includes one layer or two or more layers, has an Re_off(550) of 240 to 310 nm at a wavelength of 550 nm, and has an Rth_off(550) of −50 to 50 nm at a wavelength of 550 nm.

The matters common to the first aspect of the laminate of the present invention and the second aspect of the laminate of the present invention will be collectively described as the laminate of the present invention.

Figure 3:
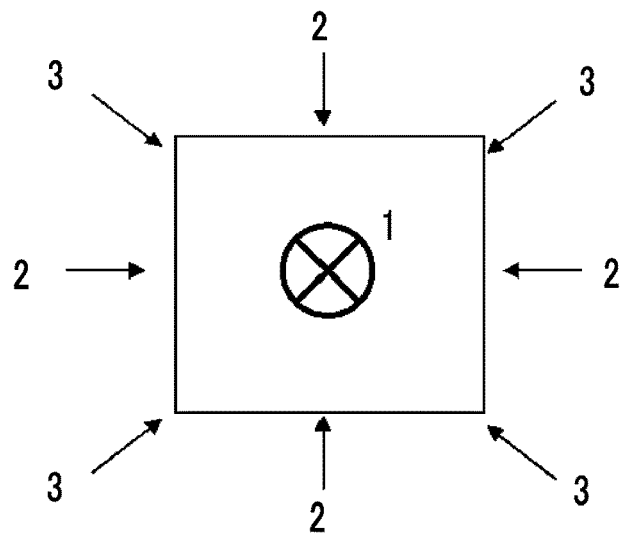
FIG. 3 is a schematic view illustrating a front direction, an oblique on-axis direction, and an oblique off-axis direction of the laminate.

Due to the constitutions of the laminate of the present invention, in the laminate of the present invention, the white display state and the black display state are switched with each other in a case where light is incident on the laminate, and the brightness of the black display state is low in the front and in all directions. FIG. 3 is a schematic view illustrating a front direction, an oblique on-axis direction, and an oblique off-axis direction of the laminate. The state where the brightness of the black display state is low in the front and in all directions means that the brightness of the black display state is low in a case where light is incident on the laminate and the black display state is observed in a front direction 1 of the laminate, the brightness of the black display state is low in a case where the black display state is observed in an oblique on-axis direction 2 (azimuthal angles of 0°, 90°, 180°, and 270°) of the laminate, and the brightness of the black display state is low in a case where the black display state is observed in an oblique off-axis direction 3 of the laminate (in a case where the azimuthal angle is not 0°, 90°, 180°, and 270°).

In the laminate of the present invention, by moving each of the patterned optical anisotropic layers, the combination of the laminated phase difference regions of the patterned optical anisotropic layers can be changed. Accordingly, the sum of phase differences (rotatory polarization) of at least two sheets of patterned optical anisotropic layers changes, and as a result, it is possible to control the transmittance of light that is incident on one polarizer of the laminate and exits the other polarizer of the laminate.

<Constitution>

Figure 2:
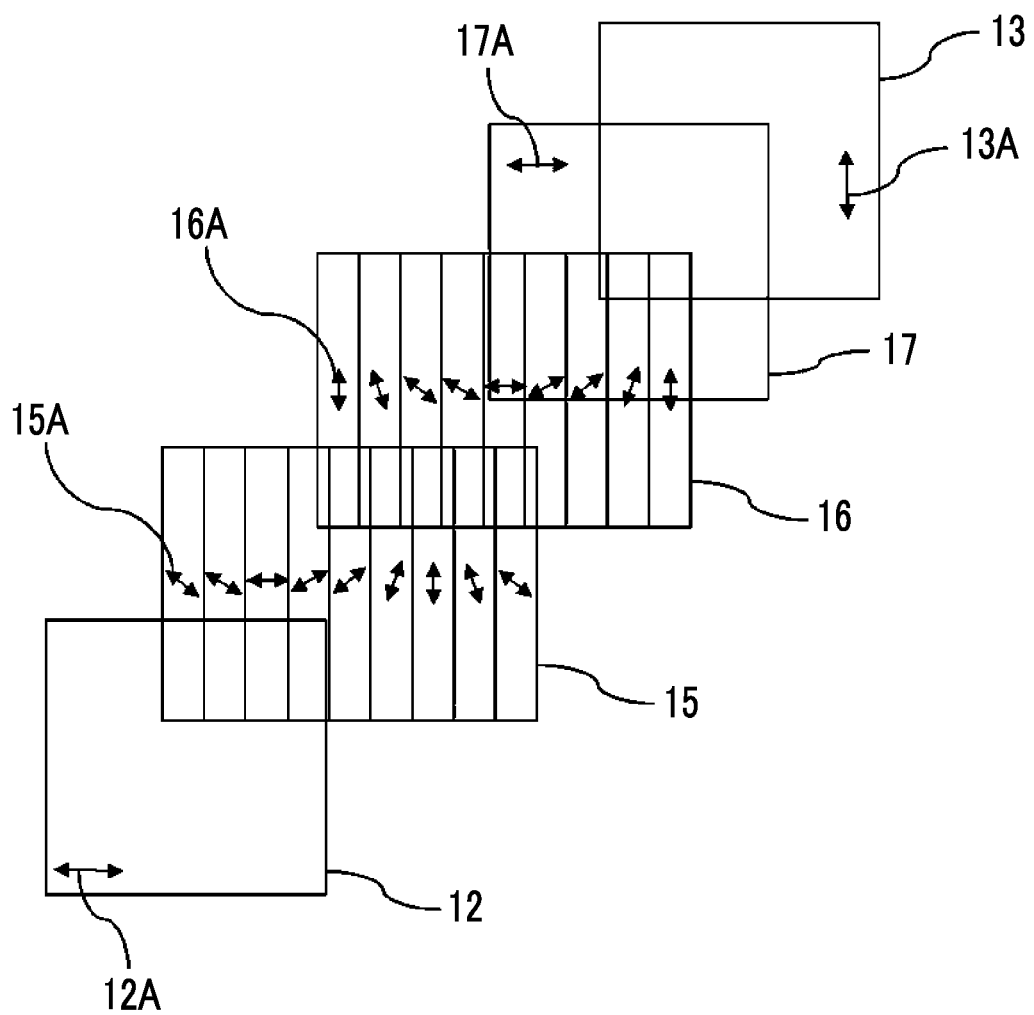
FIG. 2 is a perspective exploded view relating to an example of a second aspect of the laminate of the present invention.

FIGS. 1 and 2 are perspective exploded views of an example of the laminate of the present invention. The example of the laminate of the present invention shown in FIGS. 1 and 2 includes a first polarizer 12, a first patterned optical anisotropic layer 15, a second patterned optical anisotropic layer 16, and a second polarizer 13 in this order and an optically anisotropic layer 17 disposed between the second polarizer 13 and the second patterned optical anisotropic layer 16.

In the example of the laminate of the present invention shown in FIGS. 1 and 2, an angle formed between an absorption axis 12A of the first polarizer and an absorption axis 13A of the second polarizer is 90°±5°.

In the laminate of the present invention, in a case where the optically anisotropic layer 17 is disposed between the second polarizer 13 and the second patterned optical anisotropic layer 16 in the laminate of the present invention, the loss of light can be compensated in the oblique off-axis direction. Accordingly, the light leakage can be further inhibited than in a case where the optically anisotropic layer 17 is disposed between the first patterned optical anisotropic layer 15 and the second patterned optical anisotropic layer 16, and the brightness of the black display state can be further reduced in all directions.

In the laminate of the present invention, any of the first polarizer and the second polarizer may be on the viewing side. Accordingly, the optically anisotropic layer is disposed between the second polarizer and the second patterned optical anisotropic layer. However, an aspect, in which the optically anisotropic layer is disposed between the first polarizer and the first patterned optical anisotropic layer, is substantially also included in the laminate of the present invention.

The relative relationship between the layers in terms of the position and/or the size shown in the perspective exploded views does not reflect an actual relative relationship. The same shall be applied to all the drawings.

As long as the gist of the present invention is not impaired, the laminate of the present invention may have a support not shown in the drawing, an alignment film not shown in the drawing, an adhesive layer or a pressure sensitive adhesive layer not shown in the drawing, and the like between each of the members. The pressure sensitive adhesive is not particularly limited, and an adhesive may be used. Examples of usable pressure sensitive adhesives include a rubber-based pressure sensitive adhesive, an acrylic pressure sensitive adhesive, a silicone-based pressure sensitive adhesive, a urethane-based pressure sensitive adhesive, a vinyl alkyl ether-based pressure sensitive adhesive, a polyvinyl alcohol-based pressure sensitive adhesive, a polyvinyl pyrrolidone-based pressure sensitive adhesive, a polyacrylamide-based pressure sensitive adhesive, a cellulose-based pressure sensitive adhesive, and the like.

(Constitution of First Aspect)

FIG. 1 is a perspective exploded view relating to an example of a first aspect of the laminate of the present invention.

In the example of the first aspect of the laminate of the present invention shown in FIG. 1, each of the first patterned optical anisotropic layer 15 and the second patterned optical anisotropic layer 16 have the first phase difference region and the second phase difference region which have different slow axis directions in the plane thereof and alternate with each other, and an angle formed between the slow axis direction of each of the first phase difference regions and the slow axis direction of each of the second phase difference regions is 90°±5°. In FIG. 1, the first patterned optical anisotropic layer 15 has stripe-shaped first phase difference regions and second phase difference regions which alternate with each other and in which slow axis directions 15A of the first patterned optical anisotropic layer are different from each other and alternate with each other, and the angle formed between the slow axis direction of each of the first phase difference regions and the slow axis direction of each of the second phase difference regions is 90°±5°. Similarly, the second patterned optical anisotropic layer 16 has stripe-shaped first phase difference regions and second phase difference regions which alternate with each other and in which slow axis directions 16A of the second patterned optical anisotropic layer are different from each other, and an angle formed between the slow axis direction of each of the first phase difference regions and the slow axis direction of each of the second phase difference regions is 90°±5°. The number of first phase difference regions and second phase difference regions (the number of repeating phase difference regions) is not particularly limited, but is preferably 1 to 1,000, more preferably 2 to 100, and particularly preferably 3 to 50.

In the example of the first aspect of the laminate of the present invention shown in FIG. 1, a white display state can be established in which an angle formed between the slow axis direction of each of the phase difference regions of the first patterned optical anisotropic layer 15 and the slow axis direction of each of the phase difference regions of the second patterned optical anisotropic layer 16 that is superposed on each of the phase difference regions of the first patterned optical anisotropic layer 15 is 0°±5°, and the transmittance obtained in a case where light incident on the first polarizer 12 exits from the second polarizer 13 is maximized. For example, in FIG. 1, the phase difference regions of the first patterned optical anisotropic layer 15 and the phase difference regions of the second patterned optical anisotropic layer 16 have the same width. At this time, in a case where the slow axis of the first phase difference region of the second patterned optical anisotropic layer 16 that is at the left end of the page is superposed on the slow axis of the first phase difference region of the first patterned optical anisotropic layer 15 that is at the left end of the page, an angle formed between the slow axis of each of the phase difference regions of the first patterned optical anisotropic layer 15 and the slow axis direction of each of the phase difference regions of the second patterned optical anisotropic layer 16 that is superposed on each of the phase difference regions of the first patterned optical anisotropic layer 15 is 0°±5°.

In the example of the first aspect of the laminate of the present invention shown in FIG. 1, the white display state can be switched with a black display state in which an angle formed between the slow axis direction of each of the phase difference regions of the first patterned optical anisotropic layer 15 and the slow axis direction of each of the phase difference regions of the second patterned optical anisotropic layer 16 that is superposed on each of the phase difference regions of the first patterned optical anisotropic layer 15 is 90°±5°, and the transmittance obtained in a case where light incident on the first polarizer 12 exits from the second polarizer 13 is minimized. For example, in FIG. 1, the phase difference regions of the first patterned optical anisotropic layer 15 and the phase difference regions of the second patterned optical anisotropic layer 16 have the same width. At this time, in a case where the slow axis of the second phase difference region, which is the second region from the left end of the page, of the second patterned optical anisotropic layer 16 is superposed on the slow axis of the first phase difference region of the first patterned optical anisotropic layer 15 that is at the left end of the page, the angle formed between the slow axis direction of each of the phase difference regions of the first patterned optical anisotropic layer 15 and the slow axis direction of each of the phase difference regions of the second patterned optical anisotropic layer 16 that is superposed on each of the phase difference regions of the first patterned optical anisotropic layer 15 is 90°±5°. It is preferable that the white display state and the black display state are switched with each other by an operation in which any of the patterned optical anisotropic layers is caused to slide by the width of each of the phase difference regions of the patterned optical anisotropic layer. The laminate of the present invention may have a mechanism for sliding described above. For example, in FIG. 1, it is preferable to provide a mechanism (not shown in the drawing) which can make a sliding movement by the width of each of the first phase difference regions of the first patterned optical anisotropic layer 15.

In the example of the first aspect of the laminate of the present invention shown in FIG. 1, none of the slow axis direction of the first phase difference regions and the slow axis direction of the second phase difference regions are parallel or orthogonal to the absorption axes (for example, the absorption axis 12A of the first polarizer and the absorption axis 13A of the second polarizer) and transmission axes (for example, a transmission axis of the first polarizer not shown in the drawing and a transmission axis 13B of the first polarizer) of the two sheets of polarizers. Regarding the relationship between the in-plane slow axis direction of each of the phase difference regions of the first (or second) patterned optical anisotropic layer and the absorption axis of the first (or second) polarizer, the angle formed between the in-plane slow axis direction and the absorption axis is preferably ±35° to ±55°, more preferably ±40° to ±45°, and particularly preferably ±45°.

Figure 4:
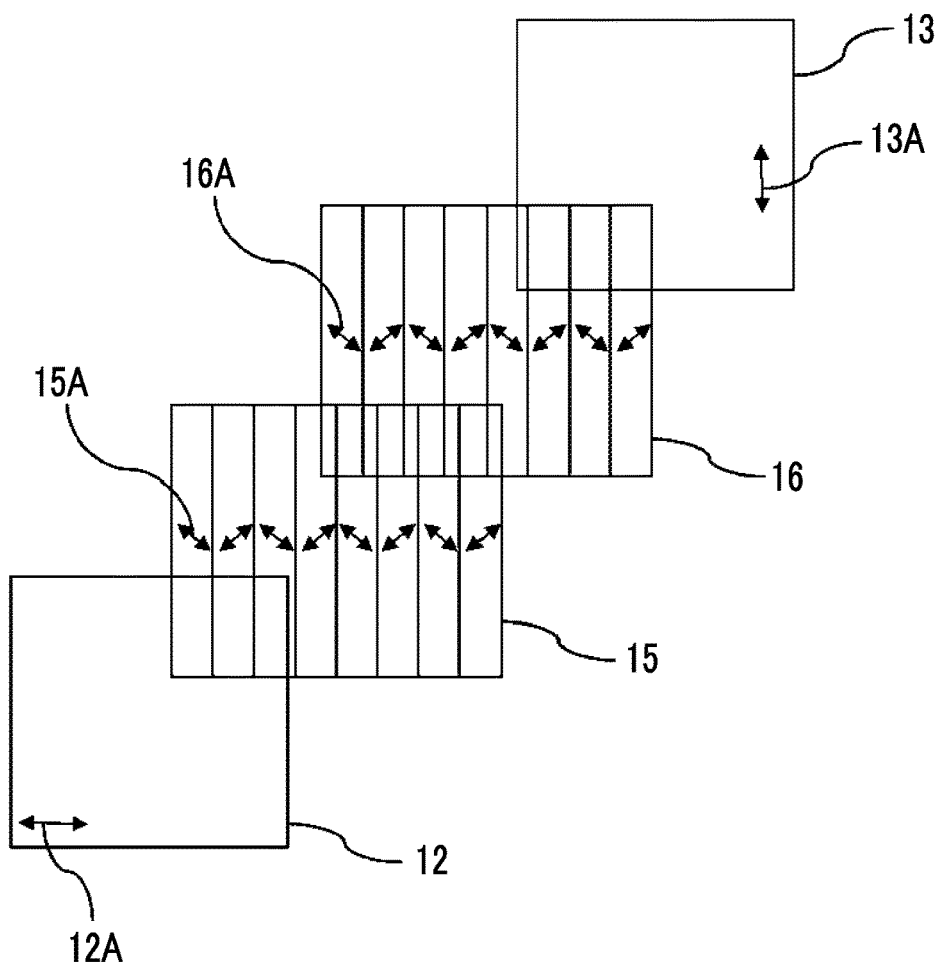
FIG. 4 is a perspective exploded view of an example of a laminate without an optically anisotropic layer.
Figure 5:
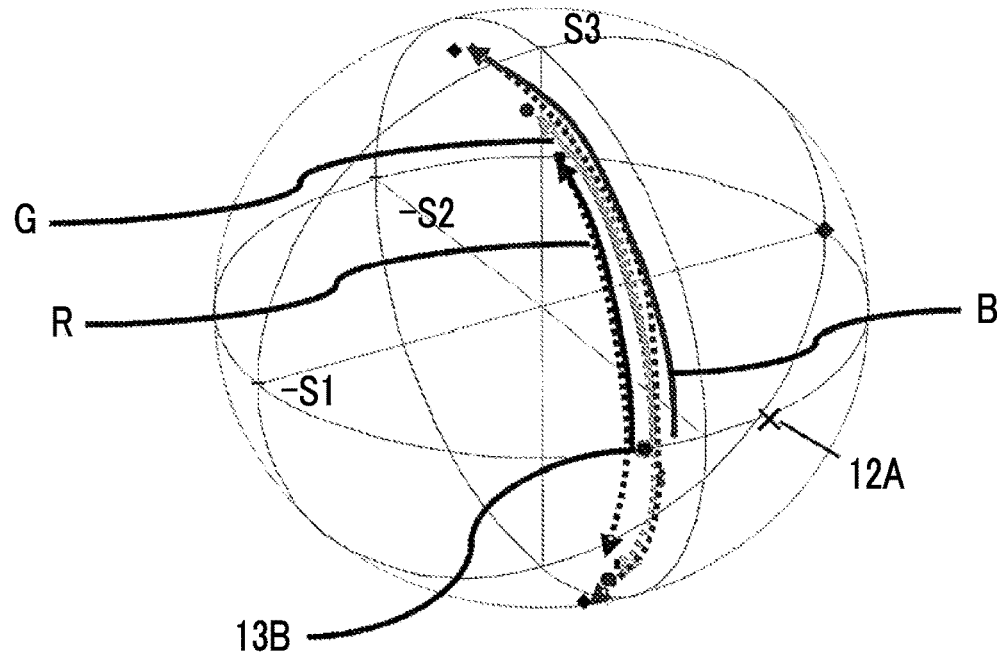
FIG. 5 is a schematic view illustrating one of the reasons why the brightness of a black display state on an oblique off-axis is not reduced in an example of the laminate without an optically anisotropic layer, by using the Poincare sphere.
Figure 6:
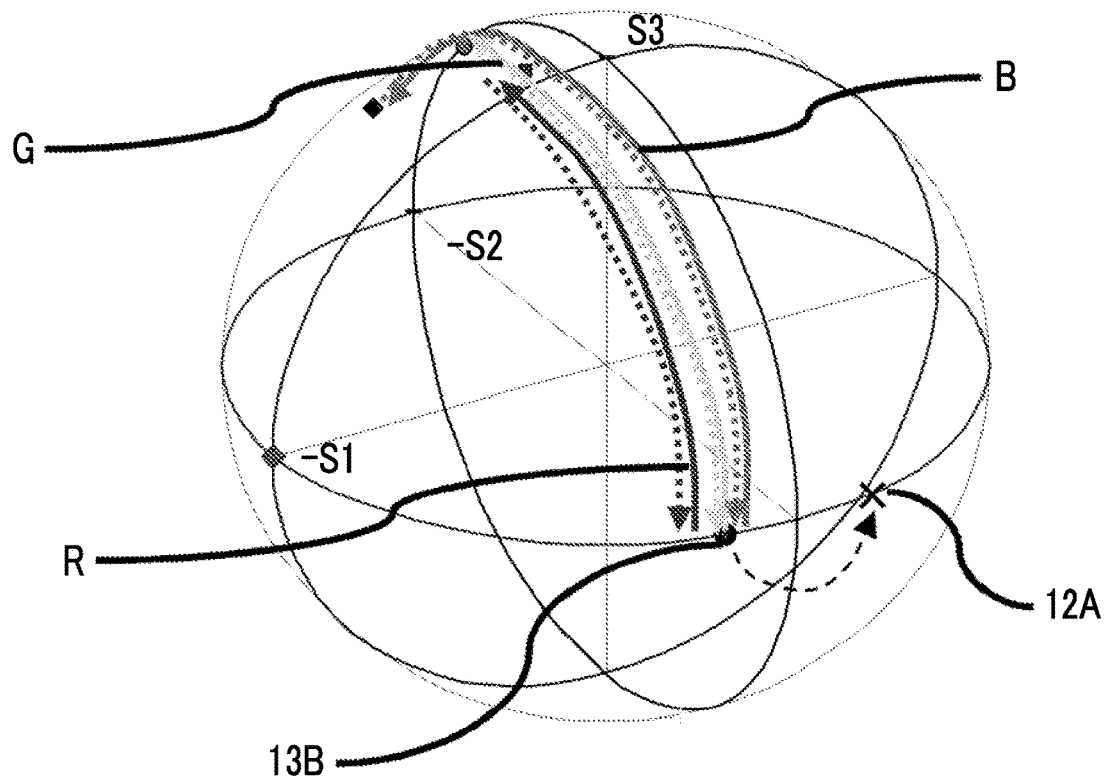
FIG. 6 is a schematic view illustrating another reason why the brightness of the black display state on the oblique off-axis is not reduced in an example of the laminate without an optically anisotropic layer, by using the Poincare sphere.

FIG. 4 is a perspective exploded view of an example of a laminate without an optically anisotropic layer. In a case where an optically anisotropic layer having specific optical characteristics is not provided between the second polarizer and the second patterned optical anisotropic layer, that is, in the laminate constituted as shown in FIG. 4, light leakage more seriously occurs at the time of observing the black display state in the oblique off-axis direction 3 in FIG. 3, than in the laminate of the present invention. FIG. 5 is a schematic view illustrating one of the reasons why the brightness of the black display state on the oblique off-axis is not reduced in the example of the laminate without an optically anisotropic layer (for example, the laminate having a constitution shown in FIG. 4) by using the Poincare sphere. FIG. 5 shows an example in which the black display state is observed in the oblique off-axis direction 3 in FIG. 3 in a case where both the first patterned optical anisotropic layer 15 and the second patterned optical anisotropic layer 16 are +A-plates having normal wavelength dispersion. In FIG. 5, even if Rth of the first patterned optical anisotropic layer 15 and Rth of the second patterned optical anisotropic layer 16 has the same sign; the first and second patterned optical anisotropic layer 15 and 16 have the same type of wavelength dispersion; and the absolute values of Rth of the first and second patterned optical anisotropic layer 15 and 16 are the same as each other, the rotation amounts are different while the rotation axes are the same. Accordingly, the light (red light, green light, and blue light in this order from the left on the page) incident on the transmission axis 13B of the second polarizer does not completely return to the absorption axis 12A of the first polarizer, and serious light leakage occurs. FIG. 6 shows an example in which the black display state of the laminate having the constitution shown in FIG. 4 is observed in the oblique off-axis direction 3 in FIG. 3 in a case where the first patterned optical anisotropic layer 15 is a +A-plate having normal wavelength dispersion, and the second patterned optical anisotropic layer 16 is a −A-plate having normal wavelength dispersion. It is understood that, in FIG. 6, even if Rth of the first patterned optical anisotropic layer 15 and Rth of the second patterned optical anisotropic layer 16 have different signs; the first and second patterned optical anisotropic layers 15 and 16 have the same type of wavelength dispersion; and the absolute values of Rth of the first and second patterned optical anisotropic layers 15 and 16 are the same as each other, the rotation axes and the rotation amounts are the same, but the lights (in FIGS. 5 and 6, red light R, green light G, and blue light B in this order from the left on the page) incident on the transmission axis 13B of the second polarizer do not reach the absorption axis 12A of the first polarizer which is an extinction point. In FIGS. 5 and 6, S1 represents a Stokes parameter 1 (linear polarization components at 0, 90°, S2 represents a Stokes parameter 2 (linear polarization component at 45, 135°, and S3 represents a Stokes parameter 3 (circular polarization component).

In contrast, in the laminate of the present invention, the optically anisotropic layer having specific optical characteristics is disposed between the second polarizer and the second patterned optical anisotropic layer. Therefore, by compensating the polarizing plate in the direction of the arrows with broken lines returning to the absorption axis 12A of the first polarizer in FIG. 6, it is possible to reduce the light leakage that occurs in a case where the black display state is observed in the oblique off-axis direction 3 in FIG. 3. Consequently, in the laminate of the present invention, the brightness of the black display state is reduced in the front and in all directions. Although the aforementioned mechanism has been described based on the first aspect of the present invention, the mechanism is also applied to the second aspect of the present invention.

In the laminate of the present invention, the white display state preferably has an excellent tint, and more preferably has an excellent tint in the front and in all directions. Furthermore, in the laminate of the present invention, the black display state preferably has an excellent tint, and more preferably has an excellent tint in the front and in all directions. As a result of conducting an examination, the inventors of the present invention have found that the constitution in JP2014-507676 also has a problem in that tinting occurs in the white display state and the black display state in the front. Furthermore, the inventors have found that in a case where an attempt is made to reduce the brightness of the black display state in the front and in all directions, the tint of the white display state and the black display state in the front deteriorates, and it is difficult to simultaneously resolve the problem of the tint of the white display state and the black display state in the front and the problem of the brightness of the black display state in the front and in all directions. Therefore, by conducting an examination described below, the inventors have found that it is possible to simultaneously resolve the problem of the tint of the white display state and the black display state in the front and the problem of the brightness of the black display state in the front and in all directions.

The inventors expected that in a case where the white display state of the first aspect of the laminate of the present invention is observed in the front direction 1 in FIG. 3, from the viewpoint of the tint of the white display state, it is preferable that Re of both the first patterned optical anisotropic layer 15 and the second patterned optical anisotropic layer 16 has reciprocal wavelength dispersion, because then the first patterned optical anisotropic layer and the second patterned optical anisotropic layer may function as a λ/4 plate in a wide wavelength range. Furthermore, the inventors expected that in a case where Re of the first patterned optical anisotropic layer 15 and Re of second patterned optical anisotropic layer 16 is a combination of reciprocal wavelength dispersion and normal wavelength dispersion, particularly the light of a short wavelength such as blue light may go beyond the equator on the Poincare sphere, and hence the tint of the white display state may become slightly yellowish. In addition, the inventors expected that in a case where Re of the first patterned optical anisotropic layer 15 and the second patterned optical anisotropic layer 16 is a combination of normal wavelength dispersion and normal wavelength dispersion, the yellow tint of the white display state may become darker. The inventors expected that the trend of the change in tint that is shown in a case where the white display state is observed in the front direction 1 in FIG. 3 may also be shown in a case where the white display state of the laminate of the present invention is observed in the oblique on-axis direction 2 and the oblique off-axis direction 3 in FIG. 3.

The black display state of the first aspect of the laminate of the present invention may be observed in the front direction 1 in FIG. 3. At this time, provided that the absolute value of Re of the first patterned optical anisotropic layer 15 is approximately the same as the absolute value of Re of the second patterned optical anisotropic layer 16, and that Re enables the first and second patterned optical anisotropic layers 15 and 16 to function as a λ/4 plate (abbreviation for a ¼ wavelength plate), it is easy to reduce the minimum value of the transmittance obtained in a case where the light incident on the first polarizer exits from the second polarizer in the black display state in which the angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 90°±5°.

The inventors expected that, in contrast, in a case where the black display state of the first aspect of the laminate of the present invention is observed in the front direction 1 in FIG. 3, from the viewpoint of the tint of the black display state, it is preferable that Re of both the first patterned optical anisotropic layer 15 and the second patterned optical anisotropic layer 16 has normal wavelength dispersion, reciprocal wavelength dispersion, or flat dispersion. Furthermore, the inventors expected that in a case where Re of the first patterned optical anisotropic layer 15 and the second patterned optical anisotropic layer 16 is a combination of reciprocal wavelength dispersion and normal wavelength dispersion, particularly, the light of a short wavelength such as blue light may not return to the equator on the Poincare sphere, and hence the black display state may have a blue tint. The inventors expect that the trend of the change in tint that is shown in a case where the black display state is observed in the front direction 1 in FIG. 3 may also be shown in a case where the black display state of the laminate of the present invention is observed in the oblique on-axis direction 2 in FIG. 3 (in examples which will be described later, the tint shown in a case where the black display state is observed in the oblique on-axis direction 2 in FIG. 3 will not be examined).

Furthermore, in a case where the black display state of the first aspect of the laminate of the present invention is observed in the oblique on-axis direction 2 in FIG. 3, provided that Rth of both the first patterned optical anisotropic layer 15 and Rth of the second patterned optical anisotropic layer 16 have the same sign, even though the anisotropic layers have the same wavelength dispersion and the absolute values of Rth are the same as each other, the anisotropic layers have different rotation axes. Accordingly, the light does not completely return to the equator on the Poincare sphere and becomes blue light, and hence serious light leakage occurs. In contrast, in a case where the first patterned optical anisotropic layer 15 and the second patterned optical anisotropic layer 16 have the same wavelength dispersion, and the absolute values of Rth are the same as each other while the signs of Rth are opposed to each other, the rotation axes become symmetric about the origin. Accordingly, the light completely returns to the equator on the Poincare sphere, the tint becomes excellent, and the light leakage can be reduced. Even in a case where the black display state of the first aspect of the laminate of the present invention is observed in the oblique off-axis direction 3 in FIG. 3, on the premise that an optically anisotropic layer compensating the polarizing plate is used, the first patterned optical anisotropic layer 15 and the second patterned optical anisotropic layer 16 preferably have the same type of wavelength dispersion, and the absolute values of Rth are preferably the same as each other, and the signs of Rth are preferably opposed to each other.

Generally, for the uses such as windows, the tint of the black display state required for the purpose of actively blocking light is considered more important than the tint of the white display state required for the purpose of bringing in more external light. Therefore, in the first aspect of the laminate of the present invention, it is preferable to inhibit the tint of the white display state from becoming yellow by designing the absolute value of Re to become smaller than that of a general λ/4 plate so as to inhibit the change in tint of the black display state in the front and to inhibit the light leakage occurring in the oblique direction, because then a laminate is easily obtained in which the tint of the white display state and the black display state in front is excellent and the brightness of the black display state is low in the front and in all directions. In a case where the absolute value of Re is designed to become smaller than that of a general λ/4 plate, the transmittance of the white display state is reduced. However, for the light control, the increase in the transmittance of the white display state is not required in many cases. Considering the aforementioned point, as a combination of the first patterned optical anisotropic layer 15 and the second patterned optical anisotropic layer 16, a combination of +A-plate (for example, a rod-like liquid crystal compound) having normal wavelength dispersion and a −A-plate (for example, a disk-like liquid crystal compound) having normal wavelength dispersion is preferable. The preferable ranges of Re and Rth of the first patterned optical anisotropic layer 15 and the second patterned optical anisotropic layer 16 will be described later.

(Constitution of Second Aspect)

FIG. 2 is a perspective exploded view relating to an example of a second aspect of the laminate of the present invention.

In the example of the second aspect of the laminate of the present invention shown in FIG. 2, each of the first patterned optical anisotropic layer 15 and the second patterned optical anisotropic layer 16 have three or more phase difference regions which has different slow axis directions in the plane and in which the slow axis directions continuously change. The number of phase difference regions, which have different slow axis directions and in which the slow axis directions continuously change, is not particularly limited because the number varies with the way the phase difference regions are divided. However, the number of phase difference regions is preferably 3 to 1,000, more preferably 5 to 100, and particularly preferably 10 to 50.

In the example of the second aspect of the laminate of the present invention shown in FIG. 2, a white display state can be established in which an angle formed between the slow axis direction of each of the phase difference regions of the first patterned optical anisotropic layer 15 and the slow axis direction of each of the phase difference regions of the second patterned optical anisotropic layer 16 that is superposed on each of the phase difference regions of the first patterned optical anisotropic layer 15 is 45°±5°, and a transmittance obtained in a case where light incident on the first polarizer 12 exits from the second polarizer 13 is maximized. Furthermore, in the second aspect of the laminate of the present invention, in a case where the angle formed between the slow axis direction of each of the phase difference regions of the first patterned optical anisotropic layer 15 and the slow axis direction of each of the phase difference regions of the second patterned optical anisotropic layer 16 that is superposed on each of the phase difference regions of the first patterned optical anisotropic layer 15 is 0°±5°, the white display state is not established on the front surface, and only a region coinciding with the absorption axis 12A of the first polarizer or the absorption axis 13A of the second polarizer performs black display.

In the example of the second aspect of the laminate of the present invention shown in FIG. 2, the white display state can be switched with the black display state in which the angle formed between the slow axis direction of each of the phase difference regions of the first patterned optical anisotropic layer 15 and the slow axis direction of each of the phase difference regions of the second patterned optical anisotropic layer 16 that is superposed on each of the phase difference regions of the first patterned optical anisotropic layer 15 is 90°±5°, and the transmittance obtained in a case where the light incident on the first polarizer 12 exits from the second polarizer 13 is minimized. For example, in FIG. 2, in a case where the slow axis of the second phase difference region, which is the first region from the left end of the page, of the second patterned optical anisotropic layer 16 is superposed on the slow axis of the first phase difference region, which is the third region from the left end of the page, of the first patterned optical anisotropic layer 15, the angle formed between the slow axis direction of each of the phase difference regions of the first patterned optical anisotropic layer 15 and the slow axis direction of each of the phase difference regions of the second patterned optical anisotropic layer 16 that is superposed on each of the phase difference regions of the first patterned optical anisotropic layer 15 is 90°±5°. It is preferable that the white display state and the black display state are switched with each other by an operation in which any of the patterned optical anisotropic layers is caused to slide by a width that enables the white display state and the black display state to be switched with each other. The sliding mechanism that is preferably included in the second aspect of the laminate of the present invention may have the same constitution as the sliding mechanism that is preferably included in the first aspect of the laminate of the present invention.

The white display state of the first aspect of the laminate of the present invention may be observed in the front direction 1 in FIG. 3. In this case, provided that the absolute value of Re of the first patterned optical anisotropic layer 15 is approximately the same as the absolute value of Re of the second patterned optical anisotropic layer 16, and that Re enables the first and second patterned optical anisotropic layers 15 and 16 to function as a $\lambda/2$ plate (abbreviation for a ½ wavelength plate), it is easy to reduce the maximum value of the transmittance obtained in a case where the light incident on the first polarizer exits from the second polarizer in the white display state in which the angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 45°±5°.

In a case where the black display state of the second aspect of the laminate of the present invention is observed in the front direction 1 in FIG. 3. In this case, provided that the absolute value of Re of the first patterned optical anisotropic layer 15 is approximately the same as the absolute value of Re of the second patterned optical anisotropic layer 16, and that Re enables the first and second patterned optical anisotropic layers 15 and 16 to function as a $\lambda/2$ plate, it is easy to reduce the minimum value of the transmittance obtained in a case where the light incident on the first polarizer exits from the second polarizer in the black display state in which the angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 90°±5° (phase difference cancellation).

The preferable aspect of the first aspect of the laminate of the present invention and the preferable aspect of the second aspect of the laminate of the present invention are different from each other in terms of the preferable range of the absolute value of Re of the first patterned optical anisotropic layer 15 and the second patterned optical anisotropic layer 16. Here, on the Poincare sphere, the change of the absolute value of Re corresponds to the difference in the moving amount. Therefore, the design for improving the tint or the light leakage of the black display state is the same for both the first aspect of the laminate of the present invention and the second aspect of the laminate of the present invention. That is, on the premise that the optically anisotropic layer compensating the polarizing plate is used, the first patterned optical anisotropic layer 15 and the second patterned optical anisotropic layer 16 preferably have the same type of wavelength dispersion, the absolute values of Rth are preferably the same as each other, and the signs of Rth are preferably opposed to each other. For example, as a combination of the first patterned optical anisotropic layer 15 and the second patterned optical anisotropic layer 16, a combination of a +A-plate (for example, a rod-like liquid crystal compound) having normal wavelength dispersion and a −A-plate (for example, a disk-like liquid crystal compound) having a normal wavelength dispersion is preferable.

For the same reason as in the first aspect of the laminate of the present invention, in the second aspect of the laminate of the present invention, it is preferable to inhibit the tint of the white display state from becoming yellow by designing the absolute value of Re to become smaller than that of a general $\lambda/2$ plate, to inhibit the change in tint of the black display state in the front, and to inhibit the light leakage occurring in the oblique direction, because then a laminate is easily obtained in which the tints of the white display state and the black display state in the front are excellent and the brightness of the black display state is low in the front and in all directions.

<First Polarizer and Second Polarizer>

The laminate of the present invention has the first polarizer and the second polarizer. The constitutions common to the first polarizer and the second polarizer will be collectively described as a polarizer.

The polarizers included in the laminate of the present invention are not particularly limited, and a wide variety of linear polarizers used in the related art can be used. The polarizers include an iodine-based polarizer, a colorant-based polarizing film in which a dichroic colorant is used, a polyene-based polarizer, and a polarizer in which a material causing polarization by absorbing ultraviolet (UV) is used. In the present invention, any of these may be used. The iodine-based polarizer and the colorant-based polarizer are generally manufactured using a polyvinyl alcohol-based film. Regarding the method for manufacturing the polarizer, for example, the description in JP2011-128584A can be referred to. Furthermore, the polarizer may be a layer formed by coating.

As the polarizer in which a material causing polarization by UV absorption is used, a material may be used in which both the degree of polarization and the concentration are increased by UV absorption. By using the polarizer, in which a material causing polarization by UV absorption is used, as the first polarizer or the second polarizer, in a case where the laminate of the present invention absorbs UV, the first polarizer or the second polarizer exhibits polarizance, and hence the display state can be switched with the black display state. The laminate of the present invention also includes an aspect wherein the polarizer, in which a material causing polarization by UV absorption is used, is used as the first polarizer or the second polarizer. That is, the first polarizer or the second polarizer in the present invention does not need to exhibit polarizance all the time, and may be able to exhibit polarizance as necessary. Examples of the polarizer, in which a material causing polarization by UV absorption is used, include polarizing lenses manufactured by Transitions Optical, Inc., and the like.

In the laminate of the present invention, the polarizers are preferably uniformly formed within the plane. That is, it is preferable that the polarizers are not patterned. In the polarizers, all the absorption axes are preferably in the same direction within the plane, and all the transmission axes are preferably in the same direction within the plane.

Furthermore, it is preferable to design the polarizers such that the absorption axis of the polarizer of one polarizing plate is orthogonal to the stripe of the patterned optical anisotropic layer, and that the absorption axis of the polarizer of the other polarizing plate is parallel to the stripes of the patterned optical anisotropic layer.

<Polarizing Plate-Protective Film>

The laminate of the present invention may have a polarizing plate-protective film for protecting the polarizer, on at least one surface of the polarizer. In the aspect in which the polarizer is a layer formed by coating, the polarizing plate-protective film may be used as a support of the polarizer. The polarizing plate-protective film may be used as a support for the patterned optical anisotropic layer. The polarizing plate-protective film is not particularly limited, and the polymer films containing various polymer materials (meaning both the polymers and resins) as main components can be used. It is preferable to use films containing, as a main component, a polymer or a resin excellent in light-transmitting properties, mechanical strength, heat stability, moisture barrier properties, isotropy, and the like. Examples thereof include a polycarbonate-based polymer, a polyester-based polymer such as polyethylene terephthalate or polyethylene naphthalate, an acrylic polymer such as polymethyl methacrylate, a styrene-based polymer such as polystyrene or an acrylonitrile•styrene copolymer (AS resin), and the like. Examples thereof also include a polyolefin such as polyethylene or polypropylene, a polyolefin-based polymer such as an ethylene•propylene copolymer, a vinyl chloride-based polymer, an amide-based polymer such as nylon or aromatic polyamide, an imide-based polymer, a sulfone-based polymer, a polyethersulfone-based polymer, a polyether ether ketone-based polymer, a polyphenylene sulfide-based polymer, a vinylidene chloride-based polymer, a vinyl alcohol-based polymer, a vinyl butyral-based polymer, an arylate-based polymer, a polyoxymethylene-based polymer, an epoxy-based polymer, and a polymer obtained by mixing these polymers together. Furthermore, the polymer film of the present invention can be formed as a cured layer of an ultraviolet curable type or thermosetting type resin based on acryl, urethane, acrylurethane, epoxy, silicone, or the like.

As the polarizing plate-protective film, it is preferable to use a film containing, as a main component, at least one kind of compound selected from cellulose acylate, a cyclic olefin, an acrylic resin, a polyethylene terephthalate resin, and a polycarbonate resin.

In addition, commercially available products may be used. For example, Zeonex and Zeonor manufactured by ZEON CORPORATION, ARTON manufactured by JSR Corporation, and the like can be used. Furthermore, various commercially available cellulose acylate films can also be used.

As the polarizing plate-protective film, it is possible to use films formed by any of the methods including a solution film-forming method and a melt film-forming method. The thickness of the film is preferably 10 to 1,000 µm, more preferably 40 to 500 µm, and particularly preferably 40 to 200 µm.

The optical characteristics of the polarizing plate-protective film are not particularly limited. From the viewpoint of reducing the light leakage occurring at the time of observing the display state in the oblique direction, the polarizing plate-protective film is preferably an optically isotropic film, but the polarizing plate-protective film is not limited to this aspect. Specifically, the polarizing plate-protective film is preferably a film having Re(550) of 0 to 10 nm and an absolute value of Rth of equal to or smaller than 20 nm.

Any of the layers included in the laminate of the present invention may contain an ultraviolet absorber so as to prevent the deterioration resulting from the solar light. The ultraviolet absorber may be added to any of the layers. For example, in an aspect, the polarizing plate-protective film contains the ultraviolet absorber. As the ultraviolet absorber, it is preferable to use an ultraviolet absorber which has an excellent ability to absorb ultraviolet rays having a wavelength of equal to or shorter than 370 nm and absorbs the visible light having a wavelength of equal to or longer than 400 nm as little as possible in view of the light-transmitting properties. Particularly, the transmittance of the ultraviolet absorber at a wavelength of 370 nm is desirably equal to or lower than 20%, preferably equal to or lower than 10%, and more preferably equal to or lower than 5%. Examples of such an ultraviolet absorber include an oxybenzophenone-based compound, a benzotriazole-based compound, a salicylic acid ester-based compound, a benzophenone-based compound, a cyanoacrylate-based compound, a nickel complex salt-based compound, a polymer ultraviolet absorbing compound containing the aforementioned ultraviolet-absorbing group, and the like. However, the present invention is not limited thereto, and two or more kinds of ultraviolet absorbers may be used.

In a case where the film containing an ultraviolet absorber is manufactured by a solution film-forming method, the ultraviolet absorber is added to a dope which is a solution of a main component polymer. The ultraviolet absorber may be added to the dope by a method in which the ultraviolet absorber is added after being dissolved in an alcohol or an organic solvent such as methylene chloride or dioxolane. The ultraviolet absorber may be directly added to the dope composition. The ultraviolet absorber such as inorganic powder that does not dissolve in an organic solvent is added to the dope after being dispersed in an organic solvent and the main component polymer by using a dissolver or a sand mill.

Regarding a cellulose acylate film, it is particularly preferable to improve the light fastness thereof by adding an ultraviolet absorber.

The amount of the ultraviolet absorber used with respect to 100 parts by mass of the main component of the polarizing plate-protective film is 0.1 to 5.0 parts by mass, preferably 0.5 to 2.0 parts by mass, and more preferably 0.8 to 2.0 parts by mass.

In a case where the light having a wavelength of 430 nm is incident on the polarizer, it is preferable that the polarizer exhibits a degree of polarization equal to or lower than 99.8%. The polarizer exhibiting the aforementioned degree of polarization can be prepared by means of reducing the amount of iodine staining the film, reducing the total stretching ratio of polyvinyl alcohol, or the like in the general polarizing plate preparation step. Furtheiiiiore, as a light-transmitting substrate or a polarizing plate-protective film which is used as desired, it is preferable to use a film having optical characteristics in which the transmittance of the film is equal to or higher than 90%.

<Patterned Optical Anisotropic Layer>

The laminate of the present invention has the first polarizer, the first patterned optical anisotropic layer, the second patterned optical anisotropic layer, and the second polarizer in this order.

The matters common to the first patterned optical anisotropic layer and the second patterned optical anisotropic layer will be collectively described as a patterned optical anisotropic layer in some cases. Furthermore, the first phase difference regions and the second phase difference regions of the patterned optical anisotropic layers in the first aspect of the laminate of the present invention and the phase difference regions of the patterned optical anisotropic layers in the second aspect of the laminate of the present invention will be collectively described as phase difference regions.

In a case where the laminate of the present invention includes three or more patterned optical anisotropic layers, the light control mode can be changed stepwise. However, from the viewpoint of increasing the transmittance in the white display state, it is preferable that laminate of the present invention includes two sheets of patterned optical anisotropic layers.

(Optical Characteristics)

In the laminate of the present invention, the retardation $Re1(550)$ of the first patterned optical anisotropic layer at a wavelength of 550 nm in the in-plane direction, the retardation $Rth1(550)$ of the first patterned optical anisotropic layer at a wavelength of 550 nm in the film thickness direction, the retardation $Re2(550)$ of the second patterned optical anisotropic layer at a wavelength of 550 nm in the in-plane direction, and the retardation $Rth2(550)$ of the second patterned optical anisotropic layer at a wavelength of 550 nm in the film thickness direction preferably satisfy Formula (1) and Formula (2).

$$Re2(550)=Re1(550)\pm10 \text{ nm} \quad (1)$$

$$Rth2(550)=-Rth1(550)\pm10 \text{ nm} \quad (2)$$

Furthermore, the laminate of the present invention preferably satisfies Formula (1A), and particularly preferably satisfies Formula (1B).

$$Re2(550)=Re1(550)\pm5 \text{ nm} \quad (1A)$$

$$Re2(550)=Re1(550)\pm3 \text{ nm} \quad (1B)$$

In addition, the laminate of the present invention more preferably satisfies Formula (2A), and particularly preferably satisfies Formula (2B).

$$Rth2(550)=-Rth1(550)\pm5 \text{ nm} \quad (2A)$$

$$Rth2(550)=-Rth1(550)\pm3 \text{ nm} \quad (2B)$$

In the laminate of the present invention, the combination of the first patterned optical anisotropic layer and the second patterned optical anisotropic layer is preferably a combination of a +A-plate and a −A-plate.

In the laminate of the present invention, both the first patterned optical anisotropic layer and the second patterned optical anisotropic layer preferably have normal wavelength dispersion, reciprocal wavelength dispersion, or flat dispersion as wavelength dispersion of the retardation Re in the in-plane direction, and both the first patterned optical anisotropic layer and the second patterned optical anisotropic layer preferably have normal wavelength dispersion, reciprocal wavelength dispersion, or flat dispersion as wavelength dispersion of the retardation Rth in the film thickness direction.

In the laminate of the present invention, both the first patterned optical anisotropic layer and the second patterned optical anisotropic layer more preferably have normal wavelength dispersion as wavelength dispersion of the retardation Re in the in-plane direction, and both the first patterned optical anisotropic layer and the second patterned optical anisotropic layer more preferably have normal wavelength dispersion as wavelength dispersion of the retardation Rth in the film thickness direction.

Regarding the wavelength dispersion of the retardation Re of the first patterned optical anisotropic layer in the in-plane direction, $Re1(450)/Re1(550)$ is preferably 1.04 to 1.20, more preferably 1.06 to 1.15, and particularly preferably 1.08 to 1.12.

$Re1(630)/Re1(550)$ is preferably 0.85 to 0.98, more preferably 0.88 to 0.97, and particularly preferably 0.90 to 0.96.

Regarding the wavelength dispersion of the retardation Rth of the first patterned optical anisotropic layer in the film thickness direction, $Rth1(450)/Rth1(550)$ is preferably 1.04 to 1.20, more preferably 1.06 to 1.15, and particularly preferably 1.08 to 1.12.

$Rth1(630)/Rth1(550)$ is preferably 0.85 to 0.98, more preferably 0.88 to 0.97, and particularly preferably 0.90 to 0.96.

Regarding the wavelength dispersion of the retardation Re of the second patterned optical anisotropic layer in the in-plane direction, $Re2(450)/Re2(550)$ is preferably 1.04 to 1.20, more preferably 1.06 to 1.15, and particularly preferably 1.08 to 1.12.

$Re2(630)/Re2(550)$ is preferably 0.85 to 0.98, more preferably 0.88 to 0.97, and particularly preferably 0.90 to 0.96.

Regarding the wavelength dispersion of the retardation Rth of the second patterned optical anisotropic layer in the film thickness direction, $Rth2(450)/Rth2(550)$ is preferably 1.04 to 1.20, more preferably 1.06 to 1.15, and particularly preferably 1.08 to 1.12.

$Rth2(630)/Rth2(550)$ is preferably 0.85 to 0.98, more preferably 0.88 to 0.97, and particularly preferably 0.90 to 0.96.

In the laminate of the present invention, the first patterned optical anisotropic layer and the second patterned optical anisotropic layer preferably contain a liquid crystal compound. The liquid crystal compound used in the first patterned optical anisotropic layer and the second patterned optical anisotropic layer will be described later.

(First patterned optical anisotropic layer and second patterned optical anisotropic layer in first aspect)

In an example, the first patterned optical anisotropic layer 15 and the second patterned optical anisotropic layer 16 in the first aspect of the laminate of the present invention have first phase difference regions and second phase difference regions that have different slow axis directions in the plane and alternate with each other, and the angle formed between the slow axis direction of each of the first phase difference regions and the slow axis direction of each of the second phase difference regions is 90°±5°.

For example, the first patterned optical anisotropic layer and the second patterned optical anisotropic layer are preferably patterned optical anisotropic layers in which the first phase difference regions and the second phase difference regions are disposed within the plane as patterns each having a width L of 1 mm to 50 mm in any direction within the plane.

The width of each of the phase difference regions shows the distance between two boundary portions adjacent to each other in a boundary portion which is a boundary between each of the first phase difference regions and each of the second phase difference regions. Herein, the distance between boundary portions refers to the shortest distance between a mean plane of one end of one phase difference region in the film thickness direction and a mean plane of the end of an adjacent phase difference region close to the aforementioned phase difference region in the film thickness direction. The mean plane refers to a reference plane which can be conceived in a case where the plane at the end of the phase difference region in the thickness direction is a rough surface and the rough surface is assumed to be a plane that is flat.

L is preferably 1 mm to 50 mm. From the viewpoint of the light control function, L is preferably within this range. Considering the effect of hiding the misalignment of slow axis in the boundary between each of the first phase difference regions and each of the second phase difference regions, the width L of each of the phase difference regions is preferably equal to or greater than 5 mm. In contrast, it is preferable that L is not too large, because then the number of dead spaces, which are for moving the first patterned optical anisotropic layer 15 or the second patterned optical anisotropic layer 16 by the width of each of the phase difference regions at the time of switching the light blocking mode and the transmission mode with each other, do not increase.

L1 means the width of a boundary portion. The width of a boundary portion refers to the shortest distance between a mean plane of one end of a single phase difference region in the thickness direction and a mean plane of the end of a phase difference region adjacent to the aforementioned phase difference region that is close to the aforementioned phase difference region in the thickness direction. In the present invention, it is preferable that the distance (width of each phase difference region) L between two boundary portions adjacent to each other and the width L1 of the boundary portion satisfy Formula (a).

$$100 \leq L/L1 \leq 5{,}000 \quad \text{Formula (a)}$$

L and L1 preferably satisfy $200 \leq L/L1 \leq 5{,}000$, more preferably satisfy $400 \leq L/L1 \leq 5{,}000$, and even more preferably satisfy $500 \leq L/L1 \leq 5{,}000$.

It is preferable that the first phase difference regions and the second phase difference regions have the same shape. Furthermore, it is preferable that the first phase difference regions and the second phase difference regions are equally disposed. In the present embodiment, the patterned optical anisotropic layers have a structure in which the first phase difference regions and the second phase difference regions are alternately disposed in this order in the form of stripes respectively. However, the shape of the phase difference regions is not limited to the stripe. Furthermore, in the present embodiment, the stripe may be formed in the longitudinal direction of the film or in a direction perpendicular to the longitudinal direction.

In the first aspect of the laminate of the present invention, an aspect is preferable in which at least the in-plane slow axis directions of the first phase difference regions and the second phase difference regions are different from each other. It is more preferable that the in-plane slow axis directions are different from each other about a certain side (preferably the stripe formed by each of the phase difference regions, that is, the longitudinal direction of the first phase difference regions or the second phase difference regions). In the laminate of the present invention, the angle formed between the slow axis of each of the first phase difference regions and the longitudinal direction of each of the first phase difference regions or the second phase difference regions is preferably equal to or greater than 30° and equal to or smaller than 60°, and the angle formed between the slow axis of each of the second phase difference regions and the longitudinal direction of each of the first phase difference regions or the second phase difference regions is preferably equal to or greater than −30° and equal to or smaller than −60°. The angle formed between the slow axis of each of the first phase difference regions and the longitudinal direction of each of the first phase difference regions or the second phase difference regions is more preferably 45°, and the angle formed between the slow axis of each of the second phase difference regions and the longitudinal direction of each of the first phase difference regions or the second phase difference regions is more preferably −45°.

In the first aspect of the laminate of the present invention, it is preferable that the retardation Re1(550) of the first patterned optical anisotropic layer at a wavelength of 550 nm in the in-plane direction and the retardation Re2(550) of the second patterned optical anisotropic layer at a wavelength of 550 nm in the in-plane direction are each independently 110 to 135 nm and satisfy Formula (1).

$$Re2(550)=Re1(550)\pm10 \text{ nm} \quad (1)$$

In the first aspect of the laminate of the present invention, from the viewpoint of improving the tint of the white display state, the retardation Re1(550) of the first patterned optical anisotropic layer at a wavelength of 550 nm in the in-plane direction and the retardation Re2(550) of the second patterned optical anisotropic layer at a wavelength of 550 nm in the in-plane direction are each independently more preferably 110 to 130 nm, particularly preferably 110 to 125 nm, and more particularly preferably 110 to 120 nm.

The retardation Rth1(550) of the first patterned optical anisotropic layer at a wavelength of 550 nm in the film thickness direction and the retardation Rth2(550) of the second patterned optical anisotropic layer at a wavelength of 550 nm in the film thickness direction are preferably 55 to 80 nm, more preferably 60 to 80 nm, and particularly preferably 65 to 75 nm. Rth(550) of the first patterned optical anisotropic layer and the second patterned optical anisotropic layer is preferably about to $\lambda/8$.

It is preferable that at least one of the upper layer or the underlayer of the patterned optical anisotropic layer has a colorant portion disposed in a position corresponding to the boundary portion. In a case where the colorant portion is provided, it is possible to inhibit the light control function from being disturbed due to the light leakage from the boundary portion. The colorant portion is a portion in which the light-transmitting properties are reduced due to a colorant contained therein. It is preferable that the colorant portion is black or is of a color similar to black by containing one kind of colorant or two or more kinds of colorants.

The width of the colorant portion is appropriately set in view of the uniformity of in-plane brightness of the transmission state, and is preferably 10% to 70% and more preferably 30% to 50% of the distance (width of each phase difference region) L between two adjacent boundary portions.

The patterned optical anisotropic layer is formed on the surface of a support formed of a polymer film or the like, and may be incorporated into the laminate of the present invention together with the support. It is preferable that the support of the patterned optical anisotropic layer is incorporated into the laminate, because then the support can also be used as a polarizing plate-protective film. As the support, a light-transmitting polymer film is preferable. Examples of polymer films usable as the support are the same as the examples of polymer films usable as the polarizing plate-protective film. It is preferable that the sum of Rth of the support and Rth of the patterned optical anisotropic layer satisfies [Rth]≤20 nm. In order for the aforementioned expression to be satisfied, it is preferable that the support satisfies −150 nm≤Rth(630)≤100 nm.

In a case where the patterned optical anisotropic layer includes the boundary portion having the width L1 that is between the first phase difference region and the second phase difference region adjacent to each other, for the purpose of reducing the light leakage and the like, it is preferable that the patterned optical anisotropic layer has a colorant portion (preferably a black stripe) disposed in the position corresponding to the boundary portion.

The colorant portion is preferably included in at least one of the upper layer and the underlayer of the patterned optical anisotropic layer. From the viewpoint of reducing the light leakage, it is preferable that the colorant portion is preferably black or is of a color similar to black. It is preferable that the colorant portion contains one kind of colorant or two or more kinds of colorants such that an excellent color results. Examples of usable colorants include colorants used in the related art for forming a black matrix of color filters, and the like.

The colorant portion can be formed on the patterned optical anisotropic layer and the like by using printing methods, for example. As one of the printing methods, a flexographic printing method can be exemplified.

(First Patterned Optical Anisotropic Layer and Second Patterned Optical Anisotropic Layer in Second Aspect)

In the second aspect of the laminate of the present invention, each of the first patterned optical anisotropic layer and the second patterned optical anisotropic layer has three or more phase difference regions which have different slow axis directions on the plane thereof and in which the slow axis directions continuously change.

Each of the phase difference regions preferably has a stripe shape. A preferable width of the stripe is the same as the preferable width of the stripe of the first phase difference regions and the second phase difference regions of the first patterned optical anisotropic layer and the second patterned optical anisotropic layer in the first aspect.

In the second aspect of the laminate of the present invention, it is preferable that the retardation Re1(550) of the first patterned optical anisotropic layer at a wavelength 550 nm in the in-plane direction and the retardation Re2(550) of the second patterned optical anisotropic layer at a wavelength of 550 nm in the in-plane direction are each independently 230 to 270 nm and satisfy Formula (1).

$$Re2(550)=Re1(550)\pm 10 \text{ nm} \quad (1)$$

In the second aspect of the laminate of the present invention, it is preferable that the retardation Re1(550) of the first patterned optical anisotropic layer at a wavelength 550 nm in the in-plane direction and the retardation Re2(550) of the second patterned optical anisotropic layer at a wavelength of 550 nm in the in-plane direction are each independently more preferably 230 to 260 nm, particularly preferably 230 to 250 nm, and more particularly preferably 235 to 245 nm.

(Material of Patterned Optical Anisotropic Layer)

As the material of the patterned optical anisotropic layer, a liquid crystal composition containing a liquid crystal compound is preferable. The liquid crystal composition is more preferably a polymerizable liquid crystal composition containing a liquid crystal compound having a polymerizable group.

As one of the liquid crystal compositions used for forming the patterned optical anisotropic layer, a liquid crystal composition can be exemplified which contains at least one kind of liquid crystal compound having a polymerizable group and at least one kind of alignment control agent. The liquid crystal composition may also contain other components such as a polymerization initiator, a sensitizer, and an alignment aid.

Hereinafter, each of the materials will be specifically described.

—Liquid Crystal Compound—

The liquid crystal compound can be appropriately selected according to the values of Re and Rth of the patterned optical anisotropic layers and the design of the wavelength dispersion of Re and Rth of the patterned optical anisotropic layers.

—Smectic Liquid Crystal Compound—

In order to make the patterned optical anisotropic layers have reciprocal wavelength dispersion as wavelength dispersion of Re, for example, it is preferable to use a smectic liquid crystal compound described below.

The smectic liquid crystal compound refers to a compound which enables the formed patterned optical anisotropic layer or optically anisotropic layer to exhibit the properties of a smectic liquid crystal.

The patterned optical anisotropic layer or the optically anisotropic layer exhibiting the properties of a smectic liquid crystal also includes a patterned optical anisotropic layer or an optically anisotropic layer that does not perfectly exhibit the properties of a smectic liquid crystal compound due to curing and the like. Furthermore, the aforementioned patterned optical anisotropic layer or the optically anisotropic layer includes not only an optically anisotropic layer in which an alignment order parameter, which will be described later, is within a range equal to or greater than 0.8 and equal to or smaller than 1.0, but also an optically anisotropic which has one peak within a range of 2θ, which is an angle formed between an incident beam and a diffracted beam, of 1° to 3° determined by measuring a period in a direction parallel to the alignment direction of liquid crystals by using X-ray diffractometry.

Among these smectic liquid crystal compounds, a compound not containing a fluorine atom in the molecule is preferably used.

As the smectic liquid crystal compound, a compound having at least three ring structures selected from the group consisting of a benzene ring and a cyclohexane ring is preferable, because such a compound easily expresses smectic properties by the quasi-phase separation between a rigid mesogen and a flexible side chain and exhibits sufficient rigidity.

Furthermore, from the viewpoint of imparting moisture-heat resistance to the patterned optical anisotropic layer, a compound is preferable which has two or more polymerizable groups (for example, a (meth)acryloyl group, a vinyl group, a styryl group, an allyl group, and the like).

The description of "(meth)acryloyl group" represents an acryloyl group or a methacryloyl group.

Specific examples of the aforementioned smectic liquid crystal compound include compounds represented by Formulae L-1, L-3, and L-6, and the like.

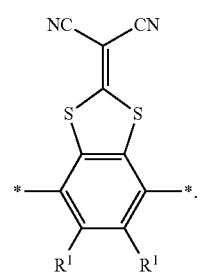

Formula (I)

In Formula (I), * represents a binding position, and $R^1$ each independently represents a hydrogen atom or an alkyl group having 1 to 6 carbon atoms.

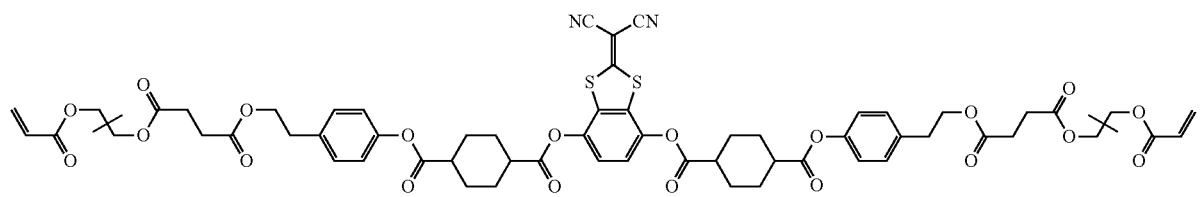

L-1

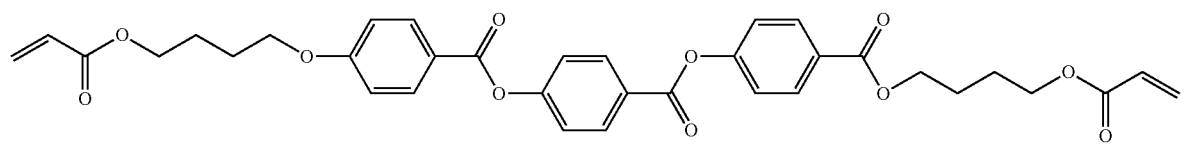

L-3

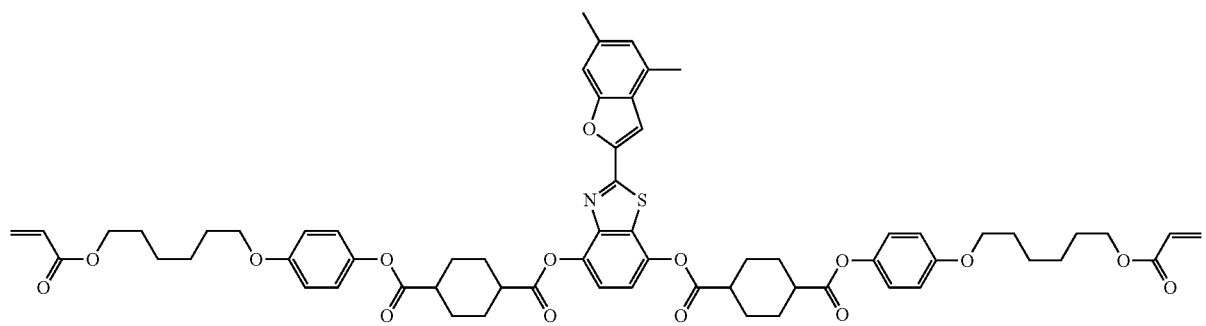

L-6

In addition, as the smectic liquid crystal compound, a compound having a structure represented by Formula (I) is preferable, because such a compound further improves the alignment properties of the patterned optical anisotropic layer by the electronic interaction between liquid crystal molecules.

Examples of the compound having the structure represented by Formula (I) suitably include the compound represented by Formula L-1 in which all $R^1$'s in Formula (I) represent a hydrogen atom.

The patterned optical anisotropic layer used in a case where reciprocal wavelength dispersion is adopted as the wavelength dispersion of Re may contain other liquid crystal compounds in addition to the aforementioned smectic liquid crystal compound.

Examples of other liquid crystal compounds include a nematic liquid crystal compound and the like. Specific examples thereof include compounds represented by Formulae L-2 and L-4 that are used in examples which will be described later.

In a case where the patterned optical anisotropic layer contains the aforementioned smectic liquid crystal compound and other liquid crystal compounds, the content ratio of the smectic liquid crystal compound with respect to the total mass of the smectic liquid crystal compound and other liquid crystal compounds is preferably at least equal to or higher than 35% by mass.

The polymerizable liquid crystal compound having a polymerizable group for which the alignment of the rod-like liquid crystal compound is more preferably immobilized by polymerization can be obtained by introducing a polymerizable group into a liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is particularly preferable. The polymerizable group can be introduced into the liquid crystal compound molecule by various methods. The number of polymerizable groups contained in the polymerizable liquid crystal compound is preferably 1 to 6, and more preferably 1 to 3. Examples of the polymerizable liquid crystal compound include the compounds described in

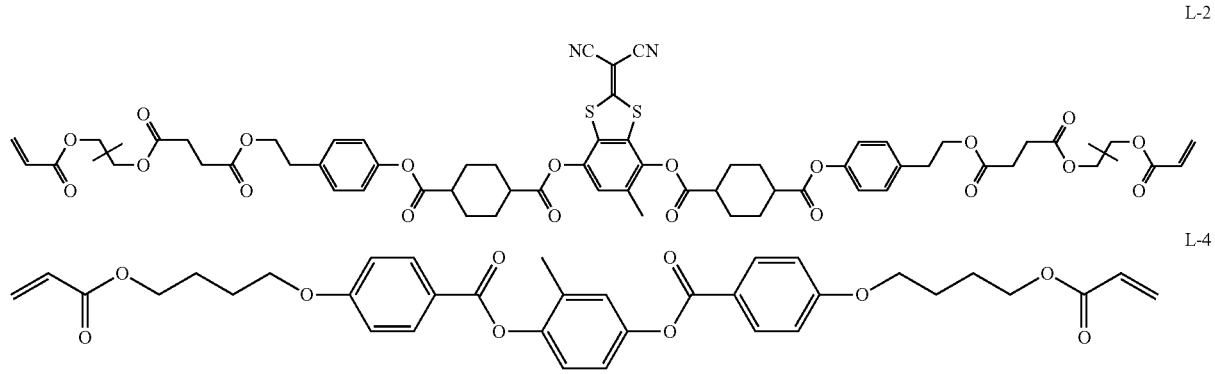

In contrast, in a case where normal wavelength dispersion is adopted as the wavelength dispersion of Re of the patterned optical anisotropic layer, for example, it is preferable to use the liquid crystal compounds described below.

Examples of the liquid crystal compounds include a rod-like liquid crystal compound and a disk-like liquid crystal compound.

—Rod-Like Liquid Crystal Compound—

Examples of the rod-like liquid crystal compound include a rod-like nematic liquid crystal compound. As the rod-like nematic liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolanes, and alkenylcyclohexyl benzonitriles are preferably used. Not only the aforementioned low-molecular weight liquid crystal molecules, but also polymer liquid crystal molecules can be used.

Makromol. Chem., vol. 190, p. 2255 (1989); Advanced Materials, vol. 5, p. 107 (1993), U.S. Pat. No. 4,683,327B, U.S. Pat. No. 5,622,648B, U.S. Pat. No. 5,770,107B, WO95/22586A, WO95/24455A, WO97/00600A, WO98/23580A, WO98/52905A, JP1989-272551A (JP-H01-272551A ), JP1994-16616A (JP-H06-16616A), JP1995-110469A (JP-H07-110469A), JP1999-80081A (JP-H11-80081A ), JP2001-328973A, JP2014-198815A, JP2014-198814A, and the like. Furthermore, as the rod-like liquid crystal compound, for example, the compounds described in JP1999-513019A (JP-H11-513019A) and JP2007-279688A can also be preferably used.

Two or more kinds of polymerizable liquid crystal compounds may be used in combination. In a case where two or more kinds of polymerizable liquid crystal compounds are used in combination, the alignment temperature can be reduced.

Specific examples of the rod-like liquid crystal compound include compounds represented by Formulae (1) to (11).

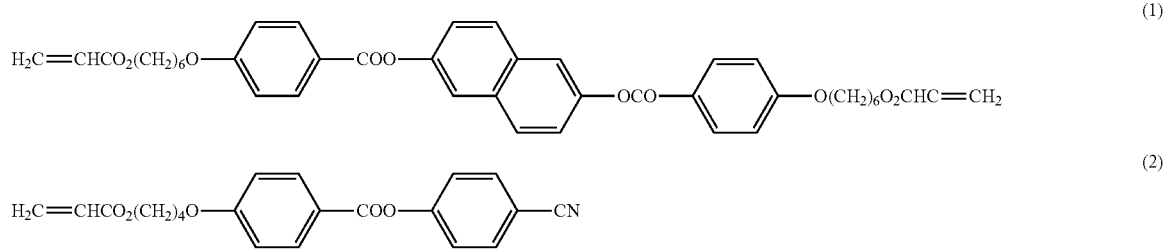

(3)
(4)
(5)
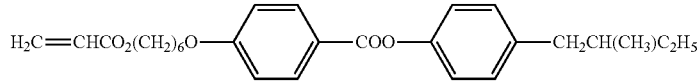
(6)
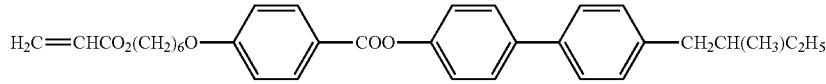
(7)
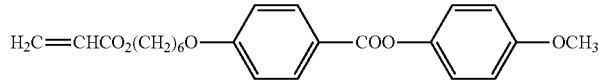
(8)
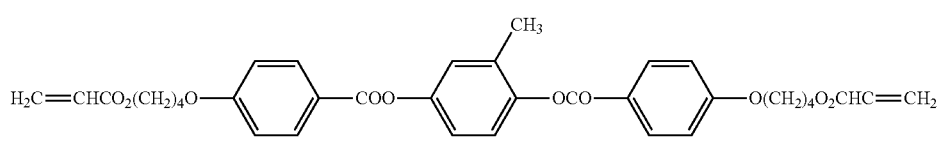
(9)
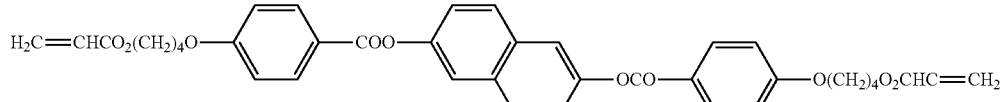
(10)
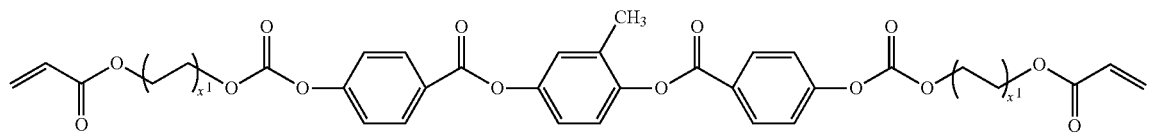
(11)
[In compound (11), $X^1$ is 2 to 5 (integer).]
Preferable examples of compounds used in a case where two or more rod-like liquid crystal compounds are used in combination will be shown below, but the present invention is not limited thereto.
Rod-Like Liquid Crystal Compounds
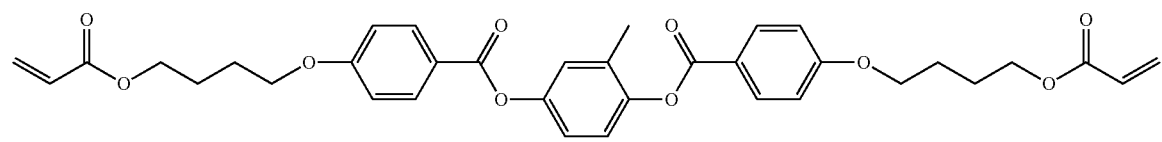
84%
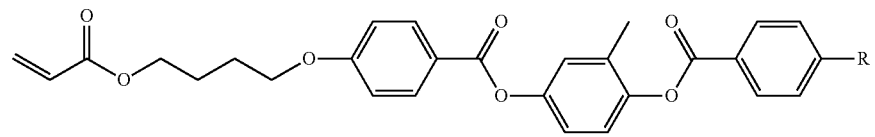
14%

-continued

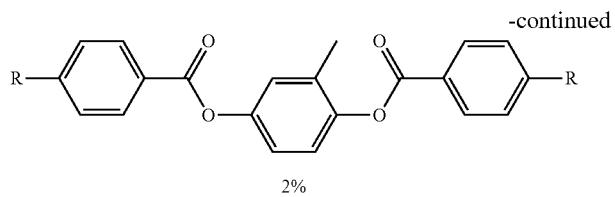

2%

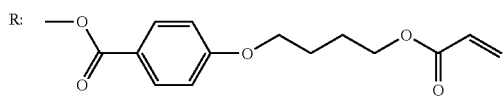

—Disk-Like Liquid Crystal Compound—

As the disk-like liquid crystal compound, for example, the compounds described in JP2007-108732A and JP2010-244038A can be preferably used, but the present invention is not limited thereto.

Preferable examples of the disk-like liquid crystal compound will be shown below, but the present invention is not limited thereto.

Compound 1

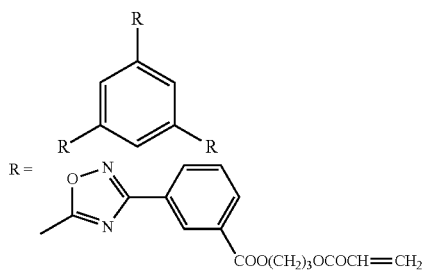

Compound 2

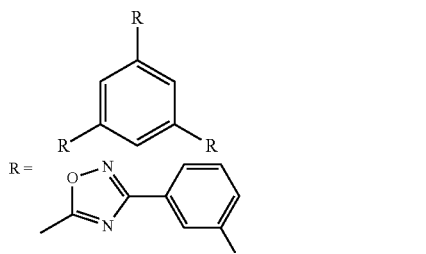

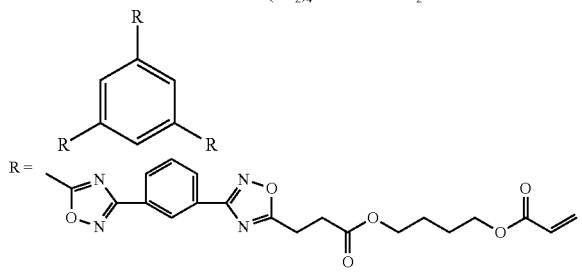

Discotic liquid crystal compound (A)

-continued

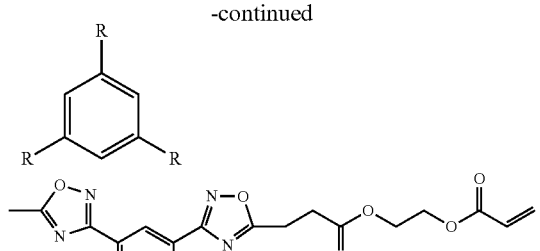

Discotic liquid crystal compound (B)

The amount of the liquid crystal compound added to the liquid crystal composition with respect to the mass of solid contents (mass excluding the solvent) of the liquid crystal composition is preferably 75% to 99.9% by mass, more preferably 80% to 99% by mass, and particularly preferably 85% to 90% by mass.

—Alkylcyclohexane Ring-Containing Compound—

The patterned optical anisotropic layer used in a case where reciprocal wavelength dispersion is adopted as the wavelength dispersion at Re preferably contains an alkylcyclohexane ring-containing compound. The alkylcyclohexane ring-containing compound is a compound having a cyclohexane ring, in which one hydrogen atom is substituted with a linear alkyl group, in a portion thereof Herein, for example, in a case where the compound has two cyclohexane rings as shown in Formula (2), "cyclohexane ring in which one hydrogen atom is substituted with a linear alkyl group" refers to a cyclohexane ring which is present on the molecular terminal side and in which one hydrogen atom is substituted with a linear alkyl group.

Examples of the alkylcyclohexane ring-containing compound include a compound having a structure represented by Formula (2). From the viewpoint of imparting moisture-heat resistance to the optically anisotropic layer, a compound represented by Formula (3) having a (meth)acryloyl group is preferable.

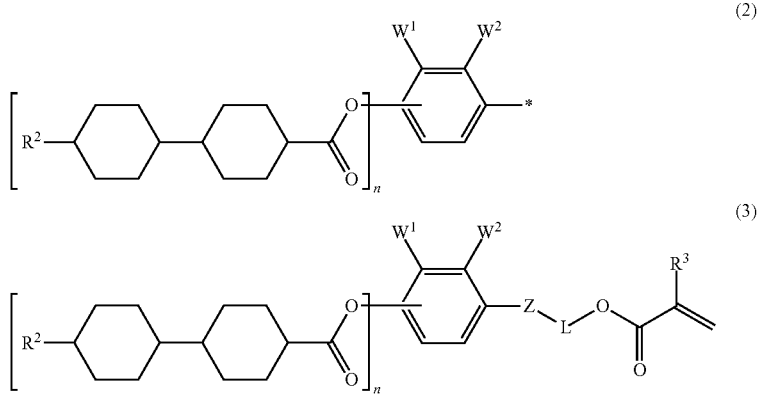

In Formula (2), * represents a binding position.

In Formulae (2) and (3), $R^2$ represents an alkyl group having 1 to 10 carbon atoms, n represents 1 or 2, $W^1$ and $W^2$ each represent an alkyl group, an alkoxy group, or a halogen atom. Furthermore, $W^1$ and $W^2$ may form a ring structure which may have a substituent by being bonded to each other.

In Formula (3), Z represents —COC— or —OCO—, L represents an alkylene group having 1 to 6 carbon atoms, and $R^3$ represents a hydrogen atom or a methyl group.

Specific examples of the alkylcyclohexane ring-containing compound include compounds represented by Formulae A-1 to A-5. In Formula A-3, $R^4$ represents an ethyl group or a butyl group.

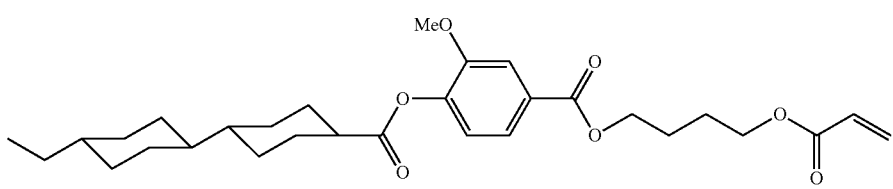

A-1

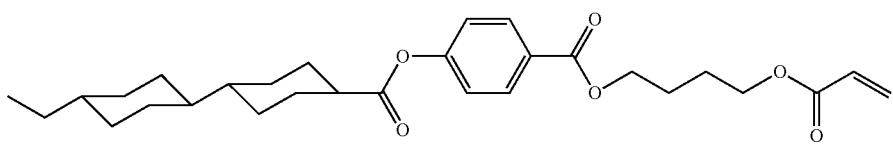

A-2

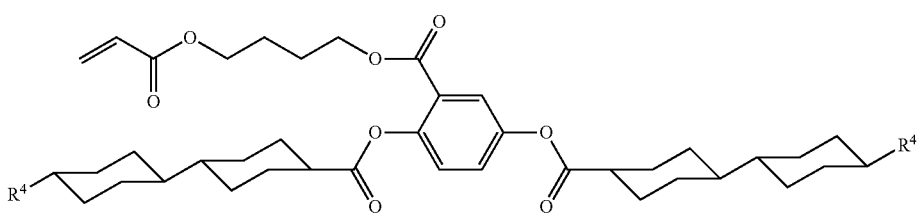

A-3

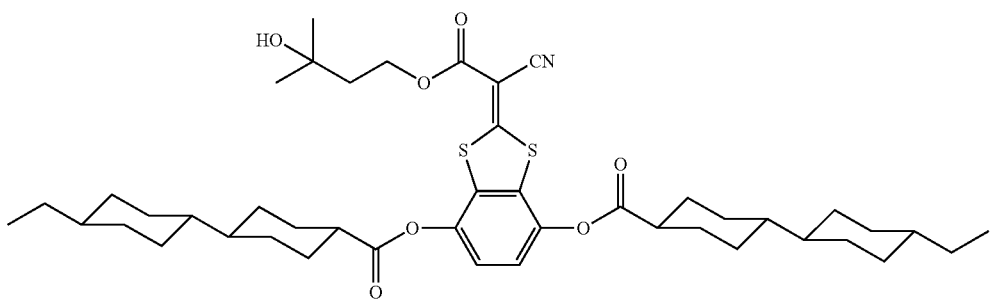

A-4

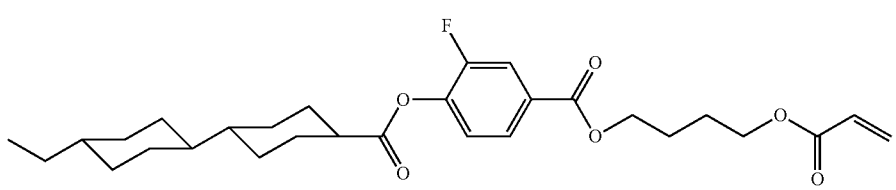

A-5

—Alignment Control Agent—

Examples of the alignment control agent include the compounds exemplified in paragraphs "0092" and "0093" in JP2005-99248A, the compounds exemplified in paragraphs "0076" to "0078" and "0082" to "0085" in JP2002-129162A, the compounds exemplified in paragraphs "0094" and "0095" in JP2005-99248A, and the compounds exemplified in paragraph "0096" in JP2005-99248A.

As a fluorine-based alignment control agent, the compounds described in paragraphs "0082" to "0090" in JP2014-119605A and the fluorine (meth)acrylate-based polymers described in paragraphs "0018" to "0043" in JP2007-272185A are preferable.

As the alignment control agent, the fluorine (meth)acrylate-based polymers described in paragraphs "0018" to "0043" in JP2007-272185A can be preferably used, and the description of the specification is incorporated into the present invention.

One kind of alignment control agent may be used singly, or two or more kinds thereof may be used in combination.

In a case where the patterned optical anisotropic layer as a −A-plate is formed, it is preferable to form a patterned optical anisotropic layer in which the disk-like liquid crystal compound having a polymerizable group is vertically aligned. In this case, as the alignment control agent in the liquid crystal composition, it is preferable to use an onium salt compound (alignment control agent for the alignment film side) or a fluoroaliphatic group-containing copolymer (alignment control agent for the air interface) described below.

—Onium Salt Compound (Alignment Control Agent for Alignment Film Side)—

As described above, in order to vertically align the liquid crystal compound having a polymerizable group, particularly, the disk-like liquid crystal compound having a polymerizable group, it is preferable to add an onium salt. The onium salt is localized within the interface of an alignment film and functions to increase the tilt angle of the liquid crystal molecule in the vicinity of the interface of the alignment film.

As the onium salt, a compound represented by General Formula (1) is preferable.

$$Z—(Y—L—)_n Cy^+ \cdot X^-$$ General Formula (1)

In the formula, Cy represents an onium group as a 5- or 6-membered ring, L, Y, Z, and, X have the same definition as $L^{23}(L^{24})$, $Y^{22}(Y^{23})$ $Z^{21}$, and X respectively that are in General Formulae (2a) and (2b) which will be described later, and n represents an integer of equal to or greater than 2.

A preferable range of each of L, Y, Z, and X is the same as a preferable range of each of $L^{23}(L^{24})$, $Y^{22}(Y^{23})$, $Z^{21}$, and X in General Formulae (2a) and (2b) which will be described later.

As the onium group (Cy) as a 5- or 6-membered ring, a pyrazolium ring, an imidazolium ring, a traizolium ring, a tetrazolium ring, a pyridinium ring, a pyrazinium ring, a pyrimidinium ring, and a triazinium ring are preferable, and an imidazolium ring and a pyridinium ring are particularly preferable.

It is preferable that the onium group (Cy) as a 5- or 6-membered ring has a group having affinity with the material of the alignment film. In a portion (unexposed portion) in which an acid generator is not decomposed, the onium salt compound exhibits high affinity with respect to the material of the alignment film and is localized within the interface of the alignment film. In contrast, in a portion (exposed portion) in which an acid generator is decomposed and generates an acidic compound, the affinity is reduced due to the ion exchange the anion of the onium salt undergoes, and hence the localization properties thereof within the interface of the alignment film deteriorates. Within the range of a temperature (at about a room temperature to 150° C.) actually used at the time of aligning the liquid crystals, hydrogen bonding can be established or disappear. Therefore, it is preferable to exploit the affinity based on the hydrogen bonding, but the present invention is not limited to this example.

For example, in an aspect in which polyvinyl alcohol is used as the material of the alignment film, in order to form a hydrogen bond between the onium salt and a hydroxyl group of polyvinyl alcohol, it is preferable that the onium salt has a hydrogen bonding group. The theoretical interpretation of hydrogen bonding is reported in, for example, H, Uneyama and K. Morokuma, Journal of American Chemical Society, Vol. 99, pp. 1316~1332, 1977. Specific examples of the pattern of the hydrogen bonding include those described in J. N. Israelachvili, "Intermolecular Force and Surface Force", translated by Tamotsu Kondo and Hiroyuki Oshima, McGraw-Hill Education, p. 98, FIG. 17, 1991. Specific examples of the hydrogen bonding include those described in G. R. Desiraju, Angewante Chemie International Edition English, vol. 34, p. 2311, 1995.

In addition to the effect of the affinity of the onium group, by forming a hydrogen bond with polyvinyl alcohol, the onium salt as a 5- or 6-membered ring having a hydrogen bonding group improves the surface localization properties within the interface of the alignment film and promotes the function of imparting orthogonal alignment properties with respect to the polyvinyl alcohol main chain. Examples of preferable hydrogen bonding groups include an amino group, a carbonamide group, a sulfonamide group, an acid amide group, a ureide group, a carbamoyl group, a carboxyl group, a sulfo group, and a nitrogen-containing heterocyclic group (for example, an imidazolyl group, a benzimidazolyl group, a pyrazolyl group, a pyridyl group, a 1,3,5-triazyl group, a pyrimidyl group, a pyridazyl group, a quinolyl group, a benzothiazolyl group, a succinimide group, a phthalimide group, a maleimide group, a uracil group, a thiouracil group, a barbituric acid group, a hydantoin group, a maleic acid hydrazide group, an isatin group, a uramil group, and the like). Among these hydrogen bonding groups, an amino group and a pyridyl group are more preferable.

It is also preferable that the 5- or 6-membered onium ring contains an atom having a hydrogen bonding group (for example, a nitrogen atom of an imidazolium ring).

n is preferably an integer of 2 to 5, more preferably 3 or 4, and particularly preferably 3. A plurality of L's and Y's may be the same as or different from each other. In a case where n is equal to or greater than 3, the onium salt represented by General Formula (1) has three or more Y's each of which is a divalent linking group having a 5- or 6-membered ring as a partial structure. Accordingly, a strong intermolecular π-π interaction occurs between the onium salt and the disk-like liquid crystal compound. As a result, the vertical alignment of the disk-like liquid crystal compound can be realized, and particularly, on the polyvinyl alcohol alignment film, the orthogonal and vertical alignment with respect to the polyvinyl alcohol main chain can be realized.

The onium salt represented by General Formula (1) is particularly preferably a pyridinium compound represented by General Formula (2a) or an imidazolium compound represented by General Formula (2b).

The compounds represented by General Formulae (2a) and (2b) are added mainly for the purpose of controlling the alignment of the disk-like liquid crystal compound within the interface of the alignment film, and function to increase the tilt angle of the molecules of the disk-like liquid crystal compound in the vicinity of the interface of the alignment film.

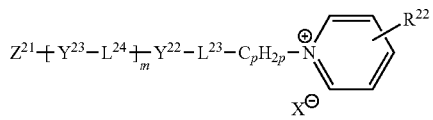

General Formula (2a)

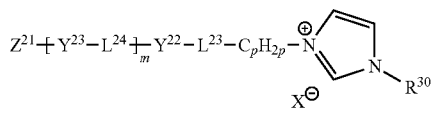

General Formula (2b)

In the formulae, $L^{23}$ and $L^{24}$ each represent a divalent linking group.

$L^{23}$ is preferably a single bond, —O—, —O—CO—, —CO—O—, —C≡C—, —CH═CH—, —CH═N—, —N═CH—, —N═N—, —O—AL—O—, —O—AL—O—CO—, —O—AL—CO—O—, —CO—O—AL—O—, —CO—O—AL—O—CO—, —CO—O—AL—CO—O—,
—O—CO—AL—O—, —O—CO—AL—O—CO—, or —O—CO—AL—CO—O—. AL is an alkylene group having 2 to 10 carbon atoms. $L^{23}$ is preferably a single bond, —O—, —O—AL—O—, —O—AL—O—CO—, —O—AL—CO—O—, —CO—O—AL—O—, —CO—O—AL—O—CO—, —CO—O—AL—CO—O—, —O—CO—AL—O—, —O—CO—AL—O—CO—, or —O—CO—AL—CO—O—, more preferably a single bond or —O—, and most preferably —O—.

$L^{24}$ is preferably a single bond, —O—, —O—CO—, —CO—O—, —C≡C—, —CH═CH—, —CH═N—, —N═CH—, or —N═N—, and more preferably —O—CO— or —CO—O—. In a case where m is equal to or greater than 2, a plurality of $L^{24}$'s are even more preferably —O—CO— and —CO—O— that alternate with each other.

$R^{22}$ is a hydrogen atom, an unsubstituted amino group, or a substituted amino group having 1 to 20 carbon atoms.

In a case where $R^{22}$ is a dialkyl-substituted amino group, two alkyl groups may form a nitrogen-containing heterocyclic ring by being bonded to each other. The nitrogen-containing heterocyclic ring formed at this time is preferably a 5- or 6-membered ring. $R^{22}$ is more preferably a hydrogen atom, an unsubstituted amino group, or a dialkyl-substituted amino group having 2 to 12 carbon atoms, and even more preferably a hydrogen atom, an unsubstituted amino group, or a dialkyl-substituted amino group having 2 to 8 carbon atoms. In a case where $R^{22}$ is an unsubstituted amino group and a substituted amino group, it is preferable that the 4-position of a pyridinium ring is substituted.

X is an anion.

X is preferably a monovalent anion. Examples of the anion include a halide ion (a fluorine ion, a chlorine ion, a bromine ion, or an iodine ion) and a sulfonate ion (for example, a methanesulfonate ion, a p-toluenesulfonate ion, or a benzenesulfonate ion).

$Y^{22}$ and $Y^{23}$ each represent a divalent linking group having a 5- or 6-membered ring as a partial structure.

The 5- or 6-membered ring may have a substituent. It is preferable that at least one of $Y^{22}$ or $Y^{23}$ is a divalent linking group having a 5- or 6-membered ring, which has a substituent, as a partial structure. It is preferable that $Y^{22}$ and $Y^{23}$ each independently represent a divalent linking group having a 6-membered ring, which may have a substituent, as a partial structure. The 6-membered ring includes an aliphatic ring, an aromatic ring (benzene ring), and a heterocyclic ring. Examples of the 6-membered aliphatic ring include a cyclohexane ring, a cyclohexene ring, and a cyclohexadiene ring. Examples of the 6-membered heterocyclic ring include a pyran ring, a dioxane ring, a dithian ring, a thiin ring, a pyridine ring, a piperidine ring, an oxazine ring, a morpholine ring, a thiazine ring, a pyridazine ring, a pyrimidine ring, a pyrazine ring, a piperazine ring, and a triazine ring. Another 6-membered ring or 5-membered ring may be fused with the 6-membered ring.

Examples of the substituent include a halogen atom, a cyano group, an alkyl group having 1 to 12 carbon atoms, and an alkoxy group having 1 to 12 carbon atoms. The alkyl group and the alkoxy group may be substituted with an acyl group having 2 to 12 carbon atoms or an acyloxy group having 2 to 12 carbon atoms. As the substituent, an alkyl group having 1 to 12 carbon atoms (more preferably having 1 to 6 carbon atoms, and even more preferably having 1 to 3 carbon atoms) is preferable. The number of substituents may be equal to or greater than 2. For example, in a case where $Y^{22}$ and $Y^{23}$ represent a phenylene group, the phenylene group may be substituted with one to four alkyl groups having 1 to 12 carbon atoms (more preferably having 1 to 6 carbon atoms, and even more preferably having 1 to 3 carbon atoms).

m is 1 or 2, and preferably 2. In a case where m is 2, a plurality of $Y^{23}$'s and $L^{24}$'s may be the same as or different from each other.

$Z^{21}$ is a monovalent group selected from the group consisting of a halogen-substituted phenyl group, a nitro-substituted phenyl group, a cyano-substituted phenyl group, a phenyl group substituted with an alkyl group having 1 to 10 carbon atoms, a phenyl group substituted with an alkoxy group having 2 to 10 carbon atoms, an alkyl group having 1 to 12 carbon atoms, an alkynyl group having 2 to 20 carbon atoms, an alkoxy group having 1 to 12 carbon atoms, an alkoxycarbonyl group having 2 to 13 carbon atoms, an aryloxycarbonyl group having 7 to 26 carbon atoms, and an arylcarbonyloxy group having 7 to 26 carbon atoms.

In a case where m is 2, $Z^{21}$ is preferably a cyano group, an alkyl group having 1 to 10 carbon atoms, or an alkoxy group having 1 to 10 carbon atoms, and more preferably an alkoxy group having 4 to 10 carbon atoms.

In a case where m is 1, $Z^{21}$ is preferably an alkyl group having 7 to 12 carbon atoms, an alkoxy group having 7 to 12 carbon atoms, an acyl-substituted alkyl group having 7 to 12 carbon atoms, an acyl-substituted alkoxy group having 7 to 12 carbon atoms, an acyloxy-substituted alkyl group having 7 to 12 carbon atoms, or an acyloxy-substituted alkoxy group having 7 to 12 carbon atoms.

An acyl group is represented by —CO—R, and an acyloxy group is represented by —O—CO—R. R is an aliphatic group (an alkyl group, a substituted alkyl group, an alkenyl group, a substituted alkenyl group, an alkynyl group, or a substituted alkynyl group) or an aromatic group (an aryl group or a substituted aryl group). R is preferably an aliphatic group, and more preferably an alkyl group or an alkenyl group.

p is an integer of 1 to 10, and is particularly preferably 1 or 2. $C_pH_{2p}$ represents a chain-like alkylene group which may have a branched structure. $C_pH_{2p}$ is preferably a linear alkylene group (—$(CH_2)_p$—).

In General Formula (2b), $R^{30}$ is a hydrogen atom or an alkyl group having 1 to 12 carbon atoms (more preferably having 1 to 6 carbon atoms and even more preferably having 1 to 3 carbon atoms).

Among the compounds represented by General Formula (2a) or (2b), compounds represented by General Formula (2a') or (2b') are preferable.

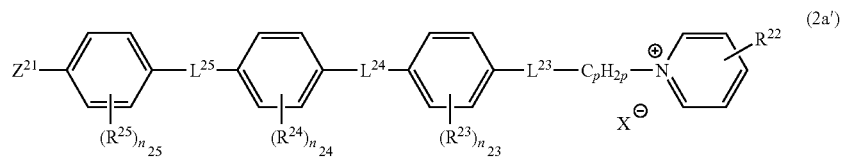

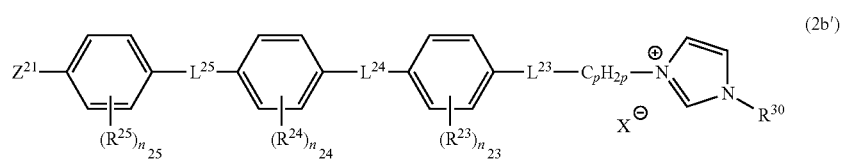

In General Formulae (2a') and (2b'), the same references as in General Formula (2a) have the same definition, and the preferred range thereof is also the same. $L^{25}$ has the same definition as $L^{24}$, and the preferable range thereof is also the same. $L^{24}$ and $L^{25}$ preferably represent —O—CO— or —CO—O—. It is preferable that $L^{24}$ represents —O—CO—, and $L^{25}$ represents —CO—O—.

$R^{23}$, $R^{24}$, and $R^{25}$ each represent an alkyl group having 1 to 12 carbon atoms (more preferably having 1 to 6 carbon atoms, and even more preferably having 1 to 3 carbon atoms). $n_{23}$ represents 0 to 4, $n_{24}$ represents 1 to 4, and $n_{25}$ represents 0 to 4. It is preferable that $n_{23}$ and $n_{25}$ represent 0, and $n_{24}$ represents 1 to 4 (more preferably represents 1 to 3).

$R^{30}$ is preferably an alkyl group having 1 to 12 carbon atoms (more preferably having 1 to 6 carbon atoms, and even more preferably having 1 to 3 carbon atoms).

Specific examples of the compound represented by General Formula (1) include the compounds described in paragraphs "0058" to "0061" in the specification of JP2006-113500A.

Specific examples of the compound represented by General Formula (1) will be shown below. In the formulae, the anion (X⁻) is not shown.

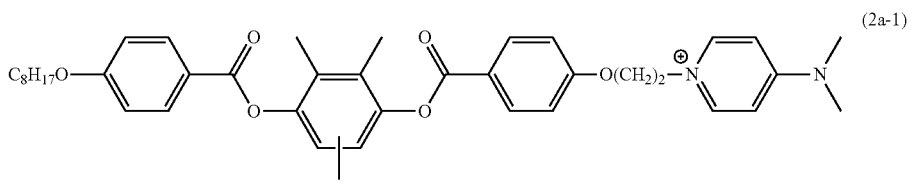

(2a-1)

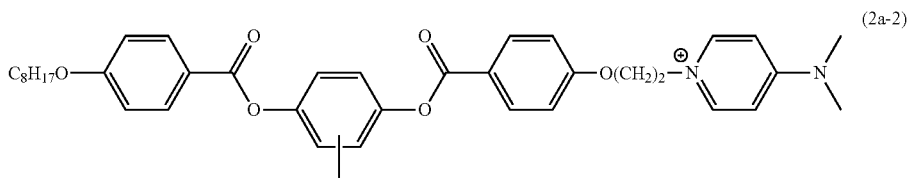

(2a-2)

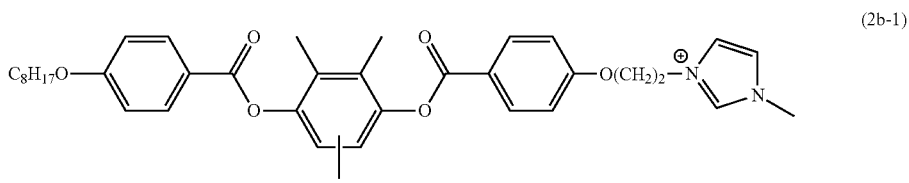

(2b-1)

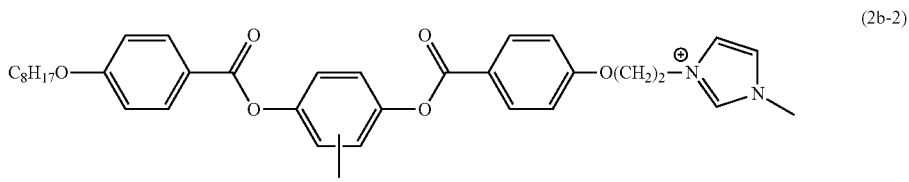

(2b-2)

The compounds of General Formula (2a) and (2b) can be manufactured by general methods. For example, a pyridinium derivative of General Formula (2a) generally can be obtained by alkylating a pyridine ring (Menschutkin reaction).

The amount of the onium salt added does not exceed 5% by mass with respect to the liquid crystal compound, and is preferably about 0.1 to 2% by mass.

Because the pyridinium group or the imidazolium group is hydrophilic, the onium salts represented by General Formulae (2a) and (2b) are localized within the surface of the polyvinyl alcohol alignment film. Particularly, in a case where a pyridinium group is further substituted with an amino group which is a hydrogen atom acceptor (in a case where $R^{22}$ in General Formulae (2a) and (2a') is an unsubstituted amino group or a substituted amino group having 1 to 20 carbon atoms), intermolecular hydrogen bonding occurs between the onium salts and polyvinyl alcohol, and hence the onium salts are localized within the surface of the alignment film at a higher density. Furthermore, due to the effect of the hydrogen bonding, the pyridinium derivative is aligned in a direction orthogonal to the main chain of polyvinyl alcohol, and accordingly, orthogonal alignment of the liquid crystals are promoted with respect to the rubbing direction. Because the pyridinium derivative has a plurality of aromatic rings in the molecule, strong intermolecular π-π interaction occurs between the pyridinium derivative and the liquid crystal, particularly, the disk-like liquid crystal compound described above, and as a result, the orthogonal alignment of the disk-like liquid crystal compound in the vicinity of the interface of the alignment film is induced. Particularly, in a case where a hydrophobic aromatic ring is linked to the hydrophilic pyridinium group as shown in General Formula (2a'), the effect of hydrophobicity brings about an effect of inducing vertical alignment.

In a case where the onium salts represented by General Formulae (2a) and (2b) are used in combination, anion exchange occurs between the onium salts and an acidic compound released from a photoacid generator due to photolysis, and the hydrogen bonding force and the hydrophilicity of the onium salts change. As a result, the localization properties of the onium salts within the interface of the alignment film deteriorate, and parallel alignment is promoted in which the liquid crystals are aligned in a state where the slow axis thereof is parallel to the rubbing direction. This is because due to the salt exchange, the onium salts are uniformly dispersed in the alignment film, the density of the onium salts within the surface of the alignment film is reduced, and the liquid crystals are aligned by the anchoring force of the rubbing alignment film.

Preferable examples of the onium salt compound (alignment control agent for the alignment film side) will be shown below, but the present invention is not limited thereto.

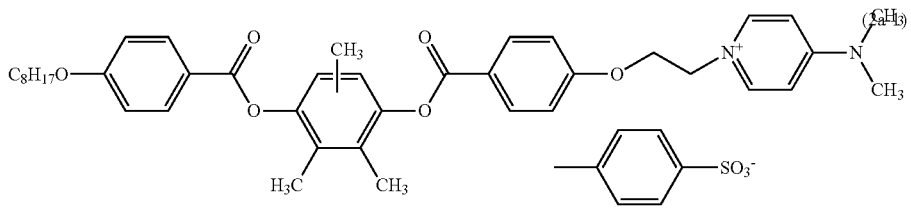

Pyridinium salt (A)

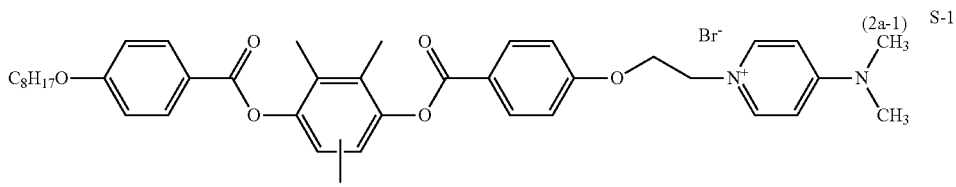

—Fluoroaliphatic Group-Containing Copolymer (Alignment Control Agent for Air Interface)—

The fluoroaliphatic group-containing copolymer is added for the purpose of controlling the alignment of the liquid crystals within the air interface, and functions to increase the tilt angle of the liquid crystal molecules in the vicinity of the air interface. Furthermore, the fluoroaliphatic group-containing copolymer also improves coating properties such as unevenness or cissing.

As the fluoroaliphatic group-containing copolymer usable in the present invention, it is possible to use those selected from the compounds described in JP2004-333852A, JP2004-333861A, JP2005-134884A, JP2005-179636A, and JP2005-181977A and the specifications thereof, and the like. Particularly, the polymers described JP2005-179636A and JP2005-181977A and the specifications thereof are preferable which contains, on a side chain, a fluoroaliphatic group and one or more kinds of hydrophilic groups selected from the group consisting of a carboxyl group (—COOH), a sulfo group (—SO$_3$H), phosphonooxy {—OP(=O)(OH)$_2$} and salts of these.

The amount of the fluoroaliphatic group-containing copolymer added does not exceed 2% by mass with respect to the liquid crystal compound, and is preferably about 0.1 to 1% by mass.

The fluoroaliphatic group-containing copolymer can improve the localization properties of the onium salt within the air interface by the hydrophobic effect of the fluoroaliphatic group, provide a field of low surface energy on the air interface side, and increase the tilt angle of the liquid crystal, particularly, the disk-like liquid crystal compound. Furthermore, in a case where the alignment control agent has a copolymer component containing, on a side chain, one or more kinds of hydrophilic groups selected from the group consisting of a carboxyl group (—COOH), a sulfo group (—SO$_3$H), phosphonooxy {—OP(=O)(OH)$_2$} and salts of these, due to the charge repulsion between these anions and π electrons of the liquid crystals, the vertical alignment of the liquid crystal compound can be realized.

Preferable examples of the fluoroaliphatic group-containing copolymer (alignment control agent for the air interface) will be shown below, but the present invention is not limited thereto.

Polymer A

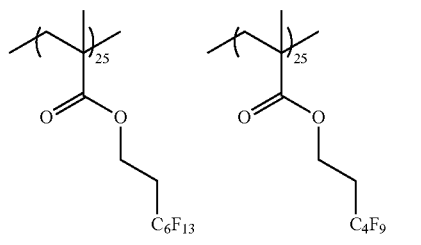

Polymer B

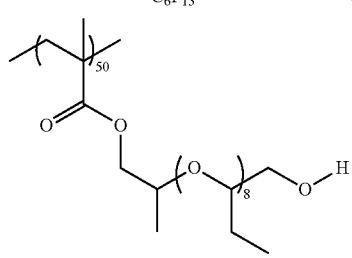

a is 90, and b is 10

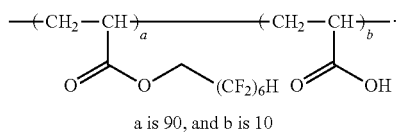

T-1

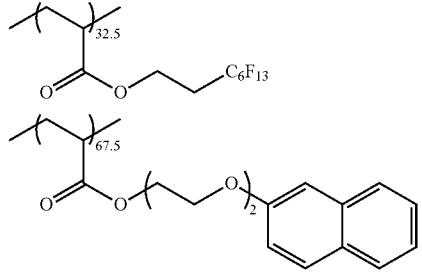

The amount of the alignment control agent added to the liquid crystal composition with respect to the total mass of the liquid crystal compound is preferably 0.01% by mass to 10% by mass, more preferably 0.01% by mass to 5% by mass, and particularly preferably 0.02% by mass to 1% by mass.

—Polymerization Initiator—

Examples of the polymerization initiator include α-carbonyl compounds (described in the specifications of U.S. Pat. No. 2,367,661B and U.S. Pat. No. 2,367,670B), acyloin ethers (described in the specification of U.S. Pat. No. 2,448,828B), α-hydrocarbon-substituted aromatic acyloin compounds (described in the specification of U.S. Pat. No. 2,722,512B), polynuclear quinone compounds (described in the specifications of U.S. Pat. No. 3,046,127B and U.S. Pat. No. 2,951,758B), a combination of a triaryl imidazole dimer and p-aminophenylketone (described in the specification of U.S. Pat. No. 3,549,367B), acridine and phenazine compounds (described in the specifications of JP1985-105667A (JP-S60-105667A) and U.S. Pat. No. 4,239,850B), oxadiazole compounds (described in the specification of U.S. Pat. No. 4,212,970B), acylphosphine oxide compounds (described in the specifications of JP1988-40799B (JP-S63-40799B), JP1993 -29234B (JP-H05-29234B), JP 1998-95788A (JP-H10-95788A), JP1998-29997A (JP-H10-29997A)), and the like.

Examples of commercially available polymerization initiators include IRGACURE 907, IRGACURE 184, and IRGACURE OXE-01 (all manufactured by BASF SE) which are photopolymerization initiators, KAYACURE DETX (manufactured by Nippon Kayaku Co., Ltd.) which is a sensitizer, and the like.

In an aspect in which a polymerization reaction proceeds by ultraviolet irradiation, the polymerization initiator used is preferably a photopolymerization initiator which can initiate the polymerization reaction by ultraviolet irradiation.

The content of the photopolymerization initiator in the liquid crystal composition with respect to the content of the polymerizable liquid crystal compound is preferably 0.1% to 20% by mass, and more preferably 0.5% to 12% by mass.

—Solvent—

As the solvent of the liquid crystal composition, an organic solvent is preferably used. Examples of the organic solvent include an amide (for example, N,N-dimethylformamide), a sulfoxide (for example, dimethylsulfoxide), a heterocyclic compound (for example, pyridine), a hydrocarbon (for example, benzene or hexane), an alkyl halide (for example, chloroform or dichloromethane), an ester (for example, methyl acetate or butyl acetate), a ketone (for example, acetone, methyl ethyl ketone, cyclohexanone, or cyclopentanone), and an ether (for example, tetrahydrofuran or 1,2-dimethoxyethane). Among these, an alkyl halide and a ketone are preferable, and methyl ethyl ketone is preferable. Two or more kinds of organic solvents may be used in combination.

(Method for Manufacturing Patterned Optical Anisotropic Layer)

Hereinafter, the method for manufacturing the patterned optical anisotropic layer usable in the present invention will be specifically described.

In the method for manufacturing the patterned optical anisotropic layer, the phase difference regions are preferably formed by using the liquid crystal composition, by using the same curable liquid crystal composition containing liquid crystals as a main component, or by pattern exposure.

As the method for forming the patterned optical anisotropic layer, for example, a method is preferable in which the liquid crystal compound is immobilized in the aligned state by using a liquid crystal composition containing a liquid crystal compound and the like. Examples of the method for immobilizing the liquid crystal used at this time suitably include a method of causing a polymerization by using a liquid crystal compound having a polymerizable group as a liquid crystal compound and immobilizing the liquid crystal compound, and the like. In the present invention, the patterned optical anisotropic layer can be formed on any support or polarizer.

More specifically, a first method for forming the patterned optical anisotropic layer is a method of exploiting a plurality of actions affecting the control of the liquid crystal alignment and then canceling one of the actions by using an external stimulus (a heat treatment or the like) such that a predetermined alignment control action becomes predominant. For example, by using the alignment controllability based on the alignment film and the alignment controllability of the alignment control agent added to the liquid crystal composition in combination, the liquid crystals are caused to be in a predetermined alignment state and immobilized such that one phase difference region is formed. Then, by using an external stimulus (a heat treatment or the like), one of the actions (for example, the action based on the alignment control agent) is canceled such that the other alignment control action (the action based on the alignment film) becomes predominant. In this way, another alignment state is realized, and by immobilizing the alignment state, another phase difference region is formed. For example, because a pyridinium group or an imidazolium group is hydrophilic, a predetermined pyridinium compound or imidazolium compound is localized within the surface of the hydrophilic polyvinyl alcohol alignment film. Particularly, in a case where the pyridinium group is further substituted with an amino group which is a substituent of a hydrogen atom acceptor, intermolecular hydrogen bonding occurs between the pyridinium compound and polyvinyl alcohol. Accordingly, the pyridinium compound is localized on the surface of the alignment film at a higher density, and due to the effect of the hydrogen bonding, the pyridinium derivative is aligned in a direction orthogonal to the main chain of polyvinyl alcohol. As a result, the orthogonal alignment of the liquid crystals in the rubbing direction is promoted. Because the pyridinium derivative has a plurality of aromatic rings in the molecule, a strong intermolecular n-n interaction occurs between the pyridinium derivative and the liquid crystal, particularly, the disk-like liquid crystal compound described above, and consequently, the orthogonal alignment of the disk-like liquid crystal compound in the vicinity of the interface of the alignment film is induced. Particularly, in a case where a hydrophobic aromatic ring is linked to the hydrophilic pyridinium group, the effects of the hydrophobicity also brings about an effect of inducing vertical alignment. However, in a case where the compound is overheated to a certain temperature, the hydrogen bond is broken, the density of the pyridinium compound and the like within the surface of the alignment film is reduced, and hence the aforementioned effect disappears. As a result, the liquid crystals are aligned by the anchoring force of the rubbing alignment film and becomes a parallel alignment state. The aforementioned method is specifically described in paragraphs "0014" to "0132" in JP2012-8170A, the content of which is incorporated into the present specification by reference.

A second method for forming the patterned optical anisotropic layer is a method of using a patterned alignment film. In this method, patterned alignment films having different alignment controllabilities are formed, and the liquid crystal composition is disposed thereon, and the liquid crystals are aligned. By the alignment controllabilities of the respective patterned alignment films, the alignment of the liquid crystals is controlled, and the liquid crystals achieve different alignment states respectively. By immobilizing the respective alignment states, patterns of the phase difference regions are formed according to the patterns of the alignment films. The patterned alignment films can be formed using a printing method, mask rubbing performed on a rubbing alignment film, mask exposure performed on a photoalignment film, or the like. Furthermore, it is possible to form the patterned alignment films by uniformly forming alignment films and printing additives (for example, the aforementioned onium salt and the like) affecting the alignment controllability on the alignment film according to predetermined patterns separately prepared. The printing method is specifically described in paragraphs "0013" to "0116" and "0166" to "0181" in JP2012-32661A, the content of which is incorporated into the present specification by reference. The mask exposure performed on the photoalignment film will be specifically described later in the section of the alignment film.

The first method and the second method may be used in combination. For example, a photoacid generator may be added to the alignment film. In this case, by adding the photoacid generator to the alignment film, two or more kinds of phase difference regions can be formed by setting the exposure amount (exposure intensity) to be a certain value or to be zero.

That is, by pattern exposure, a region in which the photoacid generator is decomposed, and thus an acidic compound is generated and a region in which the photoacid generator is not decomposed, and thus an acidic compound is not generated are formed. In the portion which is not irradiated with light, the photoacid generator substantially remains undecomposed. Therefore, the alignment state is controlled by the interaction among the material of the alignment film, the liquid crystals, and the alignment control agent which is added as desired, and the liquid crystals are aligned such that the slow axes thereof are orthogonal to the rubbing direction. In a case where the alignment film is irradiated with light, and thus an acidic compound is generated, the alignment state is controlled not by the aforementioned interaction but by the rubbing direction of the rubbing alignment film. Consequently, the liquid crystals are in parallel alignment in which the slow axes thereof are parallel to the rubbing direction. As the photoacid generator used in the alignment film, water-soluble compounds are preferably used. The aforementioned method is specifically described in paragraphs "0013" to "0175" in JP2012-150428A, the content of which is incorporated into the present specification by reference.

Preferable method used for forming the patterned optical anisotropic layer include a method using a patterned alignment film.

In the method for forming the patterned optical anisotropic layer, it is preferable to coat the surface of the patterned alignment film with one kind of composition which is prepared as a coating solution and contains liquid crystals having a polymerizable group as a main component. The coating of the liquid crystal composition can be performed by a method of spreading a material obtained by making the liquid crystal composition into a solution by using a solvent or a material obtained by making the liquid crystal composition into a liquid such as a molten liquid by means of heating, by an appropriate method such as a roll coating method, a gravure printing method, or a spin coating method. Furthermore, the coating can be performed by various methods such as a wire bar coating method, an extrusion coating method, a direct gravure coating method, a reverse gravure coating method, and a die coating method. In addition, a coating film can also be formed by jetting the liquid crystal composition from a nozzle by using an ink jet device.

Then, it is preferable to maintain and immobilize the alignment state of the molecules of the liquid crystal compound by curing the liquid crystal composition. The curing is preferably performed by the polymerization reaction of the polymerizable group introduced into the liquid crystal molecules.

Before the polymerization reaction for curing that is performed after the coating of the liquid crystal composition, the coating film may be dried by known methods. For example, the coating film may be dried by being left as is or dried by heating.

In the step of coating and drying the liquid crystal composition, the liquid crystal molecules in the liquid crystal composition may be aligned.

The polymerization reaction includes a thermal polymerization reaction in which a thermal polymerization initiator is used and a photopolymerization reaction in which a photopolymerization initiator is used. Among these, a photopolymerization reaction is preferable. For the light irradiation performed for polymerizing the liquid crystal molecules, it is preferable to use ultraviolet rays. The irradiation energy may be equal to or higher than 1 mJ/cm$^2$, 20 mJ/cm$^2$, or 100 mJ/cm$^2$, and may be equal to or lower than 50 J/cm$^2$, 800 mJ/cm$^2$, or 400 mJ/cm$^2$. The illuminance of the ultraviolet rays is preferably 0.1 to 50 mW/cm$^2$, for example.

The optical properties of the liquid crystal composition based on the alignment of the liquid crystal molecules only need to be kept in the layer, and the liquid crystal composition of the patterned optical anisotropic layer obtained after curing does not need to exhibit the properties of liquid crystals. For example, the molecular weight of the liquid crystal composition may be increased by the curing reaction, and then the composition may lose the properties of liquid crystals.

In the formation of the patterned optical anisotropic layer, it is preferable that the alignment state of the patterned optical anisotropic layer is immobilized by the aforementioned curing. Herein, as the "immobilized" state of the liquid crystal phase, a state where the alignment of the liquid crystal compound is retained is a most typical and preferable aspect. However, the "immobilized" state is not limited thereto, and specifically means a state where the layer does not exhibit fluidity generally within a temperature range of 0° C. to 50° C. or within a temperature range of −30° C. to 70° C. under harsher conditions, and the immobilized alignment form can be stably maintained without changing the alignment state by an external field or an external force.

As the method for manufacturing the patterned optical anisotropic layer used in the first aspect of the laminate of the present invention, for example, it is preferable to align the liquid crystal compound such that the slow axes thereof are aligned orthogonal or parallel to the rubbing direction. In a case where the liquid crystal compound is aligned in this way, the directions of the first and second in-plane slow axes are determined, the first phase difference regions and the second phase difference regions having in-plane slow axes orthogonal to each other are formed, and the patterned optical anisotropic layer used in the first aspect of the laminate of the present invention can be formed.

Examples of the manufacturing method common to the patterned optical anisotropic layer used in the first aspect of the laminate of the present invention and the patterned optical anisotropic layer used in the second aspect of the laminate of the present invention include a method of aligning the slow axes of the liquid crystals according to the alignment abilities of each of the regions of the patterned photoalignment film having different alignment abilities.

Furthermore, by the alignment state of the liquid crystals in these steps, the optical characteristics (Re and Rth) of the patterned optical anisotropic layer are determined.

The thickness of the patterned optical anisotropic layer formed as described above is not particularly limited, but is preferably 0.1 to 10 µm and more preferably 0.5 to 5 µm.

<Optically Anisotropic Layer>

The first aspect of the laminate of the present invention and the second aspect of the laminate of the present invention includes a laminate including an optically anisotropic layer which is disposed between the second polarizer and the second patterned optical anisotropic layer, includes one layer or two or more layers, has an Re_off (550) of 240 to 310 nm at a wavelength of 550 nm in a direction of an azimuthal angle of 45° and a polar angle of 60° from the slow axis thereof, an Rth_off(550) of −50 to 50 nm at a wavelength of 550 nm in a direction of an azimuthal angle of 45° and a polar angle of 60° from the slow axis thereof; in which the Re_off(550) and the Rth_off(550) are values calculated from the Jones Matrix of the optically anisotropic layer at a wavelength of 550 nm in a direction of an azimuthal angle of 45° and a polar angle of 60° from the slow axis of the optically anisotropic layer; and the Jones Matrix of the optically anisotropic layer represents J calculated from Formula (ii) in a case where the optically anisotropic layer includes one layer and represents Jn*Jn−1*. . . *J2*J1 which is a product of the Jones matrix calculated from Formula (i) in a case where the optically anisotropic layer includes two or more layers;

Pout=(Jn*Jn−1*. . . *J2*J1)*Pin           (i)

Pout=J*Pin           (ii)

in Formulae (i) and (ii), Pout represents a final polarization state, Pin represents an incident polarization state, Jn represents the Jones Matrix of the nth layer in a case where the optically anisotropic layer includes two or more layers, J represents the Jones Matrix of the optically anisotropic layer in a case where the optically anisotropic layer includes one layer, and n represents an integer of equal to or greater than 2.

The optically anisotropic layer preferably has uniform retardation in the plane thereof, and is differentiated from the patterned optical anisotropic layer.

From the viewpoint of inhibiting the light leakage in all directions during the black display, it is preferable that the slow axis of the optically anisotropic layer is disposed such that an angle of 90°±5° is formed between the slow axis and the absorption axis of the first polarizer or the second polarizer.

(Re_off and Rth_off)

In the optically anisotropic layer, Re_off(550) at a wavelength of 550 nm is 240 to 310 nm, preferably 245 to 300 nm, and more preferably 250 to 290 nm.

In the optically anisotropic layer, Rth_off(550) at a wavelength of 550 nm is −50 to 50 nm, preferably −45 to 45 nm, and even more preferably −40 to 40 nm.

In the present specification, the significance of Re_off (550) and Rth_off(550) as Re and Rth of the laminate of the present invention in an oblique direction will be described below.

The polarization state, which is established after an incidence ray in a direction of a polar angle of 60° and an azimuthal angle of 45° passes through the optically anisotropic layer, is regarded as being in the position of a point X on the Poincare sphere shown in FIG. 4 of JP5657228B. Provided that there is an optically anisotropic layer, in which the Nz factor is uniform in the film thickness direction, Re is $Re_0$, and Rth is $Rth_0$, and that the incidence ray in the same direction is in the same polarization state after passing through the optically anisotropic layer (that is, in a case where the incidence ray returns to the position of the point X shown in FIG. 4 of JP5657228B), Re_off(550)=$Re_0$, and Rth_off(550)=$Rth_0$.

In the biaxial film as a phase difference film of the related art in which the Nz factor is uniform in the film thickness direction, Re=Re_off, and Rth=Rth_off. Therefore, Re and Rth do not need to be considered. However, in the optically anisotropic layer used in the present invention, instead of Re and Rth of the related art (Re and Rth measured in the axis direction (that is, the normal direction with respect to the film surface)), the Re_off and Rth_off actually correspond to the final polarization state established by the compensation provided in the oblique direction.

Mathematically, provided that the Jones Matrix of the optically anisotropic layer determined in a case where the optically anisotropic layer includes one layer is J; the Jones Matrix of the nth layer determined in a case where the optically anisotropic layer includes two or more layers is Jn; the incident polarization state is Pin; and the final polarization state is Pout, the polarization state established after the light passes through the nth optically anisotropic layer can be represented by Formula (i).

Pout=(Jn*Jn−1*. . . *J2*J1)*Pin           (i)

In contrast, in a case where the optically anisotropic layer includes one layer, the final polarization state can be represented by Formula (ii).

Pout=J*Pin           (ii).

That is, assuming that J in Formula (ii) equals the product (Jn*Jn−1* . . . *J2*J1) of the Jones Matrix of each layer in Formula (i), Re_off and Rth_off can be calculated from the Jones Matrix of the optically anisotropic layer.

The wavelength dispersion properties of Re_off and Rth_off of the optically anisotropic layer used in the present invention are not particularly limited. However, from the viewpoint of allowing different wavelengths to have the same polarization state or have polarization states close to each other, the wavelength dispersion is preferably reciprocal wavelength dispersion.

For example, in the optically anisotropic layer, Re_off and Rth_off exhibit the same wavelength dispersion properties within the range of visible light. Furthermore, for example, in the optically anisotropic layer, Re_off and Rth_off exhibit different wavelength dispersion properties within the range of visible light. In the optically anisotropic layer used in the present invention, the wavelength dispersion properties of Re_off and Rth_off can be expressed by adjusting the wavelength dispersion properties of each layer, more specifically, by adding up the wavelength dispersion of each layer. The wavelength dispersion properties of Re (Rth) of the optically anisotropic layer used in the present invention are also expressed by adding up the wavelength dispersion of Re (Rth) of each layer. Because a degree of the wavelength dispersion properties is approximately the same as that of Re_off and Rth_off, the wavelength dispersion properties can also be ascertained from the measured values thereof.

(Material of Optically Anisotropic Layer)

The material used in the optically anisotropic layer is not particularly limited as long as a desired retardation can be exhibited. Examples of the material include a liquid crystal composition containing a liquid crystal compound, a cellulose acylate film, and the like. The optically anisotropic layer may include one layer or two or more layers. Examples of the optically anisotropic layer include a laminate of a +A-plate and a +C-plate, a laminate of a −B-plate and a +C-plate, a λ/2 plate having Rth of about 0 nm, and the like.

Examples of the material used in the optically anisotropic layer include the materials such as a cellulose acylate film and additives described in paragraphs "0032" to "0120" in JP5657228B, the content of which is incorporated into the present invention.

As the method for forming the optically anisotropic layer, for example, a method is preferable in which the alignment state of the liquid crystal compound is immobilized using a liquid crystal composition containing a liquid crystal compound and the like. At this time, examples of the method for immobilizing the liquid crystal compound suitably include a method in which a liquid crystal compound having a polymerizable group is used as a liquid crystal compound and immobilized by being polymerized. In the present invention, the optically anisotropic layer can be formed on any support or polarizer.

The material used for forming the optically anisotropic layer is preferably a liquid crystal composition containing a liquid crystal compound, and the liquid crystal compound is preferably a polymerizable liquid crystal compound.

The optically anisotropic layer may be a layer obtained by immobilizing a liquid crystal phase, and is preferably a layer obtained by immobilizing a nematic liquid crystal phase.

A preferable range of the liquid crystal compound used in the optically anisotropic layer is the same as the preferable range of the liquid crystal compound used in the patterned optical anisotropic layer.

(Boron-Containing Compound)

From the viewpoint of making it easy to form a C-plate having reciprocal wavelength dispersion by vertically aligning a smectic liquid crystal compound, the optically anisotropic layer preferably contains a boron-containing compound. Examples of the boron-containing compound include the compounds described in paragraphs "0064" to "0079" in JP2014-191156A, the content of which is incorporated into the present specification.

A preferable example of the boron-containing compound will be shown below, but the present invention is not limited thereto.

S-2

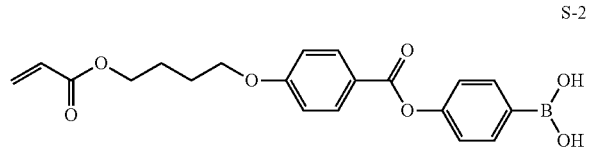 [SMILES: C=CC(=O)OCCCCOc1ccc(C(=O)Oc2ccc(B(O)O)cc2)cc1]

The content of the boron-containing compound in the liquid crystal composition with respect to the content of the liquid crystal compound is preferably 0.1% to 10% by mass, and more preferably 0.3% by mass to 1% by mass.

(Other Additives)

The liquid crystal composition containing the polymerizable liquid crystal compound may further contain an alignment control agent, a polymerization initiator, an onium salt compound, a polymerizable monomer without a mesogen skeleton, and the like. A preferable range of each of the alignment control agent, the polymerization initiator, the onium salt compound, and the solvent used in the optically anisotropic layer is the same as the preferable range of each of the materials used in the patterned optical anisotropic layer.

<Alignment Film>

The laminate of the present invention may have an alignment film. For example, the laminate may have an alignment film adjacent to the patterned optical anisotropic layer or an alignment film adjacent to the optically anisotropic layer. The alignment film has a function of controlling the alignment of liquid crystal molecules at the time of forming the patterned optical anisotropic layer or the optically anisotropic layer.

The alignment film can be provided by means of a rubbing treatment of an organic compound (preferably a polymer), performing oblique vapor deposition of an inorganic compound such as SiO, forming a layer having microgrooves, and the like. In addition, alignment films (preferably photoalignment films) are also known which obtain the alignment function by being applied with an electric field or a magnetic field or being irradiated with light.

Depending on the material of the underlayer of the patterned optical anisotropic layer or the optically anisotropic layer, even if the alignment film is not provided, it is possible to cause the underlayer to function as an alignment film by performing an alignment treatment (for example, a rubbing treatment) directly on the underlayer. Examples of supports that become such an underlayer include polyethylene terephthalate (PET).

In some cases, the underlayer functions as an alignment film on which a liquid crystal compound for preparing the patterned optical anisotropic layer or the optically anisotropic layer as an upper layer can be aligned. In these cases, even if an alignment film is not provided and a special alignment treatment (for example, a rubbing treatment) is not performed, the liquid crystal compound of the upper layer can be aligned.

Hereinafter, a photoalignment film as a preferable example will be described.

The materials of the photoalignment film used in a photoalignment film formed by light irradiation are described in a number of documents. Preferable examples of the materials include the azo compounds described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B, the aromatic ester compounds described in JP2002-229039A, the maleimide compounds having a photo-aligned unit and/or the alkenyl-substituted nadimide compounds described in JP2002-265541A and JP2002-317013A, the photo-crosslinking silane derivatives described in JP4205195B and JP4205198B, the photo-crosslinking polyimides, polyamides, or esters described in JP2003-520878A, JP2004-529220A, paragraphs "0024" to "0043" in WO2005/096041A, and JP4162850B, and the photodimerizable compounds, particularly, the cinnamate (cinnamic acid) compounds, the chalcone compounds, and the coumarin compounds described in JP1997-118717A (JP-H09-118717A), JP1998-506420A (JP-H10-506420A), JP2003-505561A, WO2010/150748A, paragraphs "0028" to "0176"

in JP2012-155308A, JP2013-177561A, and JP2014-12823A. Among these, the azo compounds, the photo-crosslinking polyimides, polyamides, or esters, the cinnamate compounds, and the chalcone compounds are particularly preferable.

Specific examples of particularly preferable materials of the photoalignment film include the compound represented by General Formula (1) in JP2006-285197A and the liquid crystal alignment agents having a photo-aligned group described in paragraphs "0028" to "0176" in JP2012-155308A. As the photoalignment film, LPP-JP265CP (trade name) manufactured by Rolic Technologies Ltd and the like can be used.

By irradiating the film formed of the aforementioned materials with linearly polarized light or unpolarized light, the photoalignment film can be manufactured.

Furthermore, a patterned photoalignment film is preferably formed using mask exposure or the like for the photoalignment film at the time of irradiating the film with linearly polarized light or unpolarized light. For example, the patterned photoalignment film, which is for forming the patterned optical anisotropic layers used in the first aspect of the laminate of the present invention and have the first and second regions that exhibit alignment abilities in different directions in the plane thereof and alternate with each other, can be formed by irradiating a photoalignment film with linearly polarized light having a specific polarization direction and then irradiating the photoalignment film with linearly polarized light in a different polarization direction by using a photomask having a desired pattern shape (for example, glass to which aluminum foil is bonded may be used). In addition, the patterned photoalignment film, which is for forming the patterned optical anisotropic layer used in the second aspect of the laminate of the present invention and has three or more regions which exhibit alignment abilities in different directions in the plane thereof and in which the directions of the alignment abilities continuously change, can be formed by repeating the following operation. In the operation, by an active energy ray irradiation device in which a polarizing plate and a light screen plate having a desired slit width are disposed, only a region corresponding to the slit width of the light screen plate is irradiated with linearly polarized light having a specific polarization direction, and thereafter, while the polarizing plate is being rotated by an arbitrary angle and the region corresponding to the slit width is being moved, the film is irradiated with linearly polarized light having a different polarization direction.

In the present specification, "irradiation with linearly polarized light" is an operation for causing a photoreaction in the material of a photoalignment film. The wavelength of the light used varies with the material of a photoalignment film used, and is not particularly limited as long as it is a wavelength necessary for the photoreaction. The peak wavelength of the light used for the light irradiation is preferably 200 nm to 700 nm. The light is more preferably ultraviolet rays having a peak wavelength of equal to or shorter than 400 nm.

Examples of light sources used for the light irradiation include generally used light sources such as lamps including a tungsten lamp, a halogen lamp, a xenon lamp, a xenon flash lamp, a mercury lamp, a mercury xenon lamp, and a carbon arc lamp, various lasers (for example, a semiconductor laser, a helium neon laser, an argon ion laser, a helium cadmium laser, and a yttrium aluminum garnet (YAG) laser), a light emitting diode, a cathode ray tube, and the like.

As means for obtaining linearly polarized light, it is possible to adopt a method of using a polarizing plate (for example, an iodine polarizing plate, a dichroic colorant polarizing plate, or a wire-grid polarizing plate), a method of using a prism-based element (for example, a Glan-Thompson prism) or a reflective-type polarizer exploiting the Brewster's angle, or a method of using light emitted from a laser light source exploiting polarization. Furthermore, by using a filter or a wavelength conversion element, only the light having a necessary wavelength may be selectively radiated.

In a case where the radiated light is linearly polarized light, a method is adopted in which the alignment film is irradiated from the top side or the reverse side thereof with the light in a direction perpendicular or oblique to the surface of the alignment film. The incidence angle of the light varies with the material of the photoalignment film, but is 0° to 90° (vertical) and preferably 40° to 90°.

In a case where unpolarized light is used, the film is irradiated with the unpolarized light in an oblique direction. The incidence angle of the light is 10° to 80°, preferably 20° to 60°, and particularly preferably 30° to 50°.

The irradiation time is preferably 1 to 60 minutes, and more preferably 1 to 10 minutes.

Depending on the material of the alignment film selected, the alignment film can be peeled from a temporary support for forming the patterned optical anisotropic layer or the optically anisotropic layer, or only the patterned optical anisotropic layer or the optically anisotropic layer can be peeled. By bonding the transferred (peeled) patterned optical anisotropic layer or optically anisotropic layer, a thin patterned optical anisotropic layer or optically anisotropic layer having a thickness of several micrometers can be provided. Furthermore, an aspect is also preferable in which a rubbing alignment film or a photoalignment film is directly laminated on the polarizer by coating, and an alignment function is imparted to the laminate by means of rubbing or a photoalignment treatment. That is, the laminate of the present invention may be a laminate having a polarizer and a photoalignment film or a rubbing alignment film on the surface of the linear polarizer.

In the present invention, an aspect of using a photoalignment film as an alignment film is particularly preferable, because in this aspect, a pretilt angle of the polymerizable rod-like liquid crystal compound contained in the patterned optical anisotropic layer or the optically anisotropic layer can be made 0°, and both the high contrast by which the light leakage in the front is reduced and the reduction in tint change in an oblique direction can be easily accomplished. It is preferable to impart the anchoring force to the photoalignment film used in the present invention by a step of irradiating the photoalignment film with polarized light in a vertical direction or an oblique direction or a step of irradiating the photoalignment film with unpolarized light in an oblique direction. The oblique direction adopted in a case where the photoalignment film is irradiated in an oblique direction is preferably a direction intersecting with the photoalignment film at an angle of 5° to 45°, and more preferably a direction intersecting with the photoalignment film at an angle of 10° to 30°. The photoalignment film may be irradiated with ultraviolet rays preferably at an irradiation intensity of 200 to 2,000 mJ/cm$^2$.

<Light-Transmitting Substrate>

The laminate of the present invention may include a light-transmitting substrate.

The light-transmitting substrate is a glass plate or a plastic substrate such as an acryl plate. For example, in a case where a polarizing plate is used, which is obtained by laminating two sheets of polarizers having absorption axes orthogonal to each other and exhibiting linear polarization ability, on the substrate, according to the incidence angle of light, the adjustment of the transmittance of transmitted light, that is, light control can be performed. Furthermore, even with the patterned optical anisotropic layer which will be described later, light control can be performed. The polarization ability mentioned herein refers to an ability to make linearly polarized light from unpolarized light or circularly polarized light or to convert linearly polarized light into circularly polarized light. The polarization ability can be changed by applying a phase difference.

As the light-transmitting substrate, it is possible to use glass plates used in general windows and plastic substrates such as an acryl plate, a polycarbonate plate, and a polystyrene plate. The preferable range of a thickness of the light-transmitting substrate varies with the use. For building windows, the thickness of the light-transmitting substrate is generally 0.1 to 20 mm, and for windows for vehicles such as cars, the thickness of the light-transmitting substrate is generally 1 to 10 mm.

<Method for Manufacturing Laminate>

The method for manufacturing the laminate is not particularly limited.

The step of disposing the first patterned optical anisotropic layer and the second patterned optical anisotropic layer is not particularly limited. For example, by using a patterned optical anisotropic layer formed using the aforementioned method for manufacturing a patterned optical anisotropic layer, the first patterned optical anisotropic layer and the second patterned optical anisotropic layer can be disposed between the first polarizer and the second polarizer by a known method.

The method for disposing the optically anisotropic layer between the second polarizer and the second patterned optical anisotropic layer is not particularly limited. As the method for forming the optically anisotropic layer, a method of coating any member with a coating solution for forming an optically anisotropic layer is preferable. The coating solution for forming an optically anisotropic layer is preferably a liquid crystal composition.

After coating, it is preferable that the liquid crystal composition is dried or heated if necessary and then cured. It is preferable that the polymerizable liquid crystal compound in the liquid crystal composition is aligned by the step of drying or heating. In a case where heating is performed, the heating temperature is preferably equal to or lower than 200° C., and more preferably equal to or lower than 130° C.

It is preferable that the aligned liquid crystal compound is then subjected to polymerization. The polymerization may be any of the thermal polymerization and the photopolymerization using light irradiation, and among these, the photopolymerization is preferable. For the light irradiation, it is preferable to use ultraviolet rays. The irradiation energy is preferably 20 mJ/cm$^2$ to 50 J/cm$^2$, and more preferably 100 mJ/cm$^2$ to 1,500 mJ/cm$^2$. In order to accelerate the photopolymerization reaction, light irradiation may be performed under heating conditions or in a nitrogen atmosphere. The wavelength of the ultraviolet rays for irradiation is preferably 250 nm to 430 nm. From the viewpoint of the stability, it is preferable that the polymerization reaction rate is high, which is preferably equal to or higher than 70% and more preferably equal to or higher than 80%.

The polymerization reaction rate can be determined by measuring the proportion of the consumed polymerizable functional groups by using an infrared (IR) absorption spectrum.

<Use>

The laminate of the present invention can be used for a variety of uses that require light controllability or light blocking properties. Specifically, for example, the laminate can be suitably used in the field of video such as cameras, video tape recorders (VTR), imaging lenses for projectors, finders, filters, prisms, or a Fresnel lens, a field of lens such as pickup lenses for optical disks including compact disk (CD) players, digital versatile disc (DVD) players, or minidisc (MD) players, a field of optical recording for optical disks such as CD players, DVD players, or MD players, a field of films for liquid crystal display such as light guide plates for liquid crystals, polarizing plate-protective films, or phase difference films, a field of information instrument such as surface protective films, a field of optical communication such as optical fibers, optical switches, or optical connectors, the field of vehicles such as car headlights, tail lamp lenses, inner lenses, instrument covers, sunroofs, the field of medical instruments such as eyeglasses, contact lenses, lenses for endoscopes, and medical supplies that need to be sterilized, the field of construction or building materials such as light-transmitting plates for roads, lenses for doubleglazed glass, lighting windows, carports, illumination windows, illumination covers, partitions of rooms, and siding boards for building materials, microwavable cooking containers (tableware), and the like. In addition, the laminate of the present invention can be used for windows of various buildings such as buildings for residence including general houses and multiple dwelling houses and commercial buildings including office buildings. Furthermore, the laminate of the present invention can be used not only for building windows but also for windows of vehicles such as cars. The laminate of the present invention can also be used in the field of daily necessities such as picture frames and diary covers.

Among these, the laminate of the present invention can be preferably used for the uses such as windows, partitions of rooms, picture frames, diary covers, and carports, and particularly preferably used for windows.

[Window]

The window of the present invention has the laminate of the present invention.

The laminate of the present invention may be used as is as a window or used by being combined with other known members such as window frames. The window of the present invention can be appropriately modified by known methods such that the window is used in the aspects described in the section of Use of the laminate of the present invention.

EXAMPLES

Hereinafter, the present invention will be more specifically described based on examples and comparative examples. The materials, the amount and proportions of the materials used, the treatment content, the treatment procedure, and the like shown in the following examples can be appropriately modified within a range that does not depart from the gist of the present invention. Accordingly, the scope of the present invention is not limited to the specific examples described below.

Example 1

Preparation of Patterned Optical Anisotropic Layer 1

(Formation of Patterned Photoalignment Film P1)

With reference to the method for preparing a liquid crystal aligning agent (S-3) of Example 3 described in JP2012-155308A, a coating solution for forming a photoalignment film 1 was prepared.

(Preparation of Patterned Optical Anisotropic Layer)

The patterned photoalignment film P1 was coated with a coating solution for forming an optically anisotropic layer 1 having the following composition by a spin coating method, thereby forming a liquid crystal composition layer 1.

The formed liquid crystal composition layer 1 was heated for 30 seconds at 95° C., and then the alignment thereof was immobilized by the ultraviolet irradiation such that a patterned optical anisotropic layer was formed, thereby preparing a patterned optical anisotropic layer 1.

| Coating solution for forming optically anisotropic layer 1 (part by mass) | |
|---|---|
| Methyl ethyl ketone | 244.1 |
| Mixture of rod-like liquid crystal compounds shown below | 100.0 |
| IRGACURE 907 (manufactured by BASF SE) | 3.0 |
| KAYACURE DETX (manufactured by Nippon Kayaku Co., Ltd.) | 1.0 |
| Fluoroaliphatic group-containing copolymer having structure shown below (alignment control agent for air interface; compound T-1 shown below) | 0.6 |

Rod-like liquid crystal compound

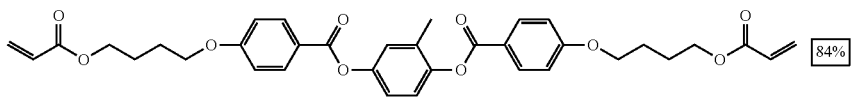

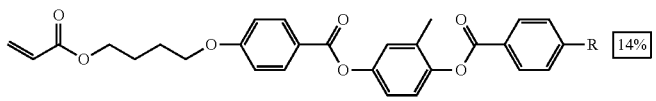

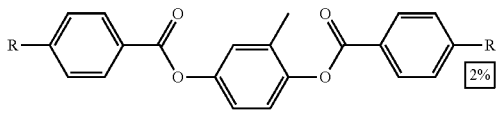

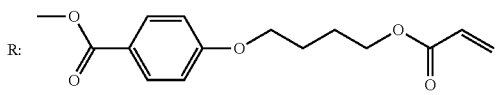

Then, a glass plate prepared as a light-transmitting substrate was coated with the prepared coating solution for forming a photoalignment film 1 by a spin coating method, thereby forming a photoisomerization composition layer 1 having a width of 10 cm.

Thereafter, a polarizing plate was disposed in an ultraviolet irradiation device (EX250-W manufactured by HOYA-SCHOTT), and the obtained photoisomerization composition layer 1 was irradiated with polarized ultraviolet rays at an irradiation amount of 500 mJ/cm². At this time, the polarization direction was set such that the light intersected with one side of the glass plate at an angle of 45°.

Subsequently, glass to which aluminum foils were bonded at an interval of 1 cm was disposed between the polarized ultraviolet irradiation device and the photoisomerization composition layer 1, and the photoisomerization composition layer 1 was irradiated with the polarized ultraviolet rays in the same manner as described above except that the polarization direction was rotated 90° from 45° such that the light intersected with the glass plate at an angle of 135°. In this way, a patterned photoalignment film P1 having a group of five regions and the other group of five regions that exhibited alignment abilities in directions intersecting with each other at an angle of 90°.

The unit of the numerical values is % by mass. The group represented by R is a partial structure shown on the lower right side, and is bonded to the compound through the side of an oxygen atom of this structure.

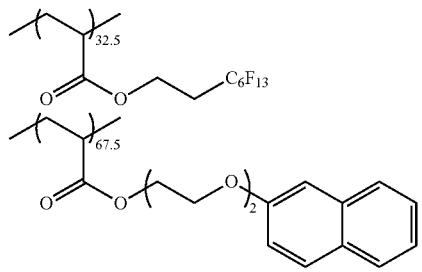

T-1

The patterned optical anisotropic layer 1 had first phase difference regions and second phase difference regions which had different slow axis directions in the plane thereof and alternated with each other, and an angle formed between the slow axis direction of each of the first phase difference regions and the slow axis direction of each of the second phase difference regions was 90°. Furthermore, the patterned optical anisotropic layer 1 was disposed in a laminate of Example 1, such that an angle formed between an absorption axis of the second polarizer, which will be described later, and the slow axis direction of each of the first phase difference regions became 45° and that an angle formed between the absorption axis of the second polarizer and the slow axis direction of each of the second phase difference regions became 135°. Therefore, in the tables shown below, the slow axis of the patterned optical anisotropic layer 1 was described as a 45/135 pattern.

For the patterned optical anisotropic layer 1, Re(450), Re(550), Re(650), Rth(450), Rth(550), and Rth(650) were determined, and Re(450)/Re(550), Re(630)/Re(550), Rth (450)/Rth(550), and Rth(630)/Rth(550) were calculated. The patterned optical anisotropic layer 1 was found to be a +A-plate having normal wavelength dispersion. The optical characteristics of the patterned optical anisotropic layer 1 are described in the tables shown below. In Example 1, the patterned optical anisotropic layer 1 was used as both the first patterned optical anisotropic layer and the second patterned optical anisotropic layer.

<Preparation of Optically Anisotropic layer 1>

With reference to the description of Example 1 in JP2013-222006A, a biaxial film was prepared by biaxially stretching a cellulose acylate film.

Then, with reference to No. 08 in Table 7 in paragraph "0204" in JP2013-222006A, an alignment film (mixture of KAYARAD PET30 manufactured by Nippon Kayaku Co., Ltd. and BLEMMER GLM manufactured by NOF CORPORATION) was formed on the biaxial film.

The alignment film was coated with the composition for a phase difference layer described in paragraph "0244" in Example in JP2013-222006A, thereby forming a +C-plate. The obtained +C-plate was used as an optically anisotropic layer 1. In the tables shown below, Re_off(550) of the optically anisotropic layer 1 at a wavelength of 550 nm and Rth_off(550) of the optically anisotropic layer 1 at a wavelength 550 nm are described. Re_off(550) of the optically anisotropic layers 1 and 2 at a wavelength of 550 nm and Rth_off(550) of the optically anisotropic layers 1 and 2 at a wavelength 550 nm were measured by the method described in the present specification.

In the +C-plate used as the optically anisotropic layer 1, Re(550) was 0.5 nm, Rth(550) was −125 nm, and the wavelength dispersion was 1.11 expressed by Rth(450)/Rth (550) and 0.97 expressed by Rth(630)/Rth(550). In the biaxial film used in the optically anisotropic layer 1, Re(550) was 100 nm, Rth(550) was 100 nm, Re(450)/Re(550) was 1.02, Re(630)/Re(550) was 1.01, and the slow axis was 0°.

<Preparation of Polarizing Plate 1>

The surface of supports, "TD80UL" and "Z-TAC" (all manufactured by FUJIFILM Corporation) as cellulose triacetate films, was subjected to an alkali saponification treatment. The films were immersed in a 1.5 N (1.5 mol/L) aqueous sodium hydroxide solution for 2 minutes at 55° C., washed with water in a rinsing bath at room temperature, and neutralized using 0.1 N (0.2 mol/L) sulfuric acid at 30° C. The films were then washed again with water in the rinsing bath at room temperature and dried with hot air with a temperature of 100° C.

Subsequently, a roll-like polyvinyl alcohol film having a thickness of 80 μm was continuously stretched by 500% in an aqueous iodine solution and dried, thereby obtaining a polarizer having a thickness of 20 μm.

By using an aqueous solution of a polyvinyl alcohol-based adhesive, TD80UL and Z-TAC were bonded to one surface and the other surface of the polarizer respectively. The obtained polarizing plate was used as a polarizing plate 1.

<Preparation of Polarizing Plate 2>

Films were bonded to the polarizer in the same manner as described above, except that in Preparation of polarizing plate 1, instead of Z-TAC, the biaxial film of the optically anisotropic layer 1 prepared as above was bonded to one surface of the polarizer. In this way, a polarizing plate 2 including the optically anisotropic layer 1 and the polarizer was prepared. At this time, the slow axis of the biaxial film of the optically anisotropic layer 1 included in the polarizing plate 2 and the absorption axis of the polarizer included in the polarizing plate 2 were caused to intersect with each other at an angle of 90°. For bonding, a pressure sensitive adhesive (manufactured by Soken Chemical & Engineering Co., Ltd.) was used.

<Preparation of Laminate of Example 1>

The polarizing plate 1 including the first polarizer, the patterned optical anisotropic layer 1 as the first patterned optical anisotropic layer, the patterned optical anisotropic layer 1 as the second patterned optical anisotropic layer, the optically anisotropic layer 1, and the second polarizer were disposed in this order, thereby preparing a laminate of Example 1.

In the laminate of Example 1, the aforementioned members were disposed such that an angle formed between the absorption axis of the first polarizer and the absorption axis of the second polarizer became 90°.

Furthermore, as an outer frame of the first patterned optical anisotropic layer, an outer frame having a sliding mechanism that can slide the patterned optical anisotropic layer by the width of each of the first phase difference regions or the second phase difference regions of the patterned optical anisotropic layer 1 was provided on three sides of the patterned optical anisotropic layer.

In the laminate of Example 1, the aforementioned members were disposed such that a white display state, in which an angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 0° and the light transmittance obtained in a case where the light incident on the first polarizer exits from the second polarizer is maximized, and a black display state, in which an angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 90° and the light transmittance obtained in a case where the light incident on the first polarizer exits from the second polarizer is minimized, could be switched with each other.

In the evaluation which will be described later, for the sake of convenience, the laminate was observed by disposing the first patterned optical anisotropic layer having the sliding mechanism on the viewing side. However, even in a case where the laminate of the present invention is observed from the reverse side, the black display state and the white display state are established.

The slow axis direction of each of the first phase difference regions of the first patterned optical anisotropic layer and the slow axis direction of each of the second phase difference regions of the first patterned optical anisotropic layer were disposed such that both the slow axis directions intersected with the absorption axis and the transmission axis of the two sheets of polarizers at an angle of 45°, and none of the slow axis directions were parallel or orthogonal to the absorption axis and the transmission axis. Likewise, the slow axis direction of each of the first phase difference regions of the second patterned optical anisotropic layer and the slow axis direction of each of the second phase difference regions of the second patterned optical anisotropic layer were disposed such that both the slow axis directions intersected with the absorption axis and the transmission axis of the two sheets of polarizers at an angle of 45°, and none of the slow axis directions were parallel or orthogonal to the absorption axis and the transmission axis.

Example 2

<Formation of Patterned Optical Anisotropic Layer 2>

A liquid crystal composition layer 2 was formed on the patterned photoalignment film P1 in the same manner as in Formation of patterned optical anisotropic layer 1, except that the coating solution for forming an optically anisotropic layer 1 was changed to a coating solution for forming an optically anisotropic layer 2 having the composition shown below.

The formed liquid crystal composition layer 2 was heated for 120 seconds at 80° C., and the alignment thereof was then immobilized by ultraviolet irradiation such that a patterned optical anisotropic layer was formed, thereby preparing a patterned optical anisotropic layer 2.

| Coating solution for forming optically anisotropic layer 2 | |
|---|---|
| Alkylcyclohexane ring-containing compound (compound A-1 shown below) | 20.00 parts by mass |
| Liquid crystal compound L-1 shown below | 40.00 parts by mass |
| Liquid crystal compound L-2 shown below | 40.00 parts by mass |
| Polymerization initiator (IRGACURE 184, manufactured by BASF SE) | 3.00 parts by mass |
| Polymerization initiator (IRGACURE OXE-01, manufactured by BASF SE) | 3.00 parts by mass |
| Fluoroaliphatic group-containing copolymer (alignment control agent for air interface; compound T-1) | 0.20 parts by mass |
| Cyclopentanone | 423.11 parts by mass |

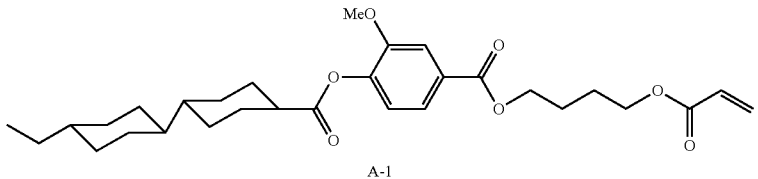

A-1

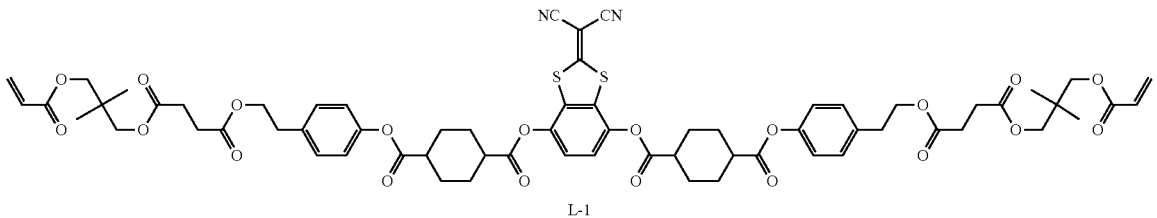 [SMILES: C=CC(=O)OCC(C)(C)COC(=O)CCC(=O)OCCc1ccc(OC(=O)C2CCC(C(=O)Oc3ccc(OC(=O)C4CCC(C(=O)Oc5ccc(CCOC(=O)CCC(=O)OCC(C)(C)COC(=O)C=C)cc5)CC4)c4c3SC(=C(C#N)C#N)S4)CC2)cc1]

L-1

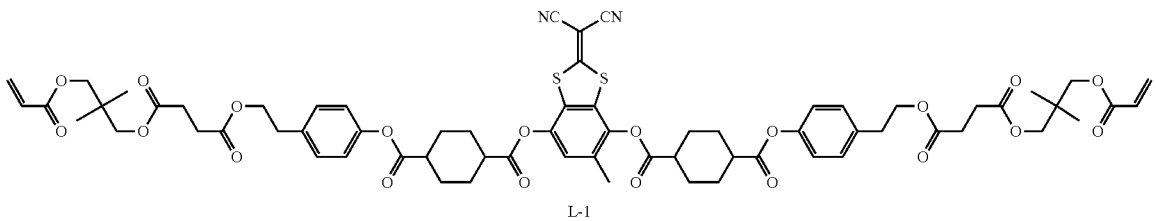 [SMILES: C=CC(=O)OCC(C)(C)COC(=O)CCC(=O)OCCc1ccc(OC(=O)C2CCC(C(=O)Oc3cc(C)c(OC(=O)C4CCC(C(=O)Oc5ccc(CCOC(=O)CCC(=O)OCC(C)(C)COC(=O)C=C)cc5)CC4)c4c3SC(=C(C#N)C#N)S4)CC2)cc1]

L-1

The obtained patterned optical anisotropic layer 2 had first phase difference regions and second phase difference regions which had different slow axis directions in the plane thereof and alternated with each other, and an angle formed between the slow axis direction of each of the first phase difference regions and the slow axis direction of each of the second phase difference regions was 90°. Furthermore, the patterned optical anisotropic layer 2 was disposed in a laminate of Example 2, such that an angle formed between an absorption axis of the second polarizer, which will be described later, and the slow axis direction of each of the first phase difference regions became 45° and that an angle formed between the absorption axis of the second polarizer and the slow axis direction of each of the second phase difference regions became 135°. Therefore, in the tables shown below, the slow axis of the patterned optical anisotropic layer 2 is described as a 45/135 pattern.

For the patterned optical anisotropic layer 2, Re(450), Re(550), Re(650), Rth(450), Rth(550), and Rth(650) were determined, and Re(450)/Re(550), Re(630)/Re(550), Rth(450)/Rth(550), and Rth(630)/Rth(550) were calculated. The patterned optical anisotropic layer 2 was found to be an +A-plate having reciprocal wavelength dispersion. The optical characteristics of the patterned optical anisotropic layer 2 are described in the tables shown below. In Example 2, the patterned optical anisotropic layer 2 was used as the first patterned optical anisotropic layer.

<Formation of Patterned Optical Anisotropic Layer 3>

A liquid crystal composition layer 3 was formed on the patterned photoalignment film P1 in the same manner as in Formation of patterned optical anisotropic layer 1, except that the coating solution for forming an optically anisotropic layer 1 was changed to a coating solution for forming an optically anisotropic layer 3 having the composition shown below.

The formed liquid crystal composition layer 3 was heated for 60 seconds at 80° C., and the alignment thereof was then immobilized by ultraviolet irradiation such that a patterned optical anisotropic layer was formed, thereby preparing a patterned optical anisotropic layer 3.

| Coating solution for forming optically anisotropic layer 3 | |
|---|---|
| Discotic liquid crystal compound (A) shown below | 80 parts by mass |
| Discotic liquid crystal compound (B) shown below | 20 parts by mass |
| Ethylene oxide-modified trimethylolpropane triacrylate (V# 360, manufactured by OSAKA ORGANIC CHEMICAL INDUSTRY LTD) | 5 parts by mass |
| Photopolymerization initiator (IRGACURE 907, manufactured by BASF SE) | 4 parts by mass |
| Onium salt compound (alignment control agent for alignment film side) (pyridinium salt (A) shown below) | 2 parts by mass |
| Fluoroaliphatic group-containing copolymer (alignment control agent for air interface; polymer A shown below) | 0.2 parts by mass |
| Fluoroaliphatic group-containing copolymer (alignment control agent for air interface; polymer B shown below) | 0.1 parts by mass |
| Fluoroaliphatic group-containing copolymer (alignment control agent for air interface; compound T-1) | 0.1 parts by mass |
| Methyl ethyl ketone | 211 parts by mass |

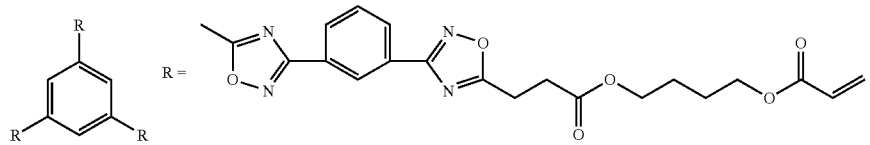

Discotic liquid crystal compound (A)

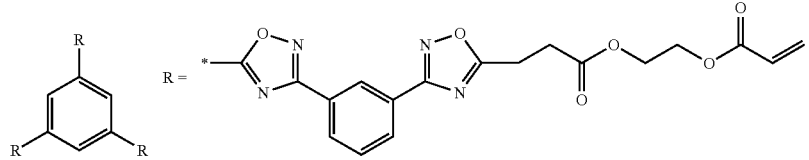

Discotic liquid crystal compound (B)

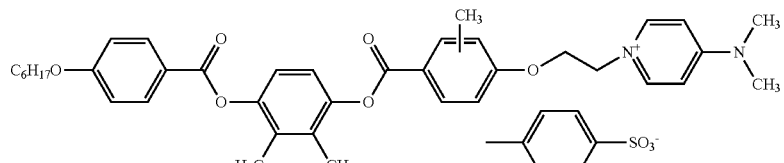

Pyridinium salt (A)

Coating solution for forming optically anisotropic layer 3

Polymer A

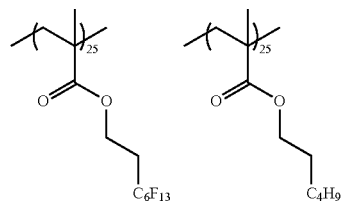

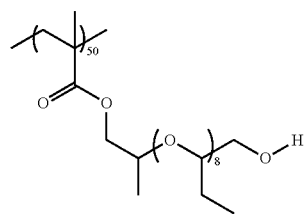

Polymer B

Polymer B

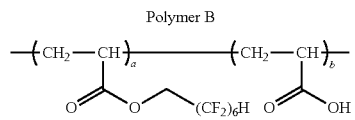

a is 90, and b is 10.

The obtained patterned optical anisotropic layer 3 had first phase difference regions and second phase difference regions which had different slow axis directions in the plane thereof and alternated with each other, and an angle formed between the slow axis direction of each of the first phase difference regions and the slow axis direction of each of the second phase difference regions was 90°. Furthermore, the patterned optical anisotropic layer 3 was disposed in a laminate of Example 2, such that an angle formed between an absorption axis of the second polarizer, which will be described later, and the slow axis direction of each of the first phase difference regions became 45° and that an angle formed between the absorption axis of the second polarizer and the slow axis direction of each of the second phase difference regions became 135°. Therefore, in the tables shown below, the slow axis of the patterned optical anisotropic layer 3 is described as a 45/135 pattern.

For the patterned optical anisotropic layer 3, Re(450), Re(550), Re(650), Rth(450), Rth(550), and Rth(650) were determined, and Re(450)/Re(550), Re(630)/Re(550), Rth (450)/Rth(550), and Rth(630)/Rth(550) were calculated. The patterned optical anisotropic layer 3 was found to be a −A-plate having normal wavelength dispersion. The optical characteristics of the patterned optical anisotropic layer 3 are described in the tables shown below. In Example 2, the patterned optical anisotropic layer 3 was used as the second patterned optical anisotropic layer.

<Preparation of Laminate of Example 2>

A laminate of Example 2 was prepared in the same manner as in Example 1, except that the patterned optical anisotropic layer 2 was used instead of the patterned optical anisotropic layer 1 as the first patterned optical anisotropic layer, and the patterned optical anisotropic layer 3 was used instead of the patterned optical anisotropic layer 1 as the second patterned optical anisotropic layer.

Example 3

A laminate of Example 3 was prepared in the same manner as in Example 1, except that the patterned optical anisotropic layer 3 was used instead of patterned optical anisotropic layer 1 as the second patterned optical anisotropic layer.

Example 4

<Preparation of Patterned Optical Anisotropic layer 1A>

A patterned optical anisotropic layer 1A was prepared in the same manner as in Preparation of patterned optical anisotropic layer 1, except that the film thickness of the patterned optical anisotropic layer 1 was reduced. The type, the optical characteristics, and the wavelength dispersion of the patterned optical anisotropic layer 1A are described in the tables shown below.

<Preparation of Patterned Optical Anisotropic layer 3A>

A patterned optical anisotropic layer 3A was prepared in the same manner as in Preparation of patterned optical anisotropic layer 3, except that the film thickness of the patterned optical anisotropic layer 3 was reduced. The type, the optical characteristics, and the wavelength dispersion of the patterned optical anisotropic layer 3A are described in the tables shown below.

<Preparation of Laminate of Example 4>

A laminate of Example 4 was prepared in the same manner as in Example 3, except that the patterned optical anisotropic layer 1A was used instead of the patterned optical anisotropic layer 1 as the first patterned optical anisotropic layer, and the patterned optical anisotropic layer 3A was used instead of the patterned optical anisotropic layer 3 as the second patterned optical anisotropic layer.

Example 5

<Preparation of Optically Anisotropic Layer 2>

The saponified TD80UL prepared in Example 1 was coated with the coating solution for forming a photoalignment film 1 by a spin coating method, thereby forming the photoisomerization composition layer 1.

The obtained photoisomerization composition layer 1 was disposed in a polarized ultraviolet irradiation device (EX250-W manufactured by HOYA-SCHOTT), and irradiated with polarized ultraviolet rays at an irradiation amount of 500 mJ/cm$^2$ in a vertical direction. At this time, the polarization direction was made parallel (0°) to the end of the film.

Then, the photoisomerization composition layer 1 was coated with the coating solution for forming an optically anisotropic layer 2 used in Example 2 in the same manner as in Example 2, and irradiated with ultraviolet rays, thereby preparing a +A-plate having TD80UL as a temporary support. The obtained +A-plate had reciprocal wavelength dispersion.

A +C-plate having TD80UL as a temporary support was prepared in the same manner as described above, except that in the optically anisotropic layer 1 prepared in Example 1, the support was changed to the saponified TD80UL prepared in Example 1 from the biaxial film, and the composition for a phase difference layer was changed to a coating solution for forming an optically anisotropic layer 4 shown below. The obtained +C-plate had reciprocal wavelength dispersion.

| Coating solution for forming optically anisotropic layer 4 | |
|---|---|
| Compound A-1 described above | 20.00 parts by mass |
| Liquid crystal compound L-1 described above | 40.00 parts by mass |
| Liquid crystal compound L-2 described above | 40.00 parts by mass |
| Polymerization initiator (IRGACURE 184, manufactured by BASF SE) | 3.00 parts by mass |
| Polymerization initiator (IRGACURE OXE-01, manufactured by BASF SE) | 3.00 parts by mass |
| Onium salt compound (alignment control agent for alignment film side; vertical alignment agent; compound S-1 shown below) | 1.00 part by mass |
| Boron-containing compound (vertical alignment agent; compound S-2 shown below) | 0.50 parts by mass |
| Fluoroaliphatic group-containing copolymer (alignment control agent for air interface; vertical alignment agent; polymer B described above) | 0.40 parts by mass |
| Fluoroaliphatic group-containing copolymer (alignment control agent for air interface; vertical alignment agent; compound S-3 shown below) | 0.20 parts by mass |
| Cyclopentanone | 360.33 parts by mass |

S-1

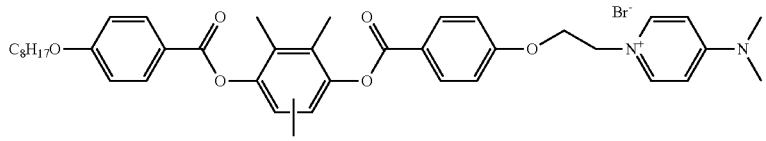

S-2

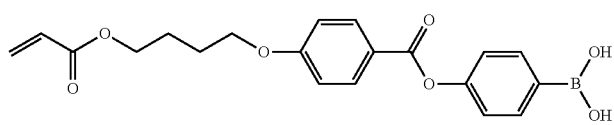 [SMILES: C=CC(=O)OCCCCOc1ccc(C(=O)Oc2ccc(B(O)O)cc2)cc1]

S-3

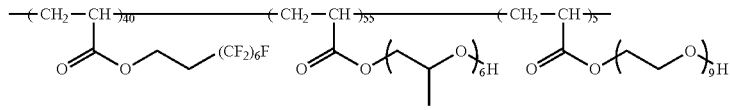

<Preparation of Polarizing Plate 3>

In the same manner as in Preparation of polarizing plate 1, the saponified TD80UL was bonded to one surface of the polarizer. The +A-plate prepared as above that had TD80UL as a temporary support was bonded to the other surface of the polarizer through a pressure sensitive adhesive (manufactured by Soken Chemical & Engineering Co., Ltd.), and the TD80UL used as a temporary support of the +A-plate was peeled. At this time, the absorption axis of the polarizer and the slow axis of the +A-plate were caused to intersect with each other at an angle of 90°. Likewise, the +C-plate prepared as above that had TD80UL as a temporary support was bonded onto the +A-plate, and then the TD80UL used as a temporary support of the +C-plate was peeled.

The obtained laminate of the +C-plate having reciprocal wavelength dispersion and the +A-plate having reciprocal wavelength dispersion was used as the optically anisotropic layer 2. In tables shown below, Re_off(550) of the optically anisotropic layer 2 at a wavelength of 550 nm and Rth_off(550) of the optically anisotropic layer 2 at a wavelength of 550 nm are described.

In the +C-plate used in the optically anisotropic layer 2, Re(550) was 0.5 nm, Rth(550) was −90nm, and the wavelength dispersion was 0.86 expressed by Rth(450)/Rth(550) and 1.03 expressed by Rth(630)/Rth(550). In the +A-plate used in the optically anisotropic layer 2, Re(550) was 145 nm, Rth(550) was 72.5 nm, Re(450)/Re(550) was 0.86, Re(630)/Re(550) was 1.03, and the slow axis was 0°.

The polarizing plate including the optically anisotropic layer 2 obtained as above and the polarizer was used as a polarizing plate 3.

<Preparation of Laminate of Example 5>

A laminate of Example 5 was prepared in the same manner as in Example 4, except that instead of the polarizing plate 1 including the optically anisotropic layer 1 and the second polarizer, the polarizing plate 3 including the optically anisotropic layer 2 and the second polarizer was used.

Example 6

<Preparation of Patterned Optical Anisotropic Layers 4 and 5>

(Formation of Patterned Photoalignment Film P2)

A glass plate was coated with the coating solution for forming a photoalignment film 1 used in Example 1 by a spin coating method, thereby forming the photoisomerization composition layer 1 having a width of 10 cm.

Then, a polarizing plate and a light screen plate having a slit width of 2.17 mm were disposed in an ultraviolet irradiation device (EX250-W manufactured by HOYA-SCHOTT), and the obtained photoisomerization composition layer 1 was irradiated with polarized ultraviolet rays at an irradiation amount of 500 mJ/cm$^2$.

At this time, in a state where the polarizing plate was being rotated by 1° and the glass plate on which the photoisomerization composition layer 1 was formed was being moved, the ultraviolet irradiation was performed.

In this way, a patterned photoalignment film P2 was prepared which had 46 regions exhibiting alignment abilities in different directions.

(Preparation of Patterned Optical Anisotropic layer 4)

The patterned photoalignment film P2 was coated with the coating solution for forming an optically anisotropic layer 1 by a spin coating method, thereby forming the liquid crystal composition layer 1.

The formed liquid crystal composition layer 1 was heated for 30 seconds at 95° C., and the alignment thereof was then immobilized by ultraviolet irradiation such that a patterned optical anisotropic layer was formed, thereby preparing a patterned optical anisotropic layer 4.

The patterned optical anisotropic layer 4 had three or more phase difference regions which had different slow axis directions in the plane thereof and in which the slow axis directions continuously changed. Therefore, in the tables shown below, the slow axes of the patterned optical anisotropic layer 4 are described as a continuous pattern.

For the patterned optical anisotropic layer 4, Re(450), Re(550), Re(650), Rth(450), Rth(550), and Rth(650) were determined, and Re(450)/Re(550), Re(630)/Re(550), Rth(450)/Rth(550), and Rth(630)/Rth(550) were calculated. The patterned optical anisotropic layer 4 was found to be a +A-plate having normal wavelength dispersion. The optical characteristics of the patterned optical anisotropic layer 4 are described in the tables shown below. In Example 6, the patterned optical anisotropic layer 4 was used as the first patterned optical anisotropic layer.

(Preparation of Patterned Optical Anisotropic layer 5)

The patterned photoalignment film P2 was coated with the coating solution for forming an optically anisotropic layer 3 by a spin coating method, thereby forming the liquid crystal composition layer 3.

The formed liquid crystal composition layer 3 was heated for 60 seconds at 80° C., and the alignment thereof was then immobilized by ultraviolet irradiation such that a patterned optical anisotropic layer was formed, thereby preparing a patterned optical anisotropic layer 5.

The patterned optical anisotropic layer 5 had three or more phase difference regions which had different slow axis directions in the plane thereof and in which the slow axis directions continuously changed. Therefore, in the tables shown below, the slow axis of the patterned optical anisotropic layer 5 are described as a continuous pattern.

For the patterned optical anisotropic layer 5, Re(450), Re(550), Re(650), Rth(450), Rth(550), and Rth(650) were determined, and Re(450)/Re(550), Re(630)/Re(550), Rth(450)/Rth(550), and Rth(630)/Rth(550) were calculated. The patterned optical anisotropic layer 5 was found to be a −A-plate having normal wavelength dispersion. The optical characteristics of the patterned optical anisotropic layer 5 are described in the tables shown below. In Example 6, the patterned optical anisotropic layer 5 was used as the second patterned optical anisotropic layer.

<Preparation of Laminate of Example 6>

A laminate of Example 6 was prepared in the same manner as in Example 5, except that the patterned optical anisotropic layer 4 was used instead of the patterned optical anisotropic layer 1A as the first patterned optical anisotropic layer, the patterned optical anisotropic layer 5 was used instead of the patterned optical anisotropic layer 3A as the second patterned optical anisotropic layer, and the sliding mechanism was prepared as described below.

In Example 6, the patterned optical anisotropic layer 4 and the patterned optical anisotropic layer 5 were disposed such that a white display state, in which an angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 45° and the transmittance obtained in a case where the light incident on the first polarizer exits from the second polarizer is maximized, and a black display state, in which an angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 90° and the transmittance obtained in a case where the light incident on the first polarizer exits from the second polarizer is minimized, were switched with each other.

The position, which is for forming an angle of 45° or 90° between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer, was determined based on the in-plane slow axis of each of the phase difference regions determined by KOBRA 21A DH or WR.

Example 7

<Preparation of Patterned Optical Anisotropic layer 4A>

A patterned optical anisotropic layer 4A was prepared in the same manner as in Preparation of patterned optical anisotropic layer 4, except that the film thickness of the patterned optical anisotropic layer 4 was increased. The type, the optical characteristics, and the wavelength dispersion of the patterned optical anisotropic layer 4A are described in the tables shown below.

<Preparation of Patterned Optical Anisotropic layer 5A>

A patterned optical anisotropic layer 5A was prepared in the same manner as in Preparation of patterned optical anisotropic layer 5, except that the film thickness of the patterned optical anisotropic layer 5 was increased. The type, the optical characteristics, and the wavelength dispersion of the patterned optical anisotropic layer 5A are described in the tables shown below.

<Preparation of Laminate of Example 7>

A laminate of Example 7 was prepared in the same manner as in Example 6, except that the patterned optical anisotropic layer 4A was used instead of the patterned optical anisotropic layer 4 as the first patterned optical anisotropic layer, and the patterned optical anisotropic layer 5A was used instead of the patterned optical anisotropic layer 5 as the second patterned optical anisotropic layer.

Comparative Example 1

A laminate of Comparative Example 1 was prepared in the same manner as in Example 1, except that in Example 1, the polarizing plate 1 was used instead of the polarizing plate 2 including the optically anisotropic layer 1 and the polarizer.

Comparative Example 2

A laminate of Comparative Example 2 was prepared in the same manner as in Example 2, except that in Example 2, the polarizing plate 1 was used instead of the polarizing plate 2 including the optically anisotropic layer 1 and the polarizer.

Comparative Example 3

A laminate of Comparative Example 3 was prepared in the same manner as in Example 3, except that in Example 3, the polarizing plate 1 was used instead of the polarizing plate 2 including the optically anisotropic layer 1 and the polarizer.

Comparative Example 4

A laminate of Comparative Example 4 was prepared in the same manner as in Example 4, except that in Example 4, the polarizing plate 1 was used instead of the polarizing plate 2 including the optically anisotropic layer 1 and the polarizer.

Evaluation

The performance of the laminate of each of the examples and the comparative examples in the white display state and the black display state was evaluated.

In order to simulate the external light, iPad (registered trademark) Air (manufactured by Apple Inc.) was disassembled, and only the backlight thereof was turned on and used for evaluation by disposing the first polarizer of the laminate of each of the examples and the comparative examples on the viewing side.

Then, the patterned optical anisotropic layer (first patterned optical anisotropic layer) on one side of the laminate of each of the examples and comparative examples was displaced, a state where the transmittance was maximized was regarded as a white display state, and a state where the transmittance was minimized was regarded as a black display state. By using EZContrast (manufactured by ELDIM), the tint in the white display state in the front, the brightness in the black display state in the front, the tint in the black display state in the front, the brightness in the black display state at a polar angle of 60° and an azimuthal angle of 0° (oblique on-axis direction 2 in FIG. 3), and the brightness of the black display state at a polar angle of 60° and an azimuthal angle of 45° (oblique off-axis direction 3 in FIG. 3) were measured.

The tint represented by (u', v') is preferably within a range of (0.17 to 0.23, 0.35 to 0.55), more preferably within a range of (0.18 to 0.22, 0.38 to 0.52), and particularly preferably within a range of (0.19 to 0.21, 0.40 to 0.50).

The higher the brightness in the white display state, the more preferable.

The lower the brightness in the black display state, the more preferable.

The obtained results are described in Tables 1 and 2 shown below.

TABLE 1

|  |  |  | Example 1 | Example 2 | Example 3 | Example 4 |
|---|---|---|---|---|---|---|
| First patterned optical anisotropic layer |  | Name | 1 | 2 | 1 | 1A |
|  |  | Type | +A-plate, normal wavelength dispersion | +A-plate, reciprocal wavelength dispersion | +A-plate, normal wavelength dispersion | +A-plate, normal wavelength dispersion |
|  | Optical characteristics | Re1(550) | 130 | 130 | 130 | 115 |
|  |  | Rth1(550) | 65 | 65 | 65 | 57.5 |
|  | Wavelength dispersion | Re1(450)/Rc1(550) | 1.1 | 0.86 | 1.1 | 1.1 |
|  |  | Re1(630)/Re1(550) | 0.97 | 1.03 | 0.97 | 0.97 |
|  |  | Rth1(450)/Rth1(550) | 1.1 | 0.86 | 1.1 | 1.1 |
|  |  | Rth1(630)/Rth1(550) | 0.97 | 1.03 | 0.97 | 0.97 |
|  |  | Slow axis | 45/135 pattern | 45/135 pattern | 45/135 pattern | 45/135 pattern |
| Second patterned optical anisotropic layer |  | Name | 1 | 3 | 3 | 3A |
|  |  | Type | +A-plate, normal wavelength dispersion | −A-plate, normal wavelength dispersion | −A-plate, normal wavelength dispersion | −A-plate, normal wavelength dispersion |
|  | Optical characteristics | Re2(550) | 130 | 130 | 130 | 115 |
|  |  | Rth2(550) | 65 | −65 | −65 | −57.5 |
|  | Wavelength dispersion | Re2(450)/Re2(550) | 1.1 | 1.1 | 1.1 | 1.1 |
|  |  | Re2(630)/Re2(550) | 0.97 | 0.97 | 0.97 | 0.97 |
|  |  | Rth2(450)/Rth2(550) | 1.1 | 1.1 | 1.1 | 1.1 |
|  |  | Rth2(630)/Rth2(550) | 0.97 | 0.97 | 0.97 | 0.97 |
|  |  | Slow axis | 45/135 pattern | 45/135 pattern | 45/135 pattern | 45/135 pattern |
| Optically anisotropic layer |  | Name | 1 | 1 | 1 | 1 |
|  |  | Type | +C-plate | +C-plate | +C-plate | +C-plate |
|  |  | Re_off | 264 nm | 264 nm | 264 nm | 264 nm |
|  |  | Rth_off | −16 nm | −16 nm | −16 nm | −16 nm |
| Evaluation | Front | Tint in white display state (u', v') | (0.22, 0.51) | (0.22, 0.50) | (0.22, 0.51) | (0.22, 0.50) |
|  |  | Brightness of black display state [cd/m$^2$] | 4 | 5 | 4 | 4 |
|  |  | Tint in black display state (u', v') | (0.21, 0.45) | (0.19, 0.35) | (0.21, 0.45) | (0.21, 0.45) |
|  | Polar angle 60° Azimuthal angle 0° | Brightness of black display state [cd/m$^2$] | 8 | 3 | 2 | 2 |
|  | Polar angle 60° Azimuthal angle 0° | Brightness of black display state [cd/m$^2$] | 20 | 9 | 6 | 6 |

|  |  |  | Example 5 | Example 6 |
|---|---|---|---|---|
| First patterned optical anisotropic layer |  | Name | 1A | 4 |
|  |  | Type | +A-plate, normal wavelength dispersion | +A-plate, normal wavelength dispersion |
|  | Optical characteristics | Re1(550) | 115 | 240 |
|  |  | Rth1(550) | 57.5 | 120 |
|  | Wavelength dispersion | Re1(450)/Rc1(550) | 1.1 | 1.1 |
|  |  | Re1(630)/Re1(550) | 0.97 | 0.97 |
|  |  | Rth1(450)/Rth1(550) | 1.1 | 1.1 |
|  |  | Rth1(630)/Rth1(550) | 0.97 | 0.97 |
|  |  | Slow axis | 45/135 pattern | Continuous pattern |
| Second patterned optical anisotropic layer |  | Name | 3A | 5 |
|  |  | Type | −A-plate, normal wavelength dispersion | −A-plate, normal wavelength dispersion |
|  | Optical characteristics | Re2(550) | 115 | 240 |
|  |  | Rth2(550) | −57.5 | −120 |
|  | Wavelength dispersion | Re2(450)/Re2(550) | 1.1 | 1.1 |
|  |  | Re2(630)/Re2(550) | 0.97 | 0.97 |
|  |  | Rth2(450)/Rth2(550) | 1.1 | 1.1 |
|  |  | Rth2(630)/Rth2(550) | 0.97 | 0.97 |
|  |  | Slow axis | 45/135 pattern | Continuous pattern |
| Optically anisotropic layer |  | Name | 2 | 2 |
|  |  | Type | Laminate of +C-plate of reciprocal wavelength dispersion and +A-plate of reciprocal wavelength dispersion | Laminate of +C-plate of reciprocal wavelength dispersion and +A-plate of reciprocal wavelength dispersion |
|  |  | Re_off | 271 nm | 271 nm |
|  |  | Rth_off | −11 nm | −11 nm |
| Evaluation | Front | Tint in white display state (u', v') | (0.22, 0.50) | (0.22, 0.53) |
|  |  | Brightness of black display state [cd/m$^2$] | 4 | 4 |
|  |  | Tint in black display state (u', v') | (0.21, 0.45) | (0.21, 0.45) |
|  | Polar angle 60° Azimuthal angle 0° | Brightness of black display state [cd/m$^2$] | 2 | 2 |
|  | Polar angle 60° Azimuthal angle 0° | Brightness of black display state [cd/m$^2$] | 5 | 5 |

TABLE 2

|  |  |  | Example 7 | Comparative Example 1 |
|---|---|---|---|---|
| First patterned optical anisotropic layer |  | Name | 4A | 1 |
|  |  | Type | +A-plate, normal wavelength dispersion | +A-plate, normal wavelength dispersion |
|  | Optical characteristics | Re1(550) | 310 | 130 |
|  |  | Rth1(550) | 155 | 65 |
|  | Wavelength dispersion | Re1(450)/Re1(550) | 1.1 | 1.1 |
|  |  | Re1(630)/Re1(550) | 0.97 | 0.97 |
|  |  | Rth1(450)/Rth1(550) | 1.1 | 1.1 |
|  |  | Rth1(630)/Rth1(550) | 0.97 | 0.97 |
|  |  | Slow axis | Continuous pattern | 45/135 pattern |
| Second patterned optical anisotropic layer |  | Name | 5A | 1 |
|  |  | Type | −A-plate, normal wavelength dispersion | +A-plate, normal wavelength dispersion |
|  | Optical characteristics | Re2(550) | 310 | 130 |
|  |  | Rth2(550) | −155 | 65 |
|  | Wavelength dispersion | Re2(450)/Re2(550) | 1.1 | 1.1 |
|  |  | Re2(630)/Re2(550) | 0.97 | 0.97 |
|  |  | Rth2(450)/Rth2(550) | 1.1 | 1.1 |
|  |  | Rth2(630)/Rth2(550) | 0.97 | 0.97 |
|  |  | Slow axis | Continuous pattern | 45/135 pattern |
| Optically anisotropic layer |  | Name | 2 | N/A |
|  |  | Type | Laminate of +C-plate of reciprocal wavelength dispersion and +A-plate of reciprocal wavelength dispersion |  |
|  |  | Re_off | 271 nm |  |
|  |  | Rth_off | −11 nm |  |
| Evaluation | Front | Tint in white display state (u', v') | (0.22, 0.55) | (0.22, 0.51) |
|  |  | Brightness of black display state [cd/m$^2$] | 4 | 4 |
|  |  | Tint in black display state (u', v') | (0.21, 0.45) | (0.21, 0.45) |
|  | Polar angle 60° Azimuthal angle 0° | Brightness of black display state [cd/m$^2$] | 2 | 9 |
|  | Polar angle 60° Azimuthal angle 45° | Brightness of black display state [cd/m$^2$] | 5 | 50 |

|  |  |  | Comparative Example 2 | Comparative Example 3 | Comparative Example 4 |
|---|---|---|---|---|---|
| First patterned optical anisotropic layer |  | Name | 2 | 1 | 1A |
|  |  | Type | +A-plate, reciprocal wavelength dispersion | +A-plate, normal wavelength dispersion | +A-plate, normal wavelength dispersion |
|  | Optical characteristics | Re1(550) | 130 | 130 | 115 |
|  |  | Rth1(550) | 65 | 65 | 57.5 |
|  | Wavelength dispersion | Re1(450)/Re1(550) | 0.86 | 1.1 | 1.1 |
|  |  | Re1(630)/Re1(550) | 1.03 | 0.97 | 0.97 |
|  |  | Rth1(450)/Rth1(550) | 0.86 | 1.1 | 1.1 |
|  |  | Rth1(630)/Rth1(550) | 1.03 | 0.97 | 0.97 |
|  |  | Slow axis | 45/135 pattern | 45/135 pattern | 45/135 pattern |
| Second patterned optical anisotropic layer |  | Name | 3 | 3 | 3A |
|  |  | Type | −A-plate, normal wavelength dispersion | −A-plate, normal wavelength dispersion | −A-plate, normal wavelength dispersion |
|  | Optical characteristics | Re2(550) | 130 | 130 | 115 |
|  |  | Rth2(550) | −65 | −65 | −57.5 |
|  | Wavelength dispersion | Re2(450)/Re2(550) | 1.1 | 1.1 | 1.1 |
|  |  | Re2(630)/Re2(550) | 0.97 | 0.97 | 0.97 |
|  |  | Rth2(450)/Rth2(550) | 1.1 | 1.1 | 1.1 |
|  |  | Rth2(630)/Rth2(550) | 0.97 | 0.97 | 0.97 |
|  |  | Slow axis | 45/135 pattern | 45/135 pattern | 45/135 pattern |
| Optically anisotropic layer |  | Name | N/A | N/A | N/A |
|  |  | Type |  |  |  |
|  |  | Re_off |  |  |  |
|  |  | Rth_off |  |  |  |
| Evaluation | Front | Tint in white display state (u', v') | (0.22, 0.50) | (0.22, 0.51) | (0.22, 0.50) |
|  |  | Brightness of black display state [cd/m$^2$] | 5 | 4 | 4 |
|  |  | Tint in black display state (u', v') | (0.19, 0.35) | (0.21, 0.45) | (0.21, 0.45) |
|  | Polar angle 60° Azimuthal angle 0° | Brightness of black display state [cd/m$^2$] | 4 | 3 | 3 |
|  | Polar angle 60° Azimuthal angle 45° | Brightness of black display state [cd/m$^2$] | 45 | 40 | 40 |

From Tables 1 and 2, it was understood that in the laminate of the present invention, in a case where light is incident on the laminate, a white display state and a black display state are switched with each other, and the brightness of the black display state is low in the front and in all directions. Furthermore, it was understood that in a preferable aspect of the laminate of the present invention, the white display state and the black display state have an excellent tint in the front and in all directions.

In contrast, from Comparative Examples 1 to 4, it was understood that in a case where the laminate does not have an optically anisotropic layer, the brightness of the black display state cannot be reduced in all directions, that is, serious light leakage occurs depending on the direction along which the black display state is observed.

EXPLANATION OF REFERENCES

1: front direction
2: oblique on-axis direction
3: oblique off-axis direction
12: first polarizer
12A: absorption axis of first polarizer
13: second polarizer
13A: absorption axis of second polarizer
13B: transmission axis of second polarizer
15: first patterned optical anisotropic layer
15A: slow axis direction of first patterned optical anisotropic layer
16: second patterned optical anisotropic layer
16A: slow axis direction of second patterned optical anisotropic layer
17: optically anisotropic layer
17A: slow axis direction of optically anisotropic layer
S1: Stokes parameter 1: linear polarization component of 0, 90°
S2: Stokes parameter 2: linear polarization component of 45, 135°
S3: Stokes parameter 3: circular polarization component
R: red light
G: green light
B: blue light

What is claimed is:

1. A laminate comprising:
a first polarizer, a first patterned optical anisotropic layer, a second patterned optical anisotropic layer, and a second polarizer in this order; and
an optically anisotropic layer disposed between the second polarizer and the second patterned optical anisotropic layer,
wherein an angle formed between an absorption axis of the first polarizer and an absorption axis of the second polarizer is 90°±5°,
each of the first patterned optical anisotropic layer and the second patterned optical anisotropic layer includes first phase difference regions and second phase difference regions which have different slow axis directions in a plane of the first patterned optical anisotropic layer or the second patterned optical anisotropic layer and alternate with each other,
an angle formed between the slow axis direction of each of the first phase difference regions and the slow axis direction of each of the second phase difference regions is 90°±5°,
a white display state, in which an angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 0°±5° and a transmittance obtained in a case where light incident on the first polarizer exits from the second polarizer is maximized, and a black display state, in which an angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 90°±5° and the transmittance obtained in a case where the light incident on the first polarizer exits from the second polarizer is minimized, are switched with each other,
none of the slow axis directions of the first phase difference regions and the slow axis directions of the second phase difference regions are parallel or orthogonal to the absorption axes and transmission axes of the two sheets of polarizers,
the optically anisotropic layer includes one layer or two or more layers, has an Re_off(550) of 240 to 310 nm at a wavelength of 550 nm in a direction of an azimuthal angle of 45° and a polar angle of 60° from a slow axis of the optically anisotropic layer, and has an Rth_off(550) of −50 to 50 nm at a wavelength of 550 nm in a direction of an azimuthal angle of 45° and a polar angle of 60° from the slow axis of the optically anisotropic layer,
the Re_off(550) and the Rth_off(550) are values calculated from the Jones Matrix of the optically anisotropic layer at a wavelength of 550 nm in a direction of an azimuthal angle of 45° and a polar angle of 60° from the slow axis of the optically anisotropic layer, and
the Jones Matrix of the optically anisotropic layer represents J calculated from Formula (ii) in a case where the optically anisotropic layer includes one layer and represents Jn*Jn−1*. . . *J2*J1 which is a product of the Jones Matrix calculated from Formula (i) in a case where the optically anisotropic layer includes two or more layers, $$\text{Pout} = (Jn*Jn-1*\ldots *J2*J1)*\text{Pin} \quad (i)$$

$$\text{Pout} = J*\text{Pin} \quad (ii)$$

in Formulae (i) and (ii), Pout represents a final polarization state, Pin represents an incident polarization state, Jn represents the Jones Matrix of the nth layer in a case where the optically anisotropic layer includes two or more layers, J represents the Jones Matrix of the optically anisotropic layer in a case where the optically anisotropic layer includes one layer, and n represents an integer of equal to or greater than 2.

2. The laminate according to claim 1,
wherein a retardation Re1(550) of the first patterned optical anisotropic layer at a wavelength of 550 nm in an in-plane direction of the first patterned optical anisotropic layer and a retardation Re2(550) of the second patterned optical anisotropic layer at a wavelength of 550 nm in an in-plane direction of the second patterned optical anisotropic layer are each independently 110 to 135 nm and satisfy Formula (1).

$$Re2(550)=Re1(550)\pm10 \text{ nm} \tag{1}$$

3. A laminate comprising:
a first polarizer, a first patterned optical anisotropic layer, a second patterned optical anisotropic layer, and a second polarizer in this order; and
an optically anisotropic layer disposed between the second polarizer and the second patterned optical anisotropic layer,
an angle formed between an absorption axis of the first polarizer and an absorption axis of the second polarizer is 90°±5°,
each of the first patterned optical anisotropic layer and the second patterned optical anisotropic layer has three or more phase difference regions which have different slow axis directions in a plane of the first patterned optical anisotropic layer or the second patterned optical anisotropic layer and in which the slow axis directions continuously change,
a white display state, in which an angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 45°±5° and a transmittance obtained in a case where light incident on the first polarizer exits from the second polarizer is maximized, and a black display state, in which an angle formed between the slow axis direction of each of the phase difference regions of the first patterned optical anisotropic layer and the slow axis direction of each of the phase difference regions of the second patterned optical anisotropic layer that is superposed on each of the phase difference regions of the first patterned optical anisotropic layer is 90°±5° and the transmittance obtained in a case where the light incident on the first polarizer exits from the second polarizer is minimized, are switched with each other,
the optically anisotropic layer includes one layer or two or more layers, has an Re_off(550) of 240 to 310 nm at a wavelength of 550 nm in a direction of an azimuthal angle of 45° and a polar angle of 60° from a slow axis of the optically anisotropic layer, and has an Rth_off (550) of −50 to 50 nm at a wavelength of 550 nm in a direction of an azimuthal angle of 45° and a polar angle of 60° from the slow axis of the optically anisotropic layer,
the Re_off(550) and the Rth_off(550) are values calculated from the Jones Matrix of the optically anisotropic layer at a wavelength of 550 nm in a direction of an azimuthal angle of 45° and a polar angle of 60° from the slow axis of the optically anisotropic layer, and
the Jones Matrix of the optically anisotropic layer represents J calculated from Formula (ii) in a case where the optically anisotropic layer includes one layer and represents Jn*Jn−1*. . . *J2*J1 which is a product of the Jones Matrix calculated from Formula (i) in a case where the optically anisotropic layer includes two or more layers, $$Pout=(Jn*Jn-1*. . . *J2*J1)*Pin \tag{i}$$

$$Pout=J*Pin \tag{ii}$$

in Formulae (i) and (ii), Pout represents a final polarization state, Pin represents an incident polarization state, Jn represents the Jones Matrix of the nth layer in a case where the optically anisotropic layer includes two or more layers, J represents the Jones Matrix of the optically anisotropic layer in a case where the optically anisotropic layer includes one layer, and n represents an integer of equal to or greater than 2.

4. The laminate according to claim 3,
wherein a retardation Re_(550) of the first patterned optical anisotropic layer at a wavelength of 550 nm in an in-plane direction of the first patterned optical anisotropic layer and a retardation Re2(550) of the second patterned optical anisotropic layer at a wavelength of 550 nm in an in-plane direction of the second patterned optical anisotropic layer are each independently 230 to 270 nm and satisfy Formula (1).

$$Re2(550)=Re1(550)\pm10 \text{ nm} \tag{1}$$

5. The laminate according to claim 1,
wherein the retardation Re_(550) of the first patterned optical anisotropic layer at a wavelength of 550 nm in the in-plane direction of the first patterned optical anisotropic layer, a retardation Rth_(550) of the first patterned optical anisotropic layer at a wavelength of 550 nm in a film thickness direction of the first patterned optical anisotropic layer, the retardation Re2 (550) of the second patterned optical anisotropic layer at a wavelength of 550 nm in the in-plane direction of the second patterned optical anisotropic layer, and a retardation Rth2(550) of the second patterned optical anisotropic layer at a wavelength of 550 nm in a film thickness direction of the second patterned optical anisotropic layer satisfy Formula (1) and Formula (2).

$$Re2(550)=Re1(550)\pm10 \text{ nm} \tag{1}$$

$$Rth2(550)=-Rth1(550)\pm10 \text{ nm} \tag{2}$$

6. The laminate according to claim 1,
wherein a combination of the first patterned optical anisotropic layer and the second patterned optical anisotropic layer is a combination of a +A-plate and a −A-plate.

7. The laminate according to claim 1,
wherein both the first patterned optical anisotropic layer and the second patterned optical anisotropic layer have normal wavelength dispersion, reciprocal wavelength dispersion, or flat dispersion as wavelength dispersion of the retardation Re in the in-plane direction, and
both the first patterned optical anisotropic layer and the second patterned optical anisotropic layer have normal wavelength dispersion, reciprocal wavelength dispersion, or flat dispersion as wavelength dispersion of the retardation Rth in the film thickness direction.

8. The laminate according to claim 1,
wherein both the first patterned optical anisotropic layer and the second patterned optical anisotropic layer have the normal wavelength dispersion as the wavelength dispersion of the retardation Re in the in-plane direction, and
both the first patterned optical anisotropic layer and the second patterned optical anisotropic layer have normal wavelength dispersion as the wavelength dispersion of the retardation Rth in the film thickness direction.

9. The laminate according to claim 1, wherein the first patterned optical anisotropic layer and the second patterned optical anisotropic layer contain a liquid crystal compound.

10. A window comprising the laminate according to claim 1.

11. The laminate according to claim 3, wherein the retardation Re1(550) of the first patterned optical anisotropic layer at a wavelength of 550 nm in the in-plane direction of the first patterned optical anisotropic layer, a retardation Rth1(550) of the first patterned optical anisotropic layer at a wavelength of 550 nm in a film thickness direction of the first patterned optical anisotropic layer, the retardation Re2(550) of the second patterned optical anisotropic layer at a wavelength of 550 nm in the in-plane direction of the second patterned optical anisotropic layer, and a retardation Rth2(550) of the second patterned optical anisotropic layer at a wavelength of 550 nm in a film thickness direction of the second patterned optical anisotropic layer satisfy Formula (1) and Formula (2).

$$Re2(550)=Re1(550)\pm 10 \text{ nm} \quad (1)$$

$$Rth2(550)=-Rth1(550)\pm 10 \text{ nm} \quad (2)$$

12. The laminate according to claim 3, wherein a combination of the first patterned optical anisotropic layer and the second patterned optical anisotropic layer is a combination of a +A-plate and a −A-plate.

13. The laminate according to claim 3, wherein both the first patterned optical anisotropic layer and the second patterned optical anisotropic layer have normal wavelength dispersion, reciprocal wavelength dispersion, or flat dispersion as wavelength dispersion of the retardation Re in the in-plane direction, and both the first patterned optical anisotropic layer and the second patterned optical anisotropic layer have nominal wavelength dispersion, reciprocal wavelength dispersion, or flat dispersion as wavelength dispersion of the retardation Rth in the film thickness direction.

14. The laminate according to claim 3, wherein both the first patterned optical anisotropic layer and the second patterned optical anisotropic layer have the normal wavelength dispersion as the wavelength dispersion of the retardation Re in the in-plane direction, and both the first patterned optical anisotropic layer and the second patterned optical anisotropic layer have normal wavelength dispersion as the wavelength dispersion of the retardation Rth in the film thickness direction.

15. The laminate according to claim 3, wherein the first patterned optical anisotropic layer and the second patterned optical anisotropic layer contain a liquid crystal compound.

16. A window comprising the laminate according to claim 3.

* * * * *